US012071385B2

(12) United States Patent
Babu et al.

(10) Patent No.: US 12,071,385 B2
(45) Date of Patent: Aug. 27, 2024

(54) MULTI-SOURCE MICRONUTRIENT COMPOSITION AND METHODS OF TREATING SOIL WITH THE SAME

(71) Applicant: Koch Agronomic Services, LLC, Wichita, KS (US)

(72) Inventors: Tapasya Babu, Overland Park, KS (US); Elliott Martin, Kansas City, MO (US); Robert A. Geiger, Olathe, KS (US); Andres Reyes Gaige, Overland Park, KS (US)

(73) Assignee: Koch Agronomic Services, LLC, Wichita, KS (US)

( * ) Notice: Subject to any disclaimer, the term of this patent is extended or adjusted under 35 U.S.C. 154(b) by 238 days.

(21) Appl. No.: 16/252,120

(22) Filed: Jan. 18, 2019

(65) Prior Publication Data

US 2019/0225556 A1 Jul. 25, 2019

Related U.S. Application Data

(60) Provisional application No. 62/619,663, filed on Jan. 19, 2018.

(51) Int. Cl.
*C05D 9/02* (2006.01)
*C05G 3/40* (2020.01)
(Continued)

(52) U.S. Cl.
CPC .................. *C05D 9/02* (2013.01); *C05G 3/44* (2020.02); *C05F 11/04* (2013.01); *C05G 1/00* (2013.01)

(58) Field of Classification Search
CPC ... C05D 9/02; C05G 3/44; C05G 5/12; C05G 1/00; C05F 11/04
See application file for complete search history.

(56) References Cited

U.S. PATENT DOCUMENTS 3,681,416 A 8/1972 Miller et al.
4,149,869 A * 4/1979 Lloyd ..................... A01N 63/20
71/7

(Continued)

FOREIGN PATENT DOCUMENTS

CN 104262058 A * 1/2015
CN 105746559 A * 7/2016
(Continued)

OTHER PUBLICATIONS

Firebrake® ZB MSDS. 20 Mule Team. U.S. Borax Inc.Dec. 2006.*
(Continued)

*Primary Examiner* — Jennifer A Smith

(57) ABSTRACT

The present disclosure is concerned with fertilizer compositions that provide controlled, delayed, and/or prolonged release of micronutrients in soil. In one embodiment, the inventive composition comprises a dry, powdered blend of a first target micronutrient source in chelated form and a second source of the same target micronutrient but provided in non-chelated form. In another embodiment, the inventive composition provides at least two sources of boron, with one source being a water-soluble form and the other source being a water-insoluble form. Regardless of the embodiment, the methods of using the fertilizer composition results in increased uptake of the particular micronutrient, nitrogen, and/or potassium compared to the prior art.

43 Claims, 45 Drawing Sheets

(51) Int. Cl.
*C05F 11/04* (2018.01)
*C05G 1/00* (2006.01)

(56) References Cited

U.S. PATENT DOCUMENTS

| | | | | |
|---|---|---|---|---|
| 4,425,149 | A * | 1/1984 | Kimbro | C05D 9/02 |
| | | | | 71/1 |
| 6,359,029 | B1 * | 3/2002 | Kriessmann | C09D 4/06 |
| | | | | 523/172 |
| 7,410,522 | B2 | 8/2008 | Green | |
| 7,445,657 | B2 | 11/2008 | Green | |
| 8,231,910 | B2 | 7/2012 | Laurie et al. | |
| 8,685,133 | B2 | 4/2014 | Ponder et al. | |
| 9,034,071 | B2 | 5/2015 | Ponder et al. | |
| 9,540,289 | B2 | 1/2017 | Ponder et al. | |
| 9,656,917 | B2 * | 5/2017 | Jesus De Sequeira Serra Nunes | C09D 17/004 |
| 2002/0178772 | A1 | 12/2002 | Hince | |
| 2003/0017088 | A1 * | 1/2003 | Downs | B01D 53/04 |
| | | | | 422/168 |
| 2005/0220690 | A1 | 10/2005 | Ohtsubo | |
| 2009/0038355 | A1 * | 2/2009 | Marks | C05D 5/00 |
| | | | | 71/27 |
| 2010/0311583 | A1 | 12/2010 | Laurent et al. | |
| 2011/0008227 | A1 * | 1/2011 | Sceats | B01J 6/004 |
| | | | | 202/120 |
| 2011/0152363 | A1 * | 6/2011 | Knochenmus | C07F 15/065 |
| | | | | 556/110 |
| 2015/0299058 | A1 * | 10/2015 | Lamb | C05D 9/02 |
| | | | | 504/101 |
| 2015/0376076 | A1 | 12/2015 | Ward et al. | |
| 2016/0229763 | A1 * | 8/2016 | Wheeler | C05B 7/00 |
| 2017/0044078 | A1 | 2/2017 | McLaughlin et al. | |
| 2017/0101351 | A1 | 4/2017 | Ponder et al. | |
| 2017/0356002 | A1 * | 12/2017 | Thompson | C12N 15/8237 |
| 2018/0079888 | A1 * | 3/2018 | Wiklund | C09K 21/02 |

FOREIGN PATENT DOCUMENTS

| | | |
|---|---|---|
| CN | 106146110 | 11/2016 |
| WO | 95/06015 | 3/1995 |
| WO | 2005019371 A2 | 3/2005 |

OTHER PUBLICATIONS

BioFlora "Soil Preparation for Annual Flowers" <https://www.bioflora.com/soil-preparation-annual-flowers/> Nov. 15, 2016 (Year: 2016).*

Wolfe, Mark E. "AgLime: Agricultral Limestone and Dolomite in Ohio" Geofacts, Ohio Department of Natural Resources, Division of Geological Survey, No. 26. (2009). (Year: 2009).*

International Search Report and Written Opinion mailed May 23, 2019 in corresponding PCT/US2019/014254 filed Jan. 18, 2019, 10 pages.

Extended European Search Report for European Application No. 1974075.5, mailed on Feb. 1, 2022, 10 pages.

* cited by examiner

MULTI-SOURCE MICRONUTRIENT COMPOSITION AND METHODS OF TREATING SOIL WITH THE SAME

RELATED APPLICATIONS

The present application claims the priority benefit of U.S. Provisional Patent Application Ser. No. 62/619,663, filed Jan. 19, 2018, entitled MULTI-SOURCE MICRONUTRIENT COMPOSITION AND METHODS OF TREATING SOIL WITH THE SAME, incorporated by reference in its entirety herein.

BACKGROUND OF THE INVENTION

Field of the Invention

The present disclosure is broadly concerned with a need for novel fertilizer compositions and methods capable of delivering micronutrients over an extended period of time so that they are available throughout the growth cycle of a plant.

Description of the Prior Art

Carbon, hydrogen, oxygen, nitrogen, phosphorus, and sulfur are the primary elements essential to all life. Soils contain these elements as well as other macro and micronutrients that are needed for plant growth. Typically, such elements are not present in the soil in sufficient quantities or in forms that can support maximum plant growth and yield. In order to overcome these deficiencies, fertilizers having specific chemical constituents in specific amounts are often added to the soil, thereby enriching the growth medium. The fertilizers may be supplemented with certain trace elements such as copper, iron, manganese, zinc, cobalt, molybdenum, and boron.

Agriculturally, metal ions are essential nutrients for plant growth. Soil deficiency because of the unavailability or exhaustion of metal ions is very often the cause of poor plant growth. Both soil and foliar application of metal ions are routinely used to prevent, correct, or minimize soil deficiencies. However, it is often necessary to apply fertilizers and/or supplements several times over the course of a growing season. With each application, there is a risk that damage will occur to the plants, thereby reducing crop value. Additionally, there is the inherent cost involved in dedicating time and resources to the task of fertilizing. Furthermore, with multiple applications, there is significant risk that the required nutrients may not be available during an important stage in the plant's development.

There is a need for a single fertilizer formulation that provides nutrients over the growth cycle of a plant that can also be applied in only a single application during that growth cycle.

SUMMARY OF THE INVENTION

The present disclosure addresses this need by broadly providing a fertilizer composition comprising a mixture of a first source of a target micronutrient comprising the target micronutrient chelated with a chelating agent, and a second source of the target micronutrient that is different from the first source. The disclosure further provides a method of using that composition by applying it to soil.

In another embodiment, the disclosure provides a fertilizer composition comprising a mixture of a first source of boron that is water-soluble and a second source of boron selected from the group consisting of colemanite, ulexite, hydroboracite, zinc borate, and mixtures thereof. In yet a further embodiment, the disclosure provides a method of using a fertilizer composition comprising applying the composition to soil, where the fertilizer composition comprises a mixture of a first source of boron that is water-soluble and a second source of boron that is water-insoluble.

The disclosure further provides compositions and methods (in each of the foregoing embodiments) of increasing plant biomass, total nutrient uptake, total micronutrient uptake, total macronutrient uptake, and/or uptake of one or more of the following: nickel, copper, zinc, manganese, iron, molybdenum, boron, calcium, sulfur, phosphorus, magnesium, calcium, potassium, nitrogen, and/or carbon,

DETAILED DESCRIPTION OF THE PREFERRED EMBODIMENTS

Inventive Compositions

Figure 1A:
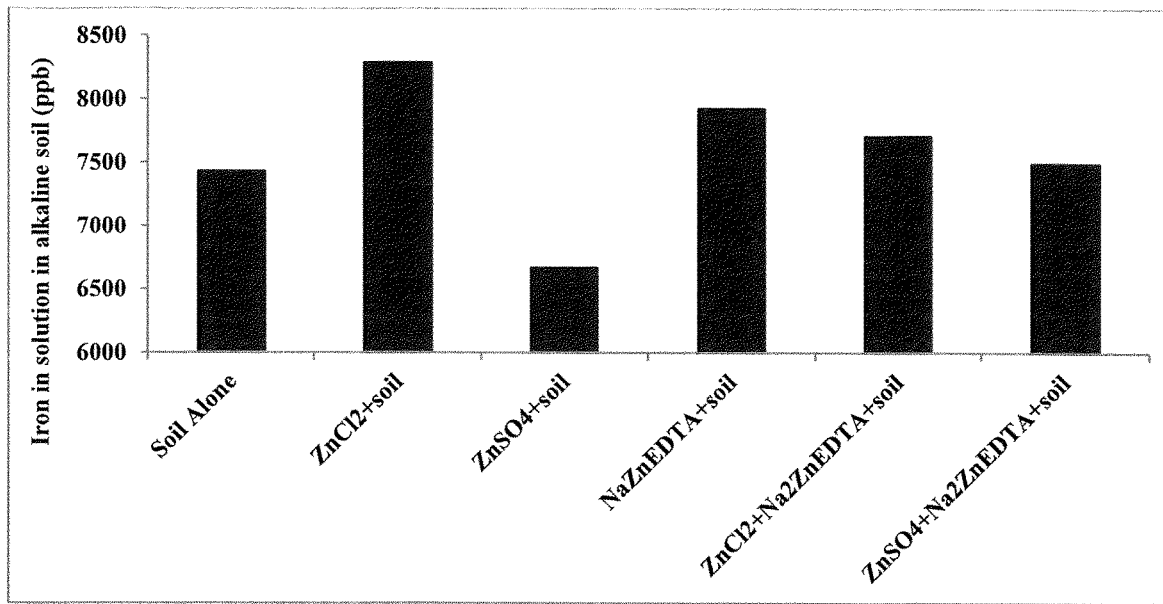
FIG. 1A is a graph comparing the performance of an inventive Zn formulation in alkaline soil to that of several other formulations as described in Example 1.
Figure 1B:
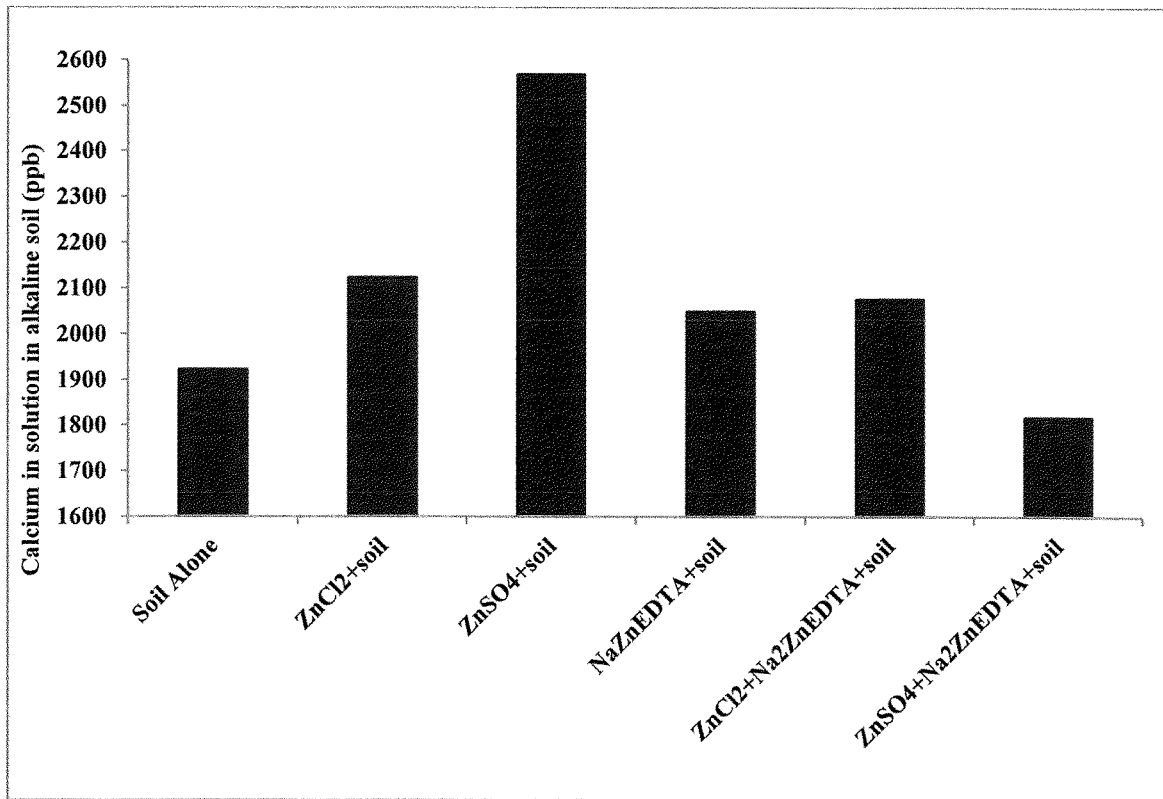
FIG. 1B is a graph comparing the performance of an inventive Zn formulation in alkaline soil to that of several other formulations as described in Example 1.
Figure 1C:
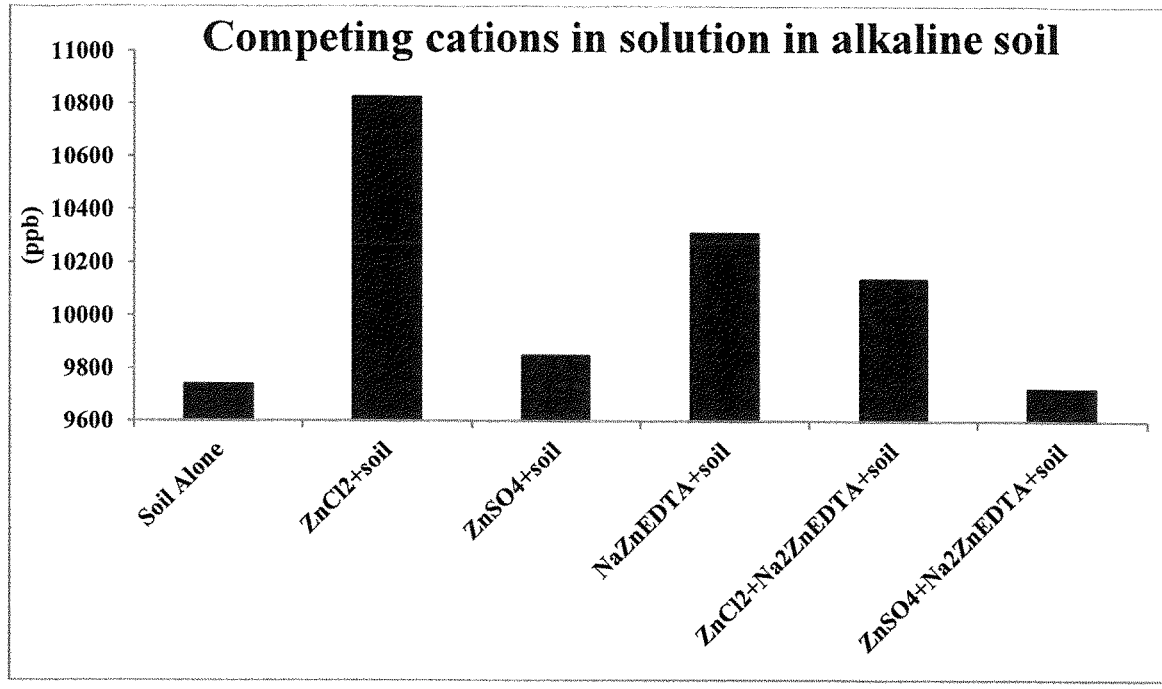
FIG. 1C is a graph comparing the performance of an inventive Zn formulation in alkaline soil to that of several other formulations as described in Example 1.

The present disclosure is broadly concerned with novel fertilizer compositions and methods capable of delivering micronutrients to the root zone over an extended period of time so that they are available throughout the growth cycle of a plant. The inventive fertilizer compositions include two broad embodiments. The first embodiment is a composition that comprises two sources of the same target micronutrient, with one source being in a chelated form and the second source being different from the first source, and preferably also in a non-chelated form ("chelated embodiment"). The second embodiment, the fertilizer composition comprises two sources of boron, with one of those sources being a water-soluble form of boron and the other being a water-insoluble form of boron ("boron embodiment").

1. Micronutrients

As noted above, the chelated embodiment of the composition comprises multiple sources of one or more micronutrients with at least one of those multiple sources of micronutrient being provided as part of a chelated complex. The "multiple sources" include at least two different sources of the same micronutrient, preferably at least three different sources, and more preferably at least four different sources. Three or four different sources of the same micronutrient are particularly preferred and the three or four different sources are most preferably in non-chelated form. The boron embodiment can also include micronutrients in addition to the water-soluble and water-insoluble forms of boron, if desired.

As used herein, "micronutrient" includes those selected from the group consisting of nickel, copper, zinc, manganese, iron, molybdenum, boron, and combinations thereof.

Preferred non-chelated micronutrient sources include those selected from the group consisting of sulfates, oxides, chlorides, carbonates, phosphates, and nitrates of the micronutrient, with sulfates, oxides, carbonates, chlorides, and phosphates being particularly preferred.

Preferred sources of zinc include those selected from the group consisting of chelated zinc, zinc oxide, zinc sulfates (e.g., zinc sulfate monohydrate), zinc hydroxide carbonate, zinc chloride, and mixtures thereof. As noted above, it is preferred that at least one of those sources is a chelated zinc.

Preferred sources of copper include those selected from the group consisting of chelated copper, copper oxide, copper sulfates (e.g., copper sulfate pentahydrate), copper hydroxide carbonate, copper carbonate, copper chloride, and mixtures thereof. Again, it is preferred that at least one of those sources is a chelated copper.

Preferred sources of manganese include those selected from the group consisting of chelated manganese, manganese oxide, manganese sulfates (e.g., manganese sulfate monohydrate), manganese carbonate, manganese chloride, and mixtures thereof. It is again preferred that at least one of those sources is a chelated manganese.

Preferred sources of iron include those selected from the group consisting of chelated iron, iron oxide, iron sulfates, iron chloride, and mixtures thereof, and preferably at least one of those sources is a chelated iron.

Preferred sources of nickel include those selected from the group consisting of chelated nickel, nickel oxide, nickel sulfates, nickel chloride, and mixtures thereof. As with the previous micronutrients, it is preferred that at least one of those sources is a chelated nickel.

Preferred sources of molybdenum include those selected from the group consisting of chelated molybdenum, and mixtures thereof. As noted above, it is preferred that at least one of those sources is a chelated molybdenum.

Preferred water-soluble sources of boron include those selected from the group consisting of disodium octaborate tetrahydrate, boric acid, potassium tetraborate tetrahydrate, potassium pentaborate tetrahydrate, boric anhydride, and mixtures thereof. As used herein, "water-soluble" means that the boron source has a solubility of at least about 10 g/L in water, preferably from about 15 g/L to about 200 g/L in water, more preferably from about 20 g/L to about 160 g/L in water, and even more preferably from about 25 g/L to about 1,000 g/L in water, all at 20-25° C. Preferably, this solubility is achieved within about 1 hour or less of mixing with water at this temperature, although it will be appreciated that the foregoing is simply a test for identifying suitable water-soluble boron sources, and that solubilizing times after field application will depend on many variables (e.g., rainfall).

Preferred water-insoluble sources of boron include, but are not limited to, colemanite, ulexite, hydroboracite, zinc borate, and combinations thereof. As used herein, "water-insoluble" means that the boron source has a solubility of less than about 2.0 g/L in water, preferably less than about 0.5 g/L in water, more preferably less than about 0.05 g/L in water, and even more preferably from about 0 g/L, all at 20-25° C. Preferably this lack of solubilization is maintained at least about 2 days, more preferably at least about 7 days, and even more preferably from about 14 days to about 45 days after mixing with water. Again, in the field, solubility will vary depending upon many conditions, and this is simply a test for identifying water-insoluble source of boron.

2. Chelating Agents

Any chelating agent known to chelate with the above-listed micronutrients is suitable for use in the present disclosure, including a variety of chelating agents in the same fertilizer product. In one embodiment, it is preferred that the chelating agent is one other than citric acid. In that embodiment, the fertilizer composition and resulting product is essentially free of citric acid (i.e., contains less than about 1% by weight citric acid, and preferably about 0% by weight citric acid). In a preferred embodiment, the chelating agent is selected from the group consisting of ethylenediaminetetraacetic acid ("EDTA acid"), ethylenediaminetetraacetate ("EDTA"), EDTA salts, and mixtures thereof, and preferably a salt of EDTA. Particularly preferred chelating agents are selected from the group consisting of ammonium salts of EDTA or EDTA acid (preferably a monoammonium or diammonium salt) and metal salts of EDTA or of EDTA acid. Preferred metal salts are dimetal or tetrametal salts, while preferred metals of these salts are selected from the group consisting of Group I and Group II metals. The most preferred Group I and Group II metals are selected from the group consisting of sodium (e.g., disodium, tetrasodium), lithium, calcium, potassium, and magnesium.

While the foregoing chelating agents are discussed with respect to the chelated embodiment of the disclosure, it will be appreciated that a chelating agent could also be included in the boron embodiment, particularly when an additional micronutrient(s) (i.e., not only boron) will be included in the fertilizer composition.

3. Optional Ingredients

A number of other optional ingredients can also be included in the fertilizer composition, if desired, regardless of whether it's the chelated embodiment or the boron embodiment. Some of those ingredients include those selected from the group consisting of dispersing agents (e.g., sodium salt of naphthalene sulfonate condensate, sodium alkyl naphthalene sulfonate blend), anti-caking agents, dyes, flow agents (e.g., tricalcium phosphate), macronutrients, beneficial nutrients (e.g., selenium or silicon), organic plant growth promoters (e.g., Gibberellin, vitamins etc.), acids, sugars (e.g., sucrose), and mixtures of the foregoing.

Preferred anti-caking agents include those selected from the group consisting of silicon-containing compounds, magnesium salts of fatty acids, polyvinylpolypyrrolidone, cross-linked sodium carboxymethyl cellulose, mono and diglycerides of fatty acids, and mixtures thereof. Preferred silicon-containing compounds include those selected from the group consisting of silicon dioxide, calcium silicate, nano silicon dioxide, talc, aluminosilicate, amorphous silicon, amorphous silicon dioxide, and mixtures of the foregoing.

Suitable macronutrients include those selected from the group consisting of calcium, sulfur, phosphorus, magnesium, calcium, potassium, nitrogen, and carbon.

In a particularly preferred embodiment, the optional ingredient is one that is insoluble in an acidic environment, soluble in a basic environment, and releases a weak acid as it solubilizes. As used herein, "acidic environment" means one that has a pH of less than about 6, preferably from about 1 to about 6, and preferably from about 4 to about 6. As used herein, "basic environment" means one that has a pH of at least about 8, preferably from about 8 to about 12, and preferably from about 8 to about 10. Finally, a "weak acid" in this context refers to one that has a pKa of from about −10 to about 50, preferably from about 0 to about 16, and more preferably from about 1 to about 5. One preferred ingredient of this type is humic acid.

Methods of Forming the Inventive Fertilizer Compositions

1. Chelated Embodiment

The inventive compositions are formed by first obtaining commercially (if available) or forming a chelate-containing solution or dispersion comprising the chelated micronutrient(s). If it is desired to form the chelate-containing solution, this can be accomplished by mixing the particular micronutrient source with the desired chelating agent, typically in the presence of water and a base (e.g., sodium hydroxide solution). The amount of base included in the chelate-containing dispersion is from about 1.3% to about 2.9% by weight, depending on the metal to be chelated, based upon the total weight of the chelate-containing solution taken as 100% by weight. Water is included in the dispersion at levels of from about 85% to about 93% depending on the metal to be chelated, based upon the total weight of the chelate-containing solution taken as 100% by weight.

EDTA or other chelating agent is suspended in a quantity of distilled water at 50° C., and the solution is stirred continuously. Sodium hydroxide (NaOH) is added first, in small aliquots, followed by the desired micronutrient source (e.g., zinc oxide, copper carbonate or manganese carbonate), and this is repeated sequentially. The pH of the clear solution obtained is measured and brought to 7, if necessary, by either the addition of NaOH (if acidic) or EDTA (if alkaline). More distilled water is added to bring the zinc or other micronutrient concentration to a predetermined level, and the solution is subsequently filtered. During this time, the chelating agent forms a micronutrient-chelate compound with the micronutrient supplied by the micronutrient source. The solution or dispersion is then dried to a moisture content of less than about 1% by weight, and preferably about 0% by weight, to form a dry powder that comprises the chelated micronutrient.

After drying, typical levels of the micronutrient-chelate compound in the chelate-containing powder will be from about 80% to about 90% by weight, and preferably from about 85% to about 87% by weight, based upon the total weight of the chelate-containing powder taken as 100% by weight. In the final composition of the inventive chelated embodiment formulation, one part of the total micronutrient as desired is added as the micronutrient-chelated form and three parts as another form of soluble micronutrient source, resulting in a micronutrient-chelate:non-chelated micronutrient source ratio that is nearly equal to 1:1.

In a further embodiment, as noted above, there is also a second different (and preferably non-chelated) source of that same micronutrient. In yet another embodiment, there is additionally a third different (from the first and second non-chelated sources), and preferably non-chelated source of that same micronutrient. In an even further embodiment, there is additionally a fourth different (from the first, second, and third non-chelated sources), and preferably non-chelated source of that same micronutrient.

In addition to the chelated micronutrient(s) and non-chelated micronutrient source(s), the composition also includes any of the other ingredients previously described. Alternatively, the composition could consist essentially of, or even consist of, the chelated and non-chelated micronutrient sources.

The preferred ranges of these various ingredients of the final powdered product are set forth in Table A. Additionally, it is preferred that the weight ratio of chelated micronutrient source (e.g., ZnEDTA) to second source of micronutrient (e.g., $ZnSO_4$) is preferably from about 1:2 to about 1:40, more preferably from about 1:3 to about 1:30, and even more preferably from about 1:4 to about 1:12.

TABLE A

| INGREDIENT | BROADEST RANGE[A] | PREFERRED[A] | MOST PREFERRED[A] |
| --- | --- | --- | --- |
| Chelation Complex (with target micronutrient)[B] | about 4% to about 20% | about 4% to about 10% | about 9% to about 10% |
| First Non-chelated Target Micronutrient[B] | about 20% to about 40% | about 30% to about 40% | about 35% to about 37% |
| Second Non-chelated Target Micronutrient[B, C] | about 20% to about 40% | About 30% to about 40% | About 35% to about 37% |
| Third Non-chelated Target Micronutrient[B, C] | about 8% to about 37% | about 9% to about 20% | about 9% to about 10% |
| Humic Acid[C] | about 0.5% to about 10% | About 0.5% to about 5% | About 1% to about 3% |
| Macronutrients[C, D] | about 1% to about 6% | about 1% to about 4% | about 1% to about 2% |
| Anti-Caking Agent[C] | about 2% to about 10% | about 4% to about 8% | about 6% to about 7.95% |
| Dispersing Agents[C] | about 0.001% to about 0.5% | about 0.005% to about 0.25% | about 0.005% to about 0.025% |
| Drying Agents[C] | about 0.001% to about 0.5% | about 0.01% to about 0.25% | about 0.0125% to about 0.05% |
| Dyes[C] | about 0.01% to about 0.25% | about 0.01% to about 0.125% | about 0.025% to about 0.125% |

[A]All ranges are % by weight, based upon the total weight of all ingredients taken as 100% by weight.
[B]Table A refers to weight of the micronutrient source.
[C]In embodiments where this ingredient is present (i.e., when it is not 0%).
[D]Refers to weight of macronutrient source.

It will be appreciated that the inventive fertilizer composition can be customized to have a wide variety of "mixing and matching" among micronutrients/micronutrient sources. The key is that the target micronutrients (i.e., those being targeted for longer-term/constant presence in soil over an extended period of time) should be provided in the chelated form and in one or more other (different) forms as previously described. Thus, if zinc is the target micronutrient, it can be provided, for example, as chelated (preferably with EDTA) zinc, plus zinc oxide and zinc sulfate (typically in monohydrate form). If copper is the target micronutrient, it can be provided, for example, as chelated (preferably with EDTA) copper, plus copper oxide and copper sulfate (typically in pentahydrate form), and preferably also with copper hydroxide carbonate. If manganese is the target micronutrient, it can be provided, for example, as chelated (preferably with EDTA) manganese, plus manganese oxide and manganese sulfate (typically in monohydrate form), and preferably also manganese chloride. Furthermore, if more than one micronutrient is desired for the target micronutrient, each one can be provided in its chelated form and as part of different sources of that same micronutrient. These different micronutrients can be part of the same formulation, or separate formulations can be separately prepared (as described below) and a blend of those dry dispersible powder formulations can be provided.

In one preferred embodiment, the target micronutrient is provided in its chelated form and in its sulfate form. In this embodiment, it is particularly preferred that its chelated form comprises the micronutrient chelated with the disodium salt of EDTA.

2. Boron Embodiment

In this embodiment, the fertilizer compositions are formed by simply mixing the water-soluble and water-soluble boron sources together, along with any additional ingredients that might be included, as described above. The preferred ranges of these various ingredients of the final powdered product are set forth in Table B. Additionally, it is preferred that the weight ratio of water-soluble boron source to water-insoluble boron source is from about 1:10 to about 1:1, more preferably from about 1:4 to about 1:1.05, and even more preferably from about 1:2 to about 1:1.1.

particle size in this range. If necessary, particle size reduction of the raw materials is carried out to achieve these average particle sizes.

Furthermore, the ingredients can be provided in various combination of hydrated, dry, and mixtures thereof. In a preferred embodiment, the ingredients have individual moisture contents of less than about 3% by weight, preferably less than about 1% by weight, more preferably less than about 0.1% by weight, and preferably about 0% by weight, based upon the total weight of the particular ingredient utilized taken as 100% by weight.

In another preferred embodiment, no liquids (e.g., water, solvents, oils) are included in the fertilizer composition. That is, the levels of liquids in the fertilizer compositions are less than about 3% by weight, preferably less than about 1% by weight, more preferably less than about 0.1% by weight, and preferably about 0% by weight, based upon the total weight of the fertilizer composition taken as 100% by weight.

Coated Fertilizer Products Comprising Inventive Fertilizer Compositions

Although the above-described fertilizer compositions can be utilized alone (i.e., in powder form), in a preferred embodiment they are used in conjunction with a carrier. That

TABLE B

| INGREDIENT | BROADEST RANGE[A] | PREFERRED[A] | MOST PREFERRED[A] |
|---|---|---|---|
| Water-soluble Boron Source[B] | about 10% to about 40% | about 15% to about 35% | about 20% to about 32% |
| Water-Insoluble Boron Source[B] | about 35% to about 85% | about 45% to about 75% | about 54% to about 65% |
| Humic Acid[C] | about 1% to about 15% | About 1% to about 10% | About 4% to about 8% |
| Macronutrients[C, D] | about 1% to about 6% | about 1% to about 4% | about 1% to about 2% |
| Anti-Caking Agent[C] | about 2% to about 10% | about 4% to about 8% | about 6% to about 7.95% |
| Dispersing Agents[C] | about 0.001% to about 0.5% | about 0.005% to about 0.25% | about 0.005% to about 0.025% |
| Drying Agents[C] | about 0.001% to about 0.5% | about 0.01% to about 0.25% | about 0.0125% to about 0.05% |
| Dyes[C] | about 0.01% to about 0.25% | about 0.01% to about 0.125% | about 0.025% to about 0.125% |

[A]All ranges are % by weight, based upon the total weight of all ingredients taken as 100% by weight.
[B]Refers to weight of the micronutrient source.
[C]In embodiments where this ingredient is present (i.e., when it is not 0%).
[D]Refers to weight of macronutrient source.

3. Particle Size and Moisture Contents

Regardless of the embodiment, each ingredient utilized to form the fertilizer composition is preferably provided in a fine powder form. The average particle size of each ingredient powder utilized should be less than about 170 μm, preferably from about 25 μm to about 170 μm, more preferably from about 50 μm to about 160 μm, and even more preferably from about 50 μm to about 100 μm. Particle size is determined by conventional methods, including by simply passing the particles through an analytical sieve to screen out particles having an undesirable size. In one embodiment, at least about 50%, preferably at least about 70%, more preferably at least about 85%, even more preferably at least about 95%, and most preferably about 100% of the particles in the fertilizer composition will have a is, the fertilizer composition is preferably coated onto a carrier so that it coats at least some of the outer surface of that carrier. This coating can be accomplished by simply mixing the fertilizer composition with the carrier until a substantially uniform coating has been achieved (typically from about 1 minute to about 5 minutes).

Preferred carriers are agronomic carriers, with examples including those selected from the group consisting of seeds, conventional fertilizer products (e.g., nitrogen, phosphate, potassium, sulfur, calcium and/or magnesium fertilizer products), urea prills, dry or granular fertilizer products, inert pellets, biodegradable pellets, and suspensions (both aqueous and non-aqueous). In one embodiment, the carrier is one having a relatively small particle size. In these instances, the largest average surface-to-surface dimension of the carrier is from about 0.1 mm to about 0.5 mm, preferably from about 0.5 mm to about 1 mm, and more preferably from about 2 mm to about 5 mm.

The fertilizer composition is preferably coated onto the carrier at sufficient levels that the final coated fertilizer product includes the powdered fertilizer composition at levels of from about 0.1% by weight to about 10% by weight, preferably from about 0.25% by weight to about 2% by weight, and more preferably from about 0.5% by weight to about 1.5% by weight, based upon the total weight of the coated fertilizer product taken as 100% by weight. In a preferred embodiment, the balance of that weight is entirely attributable to the carrier. In other words, there are no other layers or coatings (e.g., no acidifying agents) above or below the fertilizer composition coating so that the coated fertilizer product consists essentially of, or even consists of, the carrier and inventive fertilizer composition coated on the carrier.

Preferably, the carrier is a dry carrier so that the fertilizer composition coats the dry outer carrier surface. Unless a liquid suspension is used as carrier, no liquid (e.g., solvent, water, oil) should be added during or after the blending of the carrier and fertilizer composition (i.e., it's a "dry-on-dry" blending). As a result, the moisture content of the fertilizer composition coating does not increase from its starting moisture content during this process and certainly falls within the moisture content ranges set forth above.

Methods of Using Inventive Fertilizer Compositions and/or Coated Fertilizer Products As noted previously, the above-described fertilizer compositions can be utilized alone in their blended powder form, but more preferably they are coated onto a carrier and utilized as a coated fertilizer product. Regardless of whether coated or uncoated, the method of use involves introducing the fertilizer composition into an environment to be fertilized with the particular micronutrient(s). Such introduction typically involves contacting the inventive product with soil or mixture of sand and soil. The fertilizer composition is generally applied to the soil at a rate of about 5 kg micronutrient per·ha$^{-1}$ of soil to about 20 kg micronutrient per·ha$^{-1}$ of soil, preferably about 10 kg micronutrient·per ha$^{-1}$ of soil to about 15 kg per·ha$^{-1}$ of soil and more preferably about 5 kg·ha$^{-1}$ to about 10 kg·ha$^{-1}$. This range can vary depending on the initial soil status of the micronutrient, crop, growth stage, and soil pH. Generally, higher the soil pH, higher will be the applied rate to prevent micronutrient deficiencies in crops.

Application can be carried out before, after, and/or during planting of seeds, and the inventive fertilizer composition can be used with most types of seeds, including those selected from the group consisting of corn seeds, soybean seeds, cotton seeds, fruit seeds, wheat seeds, and vegetable seeds.

Advantageously, the mode of operation of the inventive fertilizer composition provides distinct advantages over the prior art by ensuring that the particular micronutrients are available for extended periods of time and at the appropriate stages during plant growth. That is, the total concentration in the soil of the particular micronutrient provided as a chelate and through one or more different sources of that same micronutrient remains substantially constant over these extended periods of times. This can be accomplished in both alkaline (i.e., pH of about 7.5 to about 8) and acidic (i.e., pH of about 4 to about 6) soils.

In a preferred embodiment, the soil has an "initial concentration" of a particular micronutrient (e.g., Zn) in plant-available form within 2 days after inventive product contact with soil. At 4 to 14 days after the inventive product's contact with the soil, that soil has a "second concentration" of the particular micronutrient (e.g., Zn) in plant available form that is at least about 85%, preferably at least about 90%, and preferably at least about 100% of the initial concentration. In some embodiments, this second concentration may even be greater than the initial concentration.

At 14 to 35 days after the inventive product's contact with the soil, that soil has a "third concentration" of the particular micronutrient that is at least about 35% of the second concentration, and preferably at least about 40 percent of the second concentration, and more preferably about 50 percent of the second concentration.

Additionally, the present disclosure provides for increased plant weights as well as increased nutrient uptake when compared to a plant grown under the same conditions except for without the use of the inventive fertilizer composition. Table C shows sets forth the improvements that can be achieved by the present disclosure at about 30 days after planting when compared to the same growing conditions but without the inclusion of any micronutrients (i.e., a negative control). Table D sets forth improvements achieved over a positive control at about 30 days after planting. In the chelated embodiment, a positive control means the same target micronutrient of the inventive composition is included in the positive control, except that it is not provided in both a chelated and non-chelated form. In the boron embodiment, a positive control means the positive control contains a source of boron, but it does not contain both a water-soluble and a water-insoluble source of boron, and more preferably does not include colemanite. In a preferred embodiment, the foregoing positive controls do not contain humic acid while the inventive formulation does.

TABLE C

% Improvement Over Negative Control

| | FEATURE/PROPERTY OF INVENTIVE FERTILIZER COMPOSITION | BROADEST % IMPROVEMENT | PREFERRED % IMPROVEMENT | MORE PREFERRED % IMPROVEMENT | MOST PREFERRED % IMPROVEMENT |
|---|---|---|---|---|---|
| Zinc[A] | Plant Weight Increase | At least about 10% | From about 10% to about 70% | From about 30% to about 50% | From about 35% to about 45% |
| | Nitrogen Uptake Increase | At least about 17% | From about 17% to about 80% | From about 30% to about 70% | From about 35% to about 45% |
| | Zinc Uptake Increase | At least about 50% | From about 50% to about 250% | From about to 55% to about 85% | From about 60% to about 70% |
| | Potassium Uptake Increase | At least about 1% | From about 1% to about 15% | From about 3% to about 10% | From about 5% to about 8% |
| Boron[B] | Zinc Uptake Increase | At least about 1% | From about 1% to about 15% | From about 2% to about 10% | From about 4% to about 8% |

TABLE C-continued

% Improvement Over Negative Control

| | FEATURE/PROPERTY OF INVENTIVE FERTILIZER COMPOSITION | BROADEST % IMPROVEMENT | PREFERRED % IMPROVEMENT | MORE PREFERRED % IMPROVEMENT | MOST PREFERRED % IMPROVEMENT |
|---|---|---|---|---|---|
| Manganese[A] | Boron Uptake Increase | At least about 100% | From about 100% to about 300% | From about 150% to about 250% | From about 190% to about 210% |
| | Plant Weight Increase | At least about 5% | From about 5% to about 35% | From about 10% to about 25% | From about 12% to about 15% |
| | Nitrogen Uptake Increase | At least about 5% | From about 5% to about 40% | From about 10% to about 30% | From about 15% to about 20% |
| | Manganese Uptake Increase | At least about 50% | From about 50% to about 100% | From about 60% to about 90% | From about 70% to about 80% |
| Copper[A] | Plant Weight Increase | At least about 5% | From about 5% to about 30% | From about 10% to about 25% | From about 15% to about 20% |
| | Nitrogen Uptake Increase | At least about 1% | From about 1% to about 30% | From about 5% to about 20% | From about 10% to about 15% |
| | Copper Uptake Increase | At least about 20% | From about 20% to about 80% | From about 30% to about 70% | From about 45% to about 55% |

[A]Refers to chelated embodiments where the listed element is the target micronutrient provided in two sources.
[B]Refers to boron embodiments.

TABLE D

% Improvement Over Positive Control

| | FEATURE/PROPERTY OF INVENTION | BROADEST % IMPROVEMENT | PREFERRED % IMPROVEMENT | MORE PREFERRED % IMPROVEMENT | MOST PREFERRED % IMPROVEMENT |
|---|---|---|---|---|---|
| Zinc[A] | Plant Weight Increase | At least about 1% | From about 1% to about 40% | From about 10% to about 30% | From about 15% to about 25% |
| | Nitrogen Uptake Increase | At least about 1% | From about 1% to about 20% | From about 5% to about 15% | From about 7% to about 10% |
| | Zinc Uptake Increase | At least about 3% | From about 3% to about 40% | From about 10% to about 30% | From about 15% to about 25% |
| | Potassium Uptake Increase | At least about 1% | From about 1% to about 15% | From about 3% to about 10% | From about 5% to about 8% |
| Boron[B] | Boron Uptake Increase | At least about 1% | From about 1% to about 20% | From about 2% to about 12% | From about 5% to about 10% |
| Manganese[A] | Plant Weight Increase | At least about 1% | From about 1% to about 10% | From about 2% to about 8% | From about 4% to about 6% |
| | Manganese Uptake Increase | At least about 5% | From about 5% to about 35% | From about 10% to about 30% | From about 20% to about 25% |

[A]Refers to chelated embodiments where the listed element is the target micronutrient provided in two sources.
[B]Refers to boron embodiments.

The fertilizer composition of the present disclosure finds use with all crops needing supplementation to complete their life cycle. Their need becomes particularly important when the soil has some inhibitory effects on the availability of these micronutrients due to extremely low or high organic matter, clay content or high pH.

Additional advantages of the various embodiments of the fertilizer composition of the present disclosure will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the fertilizer composition of the present disclosure. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

Further, all aspects and embodiments of the disclosure comprise, consist essentially of, or consist of any aspect or embodiment, or combination of aspects and embodiments disclosed herein.

EXAMPLES

The following examples set forth methods in accordance with the disclosure It is to be understood, however, that these examples are provided by way of illustration and nothing therein should be taken as a limitation upon the overall scope of the disclosure.

Three different experiments corresponding to the three micronutrients, i.e., Zn (Zinc), Cu (Copper), and Mn (Manganese) were conducted using two different soils, acidic (pH=4.6) and alkaline (pH=7.8). The six different treatments with three replications that were included in each experiment were control (soil only), Metal (M)-sulfate, M-chloride, Disodium-M-EDTA, M-sulfate+Disodium-M-EDTA and M-chloride+Disodium-M-EDTA. Metal concentration of 10 µg g$^{-1}$ was added in the soil before shaking them for up to 4 hours on a reciprocal shaker, centrifuging, and filtering. Zinc, Cu, Fe (iron), Ca (Calcium) and Mn equilibrium concentrations in the filtrate were determined using ICP-MS. It was deduced that by adding sulfate form of the micronutrient along with the chelate form in a ratio nearly equal to 1:1 (sulfate:chelate) in such a way that 1 part of total Zn was supplemented by the chelate and 3 parts of the total Zn were supplemented by the sulfate, more Zn or Cu (p<0.001) was maintained in solution than other source combinations tested with respect to Zn and Cu. This could be attributed to the significant decrease in exchange of micronutrient "metal" from within the Disodium-metal-EDTA complex and thereby its loss from solution phase by providing a temporary competitive advantage of concentration to the metal or micronutrient used in the combination over others in soil solution. This was further supported by the results of concentrations of the competing ions like Ca and Fe that were considerably lower (p<0.001) when Zn or Cu was added as sulfate+Disodium-M-EDTA mix rather than Metal (M)-sulfate, M-chloride, or Disodium-M-EDTA. Since the acid soil, was already sufficiently high in micronutrient concentrations, a significant improvement over the conventional sources was not evident. However, the results supported the synergistic effect of sulfate and Disodium-M-EDTA in controlling the dominance of ions like Fe in acid soil solution over the desired micronutrient like Zn over other conventional sources.

Example 1

Alkaline Soil Testing

The details of the three experiments (one each for zinc, copper, and manganese) that were carried out in alkaline soil to compare the performance of the combination of a sulfate with a chelate to the respective performances of: a chelate alone; a sulfate alone; a chloride alone; or a chloride with a chelate, each in the same soil type (alkaline) and pH are discussed below.

The tested inventive formulations are shown in Tables 1-3. In Table 1, one part of the total zinc was added as metal-chelate and three parts as metal-sulfate, resulting in a metal-chelate (i.e., disodium-Me-EDTA): metal-sulfate ratio nearly equal to 1:1. In Table 2, one part of the total copper was added as metal-chelate and three parts as metal-sulfate, resulting in a metal-chelate (i.e., disodium-Me-EDTA): metal-sulfate ratio near equal to 1:1. In Table 3, one part of the total manganese was added as metal-chelate and three parts as metal-sulfate, resulting in a metal-chelate (i.e., disodium-Me-EDTA):metal-sulfate ratio near equal to 1:1.

As described in U.S. Pat. No. 3,681,416 to Miller et al., incorporated by reference herein, each formulation was prepared by first mixing the disodium EDTA and 1 Molar sodium hydroxide solution (50% v/v). After the mixture reached 85° C., water was added for 10 minutes to form a clear solution. Then, the particular micronutrient source (zinc oxide, copper carbonate, or manganese carbonate) was added to the clear solution, so as to cause the particular metal to chelate with the disodium EDTA to form an aqueous solution or dispersion of the chelated complex ("Disodium-Me-EDTA," generically, were Me is the particular metal).

Next, the solution was dried to obtain the Disodium-Me-EDTA powder.

Finally, the remaining ingredients were mixed with the dispersion homogeneously to form a composition in the form of a dry dispersible powder.

TABLE 1

Zn Formulation

| INGREDIENT | QUANTITY (%) |
|---|---|
| EDTA Acid | 27.34 |
| Sodium Hydroxide Solution (50%) | 14.96 |
| Water | 0 |
| Zinc Oxide | 7.7 |
| Zinc Sulfate Monohydrate | 50 |

TABLE 2

Cu Formulation

| INGREDIENT | QUANTITY (%) |
|---|---|
| EDTA Acid | 20.86 |
| Sodium Hydroxide Solution (50%) | 11.17 |
| Water | 0 |
| Copper carbonate | 17.97 |
| Copper Sulfate pentahydrate | 50 |

TABLE 3

Mn Formulation

| INGREDIENT | QUANTITY (%) |
|---|---|
| EDTA Acid | 25.34 |
| Sodium Hydroxide Solution (50%) | 13.86 |
| Water | 0 |
| Manganese carbonate | 10.78 |
| Manganese Sulfate monohydrate | 50 |

The soil was collected from 0-20 cm depth of an arable field. The soil was air-dried and 2 mm sieved before being used in the experiments. Basic properties of soil were determined using standard procedures. The soil had 3% organic matter (Walkley, A. and Black, I. A. 1934. An examination of the Degtjareff method for determining soil organic matter, and a proposed modification of the chromic acid filtration method. Soil Science 37: 29-38, incorporated by reference herein), pH of 7.5 (10 g soil:10 mL deionized water mixture, equilibrated by shaking for 2 hours before measuring the pH of the suspension), Cation Exchange Capacity determined using neutral, 1M ammonium acetate extraction method (Chapman, H. D. 1965. Cation-exchange capacity. In: C.A. Black (ed.). Methods of soil analysis—Chemical and microbiological properties. Agronomy 9:891-901, incorporated by reference herein) of 20.7 milliequivalents per 100 gram, 3450 ppm of Calcium, 320 ppm Magnesium, 6 ppm Sulfur, 3.2 ppm Zinc, 76 ppm Manganese, 23 ppm iron, and 1.5 ppm copper. All the nutrient elements mentioned above were measured after Mehlich-3 extraction procedure (Mehlich, A. 1984. Mehlich 3 soil test extractant: A modification of Mehlich 2 extractant. Communications in Soil Science and Plant Analysis. 15:1409-1416, incorporated by reference herein) followed by analyses using ICP-MS. Five grams of soil was weighed into a 50 ml polypropylene centrifuge tube. Twenty five ml of individual metal treatment solution was pipetted into each centrifuge tube before shaking them on a reciprocal shaker (Eberbach, model number E6010.00, incorporated by reference herein) at 180 rpm for up to 4 hours. The equilibrium time for metals in most soils is less than 4 hours (Msaky, J. J. Calvet, R. 1990. Adsorption behavior of copper and zinc in soils: influence of pH on adsorption characteristics. Soil Science 150: 513-521, incorporated by reference herein) with a low soil: solution ratio of around 0.2 that was used in these experiments. The soils were incubated with the individual metals from the stock solutions at a soil: solution ratio of 1:5. The supernatant was filtered using Whatman No. 1 filter paper after centrifuging using a bench-top centrifuge (Hermle Z446 K, incorporated by reference herein) for 5 minutes at 4000 rpm. One ml of the filtrate was pipetted into a new centrifuge tube before making up the volume to 25 ml using 1% Nitric acid. The diluted filtrate was then analyzed for Zinc, Copper, iron, manganese, and calcium using the PerkinElmer's Nexion 2000 ICP-MS and the equilibrium concentration in soil solution was determined.

The above procedure was repeated with each of the following for comparative testing: soil alone (control); "chloride"+soil; "sulfate"+soil; disodium-Me-EDTA complex (where Me represents the particular metal)+soil; and "chloride"+disodium-Me-EDTA complex+soil. These quantities can be found in Tables 4-6, respectively. In each instance, the same soil type (including pH) and quantity of soil was used as described above with respect to the Tables 1-3 formulations.

TABLE 4

Zn Formulation for the treatment: chloride" + disodium-Me-EDTA complex + soil

| INGREDIENT | QUANTITY (%) |
|---|---|
| EDTA Acid | 27.34 |
| Sodium Hydroxide Solution (50%) | 14.96 |
| Water | 0 |
| Zinc oxide | 7.7 |
| Zinc chloride | 50 |

TABLE 5

Cu Formulation for the treatment: chloride" + disodium-Me-EDTA complex + soil

| INGREDIENT | QUANTITY (%) |
|---|---|
| Copper Carbonate | 17.97 |
| EDTA Acid | 20.86 |
| Sodium Hydroxide Solution (50%) | 11.17 |
| Water | 0 |
| Copper chloride | 50 |

TABLE 6

Mn Formulation for the treatment: chloride" + disodium-Me-EDTA complex + soil

| INGREDIENT | QUANTITY (%) |
|---|---|
| Manganese Carbonate | 10.78 |
| EDTA Acid | 25.34 |

TABLE 6-continued

Mn Formulation for the treatment: chloride" + disodium-Me-EDTA complex + soil

| INGREDIENT | QUANTITY (%) |
|---|---|
| Sodium Hydroxide Solution (50%) | 13.86 |
| Water | 0 |
| Manganese chloride | 50 |

The results are shown in the attached figures as follows: Zn results are shown in FIGS. 1A-1D; Cu results are shown in FIGS. 2A-2D; and Mn results are shown in FIGS. 3A-3D. In each of these figures, the data for the particular inventive product (i.e., from Tables 1-3) is in the far-righthand column, with the columns to the left of that one representing control or comparison testing, as indicated.

These results show that the respective concentrations of ions like calcium and iron increased significantly ($p<0.001$) over the control (soil alone) when the "chloride" (a Lewis Acid in alkaline soil) form of the micronutrient salts were mixed with the disodium-metal-EDTA complex, leading to an overall decline in the stability of the disodium-metal-EDTA (soluble complex) and diminishing the micronutrient concentration in the soil solution. In contrast, the results also reveal that the respective concentrations of ions like calcium and iron are significantly lower ($p<0.001$) in the soil solution when a "sulfate" was the salt combined with disodium-Zn-EDTA when compared to when a "chloride" was the salt used in the combination. This was particularly noticeable in the cases of zinc and copper.

Example 2

Acidic Soil Testing

Three experiments (one each for zinc, copper, and manganese) were carried out in acidic soil to compare the performance of the combination of a sulfate with a chelate to the respective performances of: a chelate alone; a sulfate alone; a chloride alone; or a chloride with a chelate, each in the same soil type and pH. The procedure and formulations described above in Example 1 were repeated here exactly as described above, except that a different soil was used. That is, the soil used in this Example 2 was an acidic soil. The soil had 1.8% organic matter (determined using Walkley and Black's method), pH of 4.5 (as measured in a 1:1 mixture of soil:water), Cation Exchange Capacity (determined using neutral, 1M ammonium acetate extraction method) of 10.5 milliequivalents per 100 gram, 100 ppm of Calcium, 20 ppm Magnesium, 16 ppm Sulfur, 1.3 ppm Zinc, 15 ppm Manganese, 48 ppm iron, and 0.6 ppm copper. All the nutrient elements mentioned above were measured after Mehlich-3 extraction procedure (Mehlich, 1984) followed by analyses using ICP-MS.

1. Cu Results

The data from these experiments are set forth in FIGS. 4A-4D. The copper concentration increased in soil solution with all added sources that were tested. The combination of disodium-Cu-EDTA with soluble sources like sulfates and chlorides of copper maintained similar levels of copper in soil solution as the conventional sources. The concept of increased stability of disodium-Cu-EDTA (and therefore increased copper concentration in soil solution) with the addition of soluble sources along with the chelated form stood true. This was clearly evident in the concentration of other competing ions like iron ($p<0.001$) and manganese, which that significantly decreased when soluble salts like chlorides and sulfates were combined with disodium-Cu-EDTA.

2. Mn Results

Figure 5A:
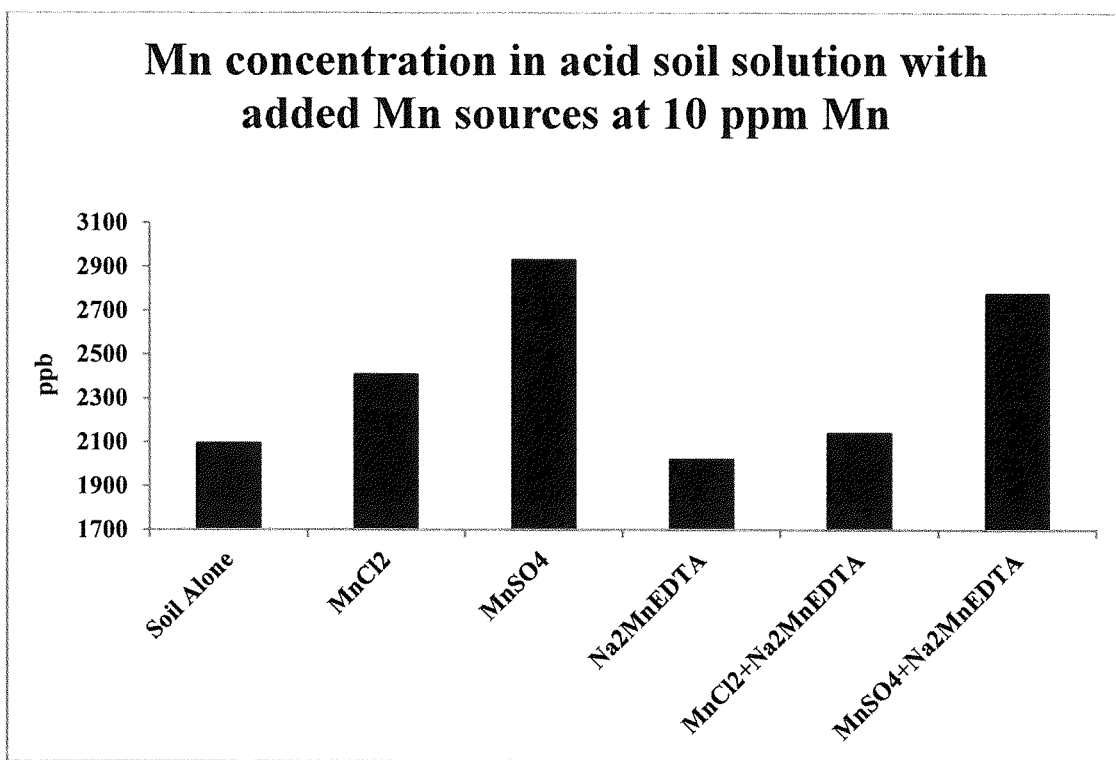
FIG. 5A is a graph comparing the performance of an inventive Mn formulation in acidic soil to that of several other formulations as described in Example 2.
Figure 5B:
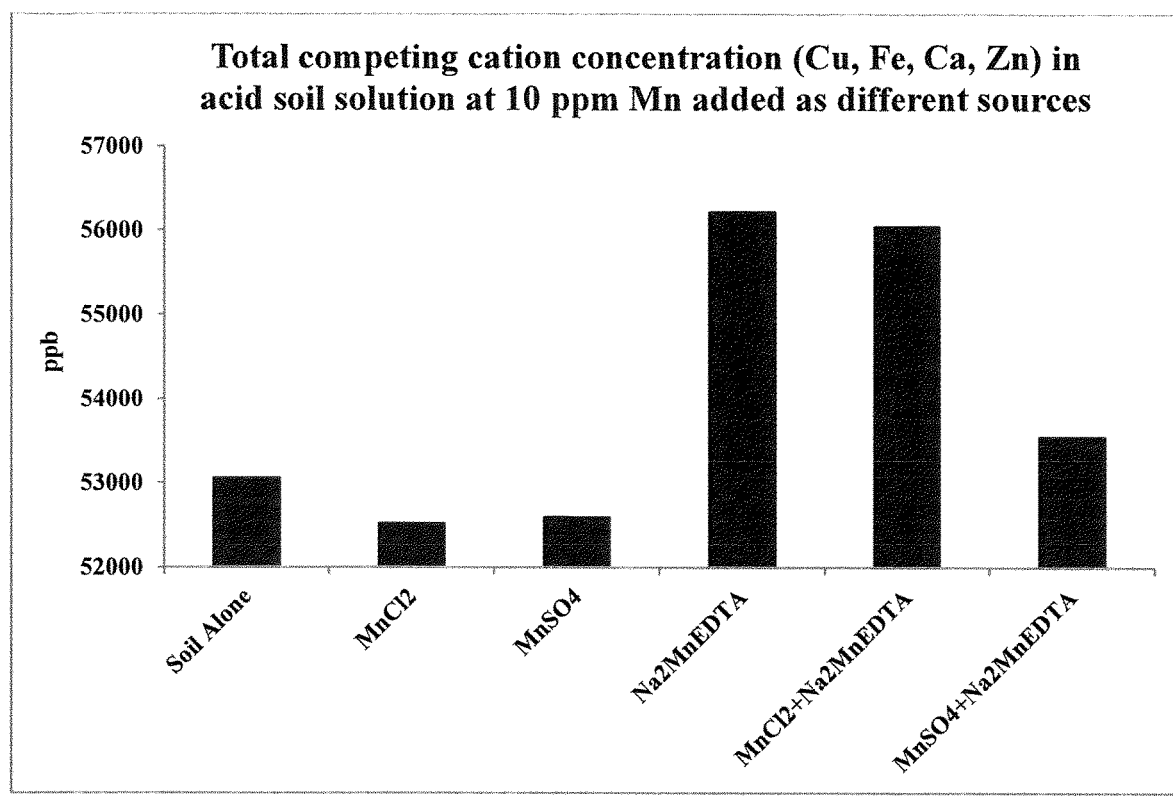
FIG. 5B is a graph comparing the performance of an inventive Mn formulation in acidic soil to that of several other formulations as described in Example 2.

The data from these experiments are set forth in FIGS. 5A-5B. The concentration of manganese maintained in the acidic soil solution was at its maximum with manganese sulfate, followed closely by $MnSO_4$+disodium-Mn-EDTA ($p<0.01$). The conventional source, $MnSO_4$ seemed work as well as the inventive formulation ($MnSO_4$+disodium-Mn-EDTA). However, when conventional manganese sources like the chloride and sulfate forms are added alone, they have the disadvantage of keeping the other plant essential cations at too low of a concentration. Manganese and iron, which are already dominant cations in acidic soils, have competitive advantages over other micronutrients and can easily create situations where it becomes impossible for the plant to take up other essential cations. This situation does not occur in alkaline soil where these conventional forms are prone to sorption losses. This situation also does not occur in the case of micronutrients like copper, whose native concentration in acidic soil is significantly lower than manganese and iron. Considering this behavior of the dominant cation manganese in acidic soil, the $MnSO_4$+disodium-Mn-EDTA would be a better source than other conventional sources tested for plant growth, with a lower rate of manganese sulfate. The $MnSO_4$+disodium-Mn-EDTA very clearly had higher concentrations of other cations ($p=0.4182$) than the other sources (chloride and sulfate alone and chloride in combination with chelate) tested.

3. Zn Results

Figure 6A:
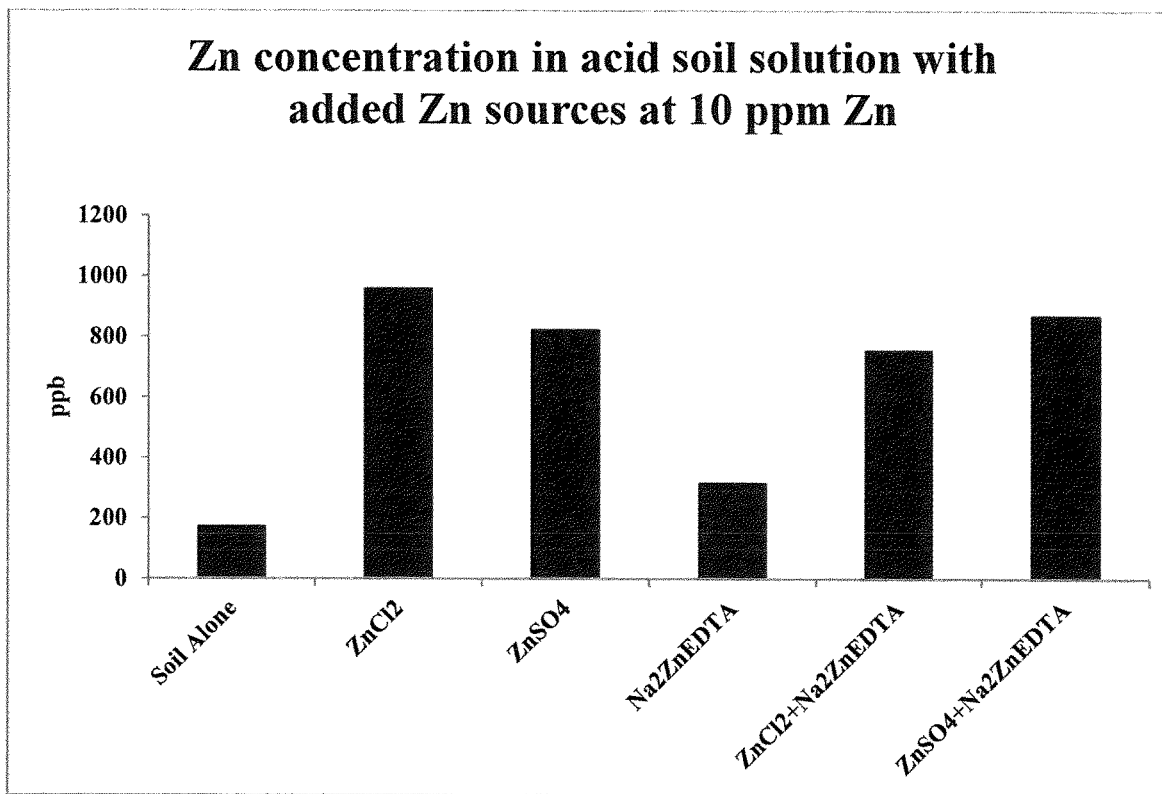
FIG. 6A is a graph comparing the performance of an inventive Zn formulation in acidic soil to that of several other formulations as described in Example 2.
Figure 6B:
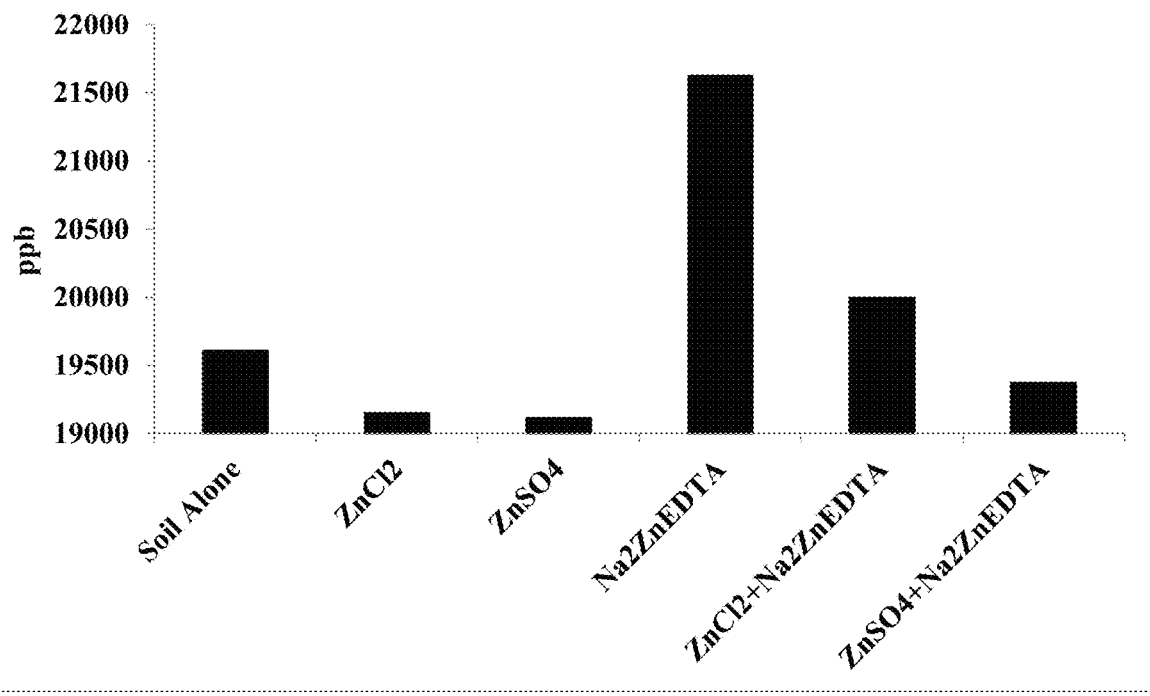
FIG. 6B is a graph comparing the performance of an inventive Zn formulation in acidic soil to that of several other formulations as described in Example 2.

The data from these experiments are set forth in FIGS. 6(a)-(b). The concentration of zinc in the soil solution was maintained at higher levels by all tested sources than was the case with the disodium-Zn-EDTA. Similar to previously-discussed data, this data also suggests that the addition of chloride or sulfate along with the disodium-Zn-EDTA can enhance its stability and prolong the availability of zinc from this source combination during plant growth. It was also noted that this combination also had the added advantage of maintaining and bringing in more calcium, iron, and manganese into the acidic soil solution than conventional sources. The calcium, iron, and manganese levels in the acidic soil solution declined with the increase in zinc concentration in soil solution when zinc chloride or sulfate was used as the source of zinc ($p=0.3069$).

Example 3

Plant Trials

Plant trials were conducted to compare the Mn uptake by the plant of several samples. The tested formulations were as follows: control; $MnCl_2$; $MnSO_4$; disodium-Mn-EDTA; and $MnSO_4$+$MnCl_2$+disodium-Mn-EDTA (formulation of Table 3 above). When Mn was added as a mixture of $MnSO_4$+$MnCl_2$+disodium-Mn-EDTA, the distribution of each ingredient was as set forth in Table 8. In the remaining cases, where Manganese was added as a sulfate, chloride, or Disodium-Mn-EDTA, 100% Mn was provided by each one of them.

This experiment was carried out in a growth chamber under controlled conditions by placing the test product in the growth medium (prepared by mixing 50/50 v/v peat; vermiculite) of a potted plant (Barley, *Hordeum vulgare*) with the medium having a pH of 4.5. Each plastic pot was filled with 500 g of growth media and a calculated quantity of treatment ingredients was applied to provide Mn equivalent to 6.22 ppm. The treated medium was mixed thoroughly, before sowing seeds of barley. Seeds of barley were sown at the rate of 2 seeds per pot. Nitrogen (N), potassium (K) and phosphorus (P) in the form of urea, muriate of potash and monoammonium phosphate were applied at the rate equivalent to 150:90:90 (NPK) kg ha−1. One third of nitrogen and potassium was applied 15 days after planting and the rest was applied before planting. The moisture level in pots was maintained gravimetrically at 75% water holding capacity after germination until 7 days before harvest. Regular plant protection practices were used throughout the crop growing period. At 30 days after seeding shoots were harvested from the pots. Shoots from each pot were cut as close to the growth medium surface. The shoots were oven dried at 65° C. for 72 hours. The shoot biomass yield was then calculated as dry weight (g) per pot. Five replicates of each product (and the control) were obtained and averaged to give the final results, with Mn uptake being determined at 30 days after seeding. The Mn concentration was determined after modified wet ashing procedure (Jones, J. B., Jr., B. Wolf, and H. Mills. 1991. Plant analysis handbook, Micro-Macro Publishing, Inc., Athens, Ga., pp. 23-26, incorporated by reference herein) followed by analyses using ICP-OES (inductively coupled plasma—optical emission spectrometer). The Mn uptake was then calculated for each replicate by multiplying the shoot biomass with the Mn concentration recorded.

TABLE 8

| Mn Formulation for $MnSO_4$ + $MnCl_2$ + disodium-Mn-EDTA | |
|---|---|
| INGREDIENT | QUANTITY (%) |
| Manganese Carbonate | 18.35 |
| Disodium EDTA | 18.73 |
| Sodium Hydroxide Solution (50%) | 19.46 |
| Water | 19.46 |
| Manganese chloride | 5 |
| Manganese Sulfate Monohydrate | 21 |

The above procedure was repeated with each of the following for comparative testing: soil alone (control); "chloride"+growth medium; "sulfate"+growth medium; and disodium-Me-EDTA complex (where Me represents the particular metal)+growth medium; with no manganese supplementation externally into the growth medium in control; or with all Manganese supplemented in the growth medium as $MnCl_2$ or $MnSO_4$ or disodium-Mn-EDTA.

Figure 7A:
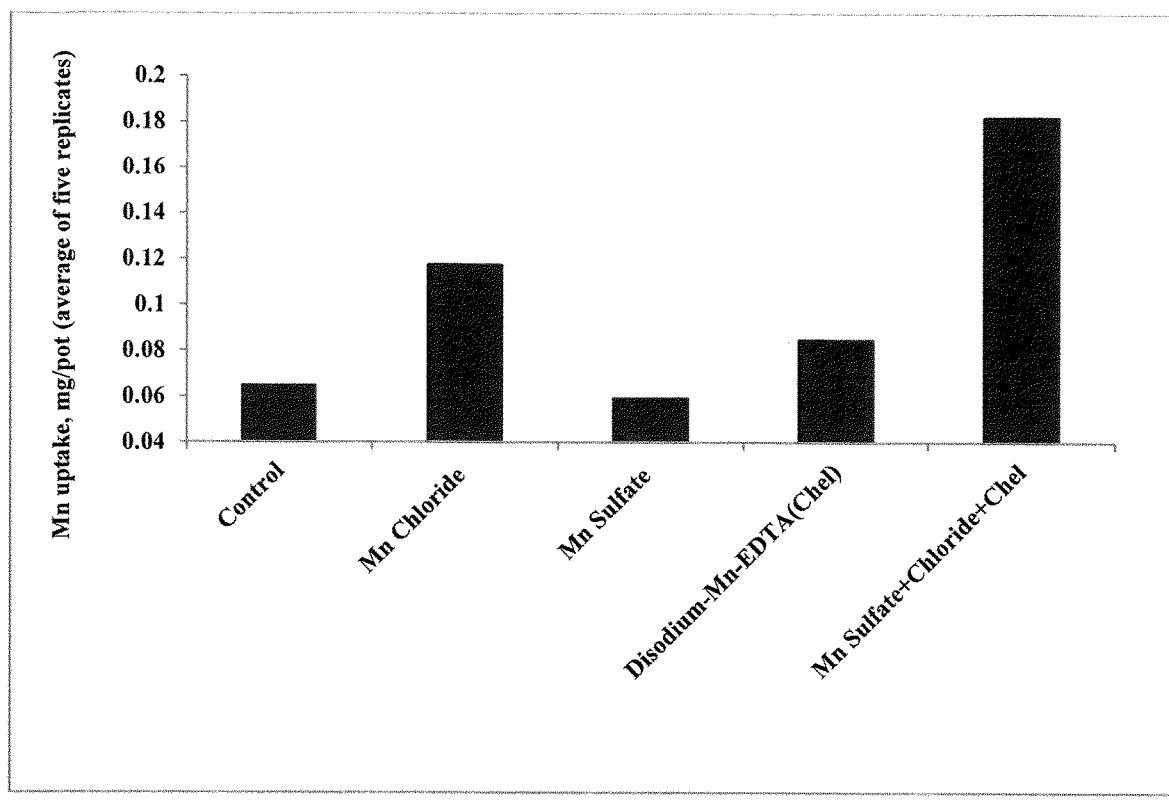
FIG. 7A is a graph comparing the results of an inventive Mn formulation to that of several other formulations in the plant trial test described in Example 3.

The results (see FIGS. 7A-7D) from these plant trials were in agreement with the data obtained from soil experiments, as described previously. The combination of a chloride, a sulfate, and disodium-Mn-EDTA (ratio of 3:3:1) to supplement Mn at 6.22 ppm resulted in a maximum Mn uptake (FIG. 7A, $p=0.05$) in plants after 30 days of growth.

Figure 7B:
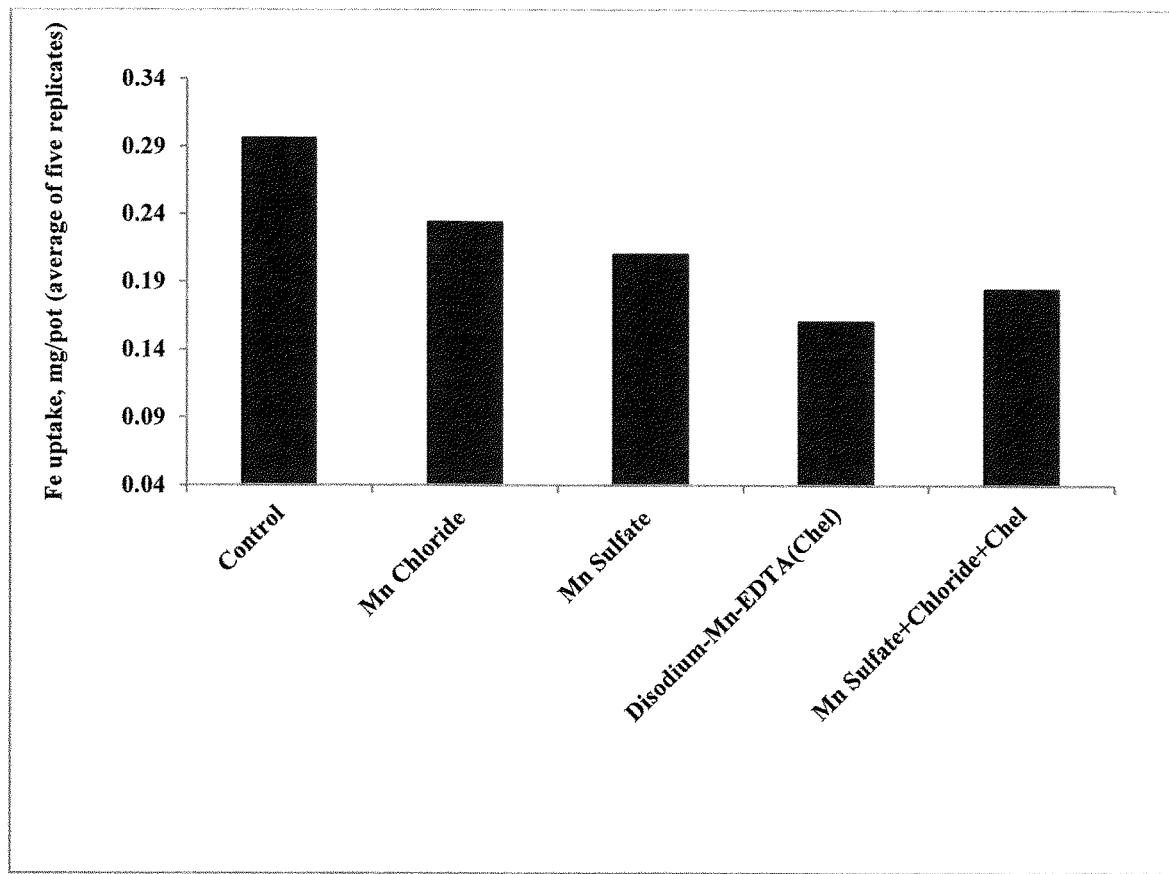
FIG. 7B is a graph comparing the results of an inventive Mn formulation to that of several other formulations in the plant trial test described in Example 3.
Figure 7C:
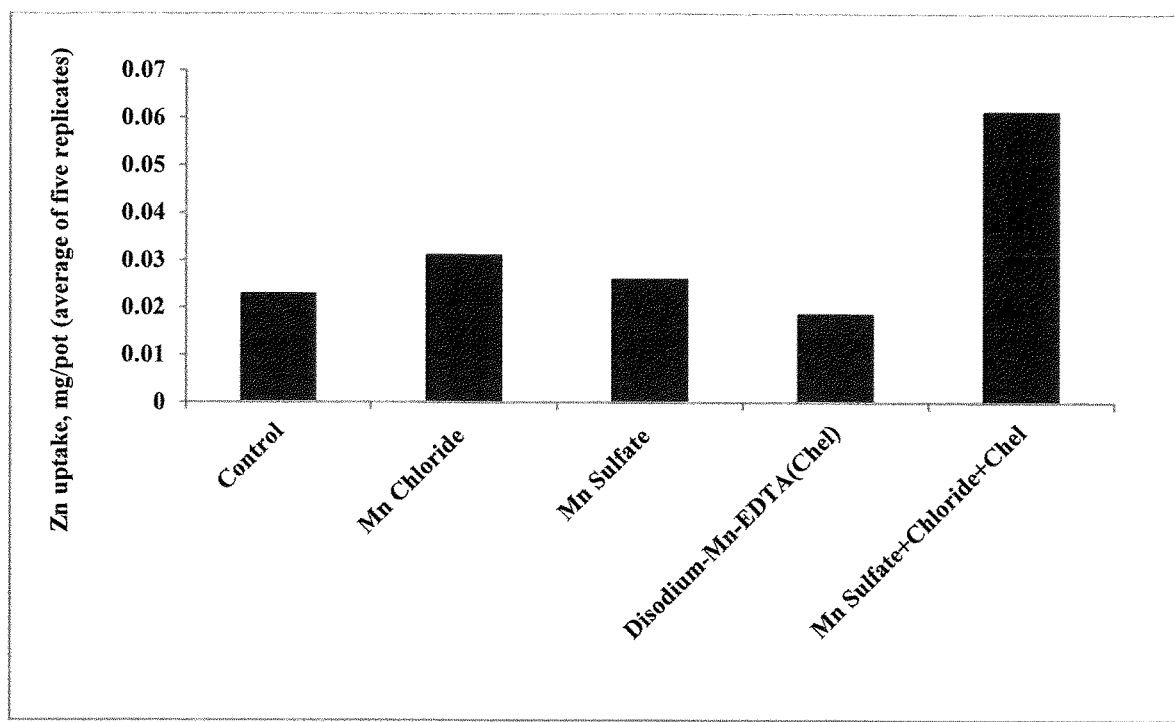
FIG. 7C is a graph comparing the results of an inventive Mn formulation to that of several other formulations in the plant trial test described in Example 3.
Figure 7D:
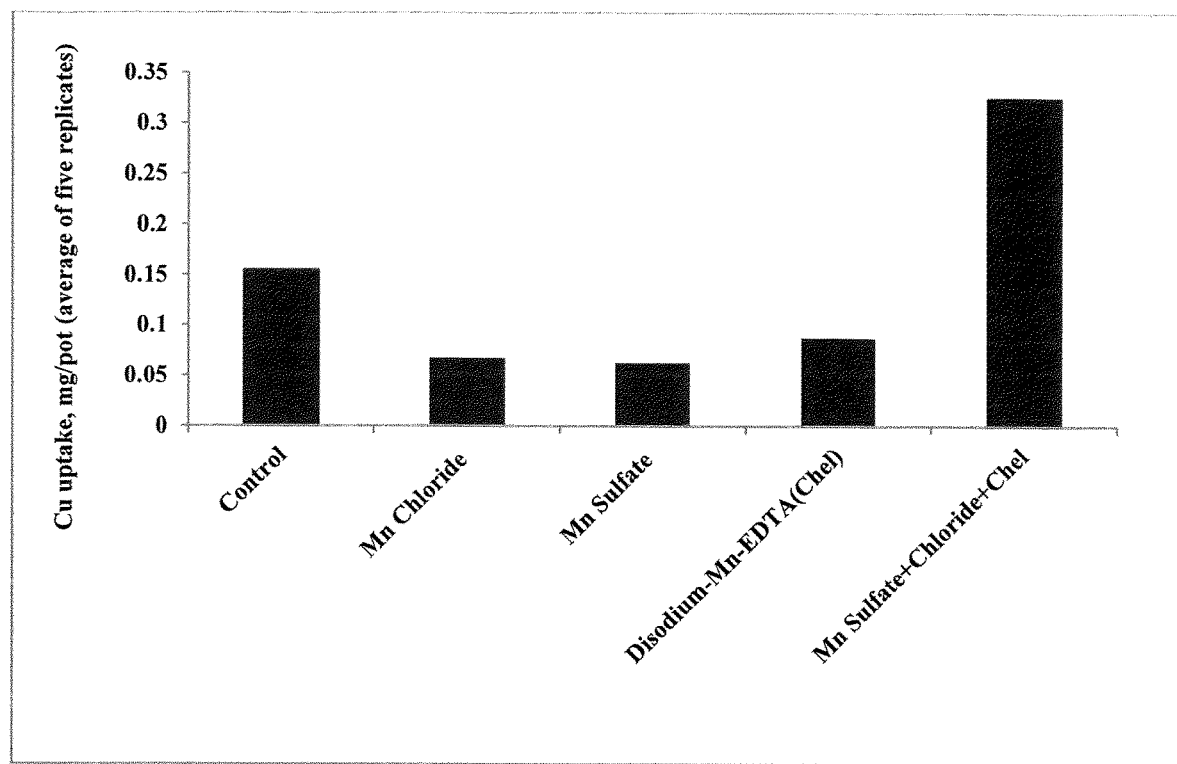
FIG. 7D is a graph comparing the results of an inventive Mn formulation to that of several other formulations in the plant trial test described in Example 3.

Because the growth medium was acidic, iron was a major cation and, advantageously, this new combination assisted in minimizing excessive iron uptake in the plants (FIG. 7B, $p<0.1$). The plant uptake of zinc and copper (FIGS. 7C and 7D) was much lower from conventional sources than from the new formulation. This supports the data from the soil experiment where it was seen that, unlike the conventional sources, zinc and copper were not overly suppressed by the new manganese formulation used in acidic soil. Importantly, the increased zinc and copper uptakes in the plants do not necessarily mean that these ions were dominating the soil solution phase with the new formulation. At no point was there zinc or copper toxicity observed in the plants. Compared to other sources of manganese, the new formulation seemed to maintain zinc and copper in the soil solution for a longer duration of plant growth.

Example 4

Plant Trials and Analyses

Further experiments were designed to compare physiological differences in maize plants receiving different treatments according to the disclosure against two controls. The formulations subjected to this testing are described in Examples 5-8, along with the results. The physiological data collected from all plants included total dry weight (made of dry root weight and dry shoot weight) and plant nutrient uptake. The physiological data of three formulations were then compared to a positive control, which contained the target micronutrient (zinc, copper, boron, or manganese) but in a prior art formulation, and a negative control, which contained only nitrogen, phosphorus, and potassium (i.e., NPK) without any target micronutrients. Each experiment was repeated two times for each trial and in two different media: 0.7 kg top soil, and 1 kg of a 50:50 (weight) mixture of top soil and sand. Each experiment included at least 5 replicates for each treatment of each target micronutrient and for each media used (i.e., for soil and for the soil/sand mixture).

All treatments received NPK at a rate of 100-50-50 pounds/acre in granular form. The sources were urea for nitrogen, monoammonium phosphate for phosphorous, and sulfate of potash for potassium. The positive control or inventive treatment formulation was coated onto the NPK mixture for application in the soil or soil/sand media before planting. All plants were grown for 30 days before harvesting, and roots and shoots were collected and cleansed from all particles using water. After cleaning, each plant's fresh tissue was dried at 202° F. for 48 hours. All samples (roots and shoots) were then weighed, packed, and sent for analysis to A&L Great Lakes Lab (Fort Wayne, Indiana).

At A&L Great Lakes Lab, the dried plants were ground with a Wily Mill Grinder and sieved through 20 mesh screen. Plant tissue samples were hot-acid extracted using an open vessel procedure (SW846-3051A). This process involved first weighing the samples (~0.2 g) and recording the actual weight to use for determining the final dilution factor. Next, 2 ml of nitric acid was added to each sample, and the samples were microwaved in 2 steps. For the first step, the microwave oven was programmed to ramp up to 90° C. and to hold that temperature for 90 seconds. After the samples cooled below 50° C., 1 ml of peroxide was added. The samples were then returned to the microwave oven a second time. The temperature was ramped up to 105° C. and held for 10 minutes. After the samples had cooled, the samples were brought to a final volume of 25 ml (~1:125 dilution), capped, and mixed.

For sample analysis, total nitrogen was calculated by the Dumas Method (Nitrogen by Combustion or Nitrogen by Thermal Conductance) AOAC 990.03 run on an Elementar rapid-N cube. For all other elements (mineral analysis), Inductively Coupled Argon Plasma (ICAP) AOAC 985.01 was carried out on a Thermo iCAP 6500. After analysis, the nutrient uptake was calculated for all samples using the data from A&L Great Lakes Lab and the dry weight of samples. One-way ANOVA statistical analyses were carried out using RStudio software and the Tukey multiple comparisons of means with a 95% confidence level (p=0.05 significance).

Example 5

Zn Formulation Testing, Results, and Discussion

Nine formulations according to the disclosure as well as a positive control were prepared by mixing together the ingredients of Table 9. Formulas 1, 7, and 9, as well as the positive control, were separately coated on NPK. Corn seed was planted, grown, harvested, and tested, all as described in Example 4. In Experiment 1, 2 ppm of zinc was administered while 1 ppm of zinc was administered in Experiment 2.

1. Plant Weight

Figure 8A:
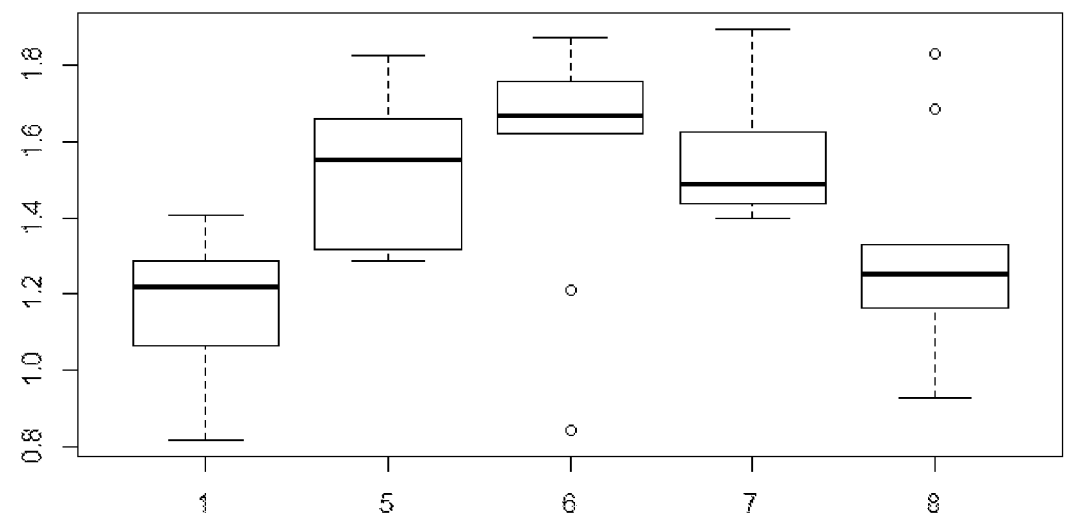
FIG. 8A is a graph comparing the total dry weights of plants grown in soil with zinc formulations according to the disclosure to that of two control formulations (Example 5)
Figure 8B:
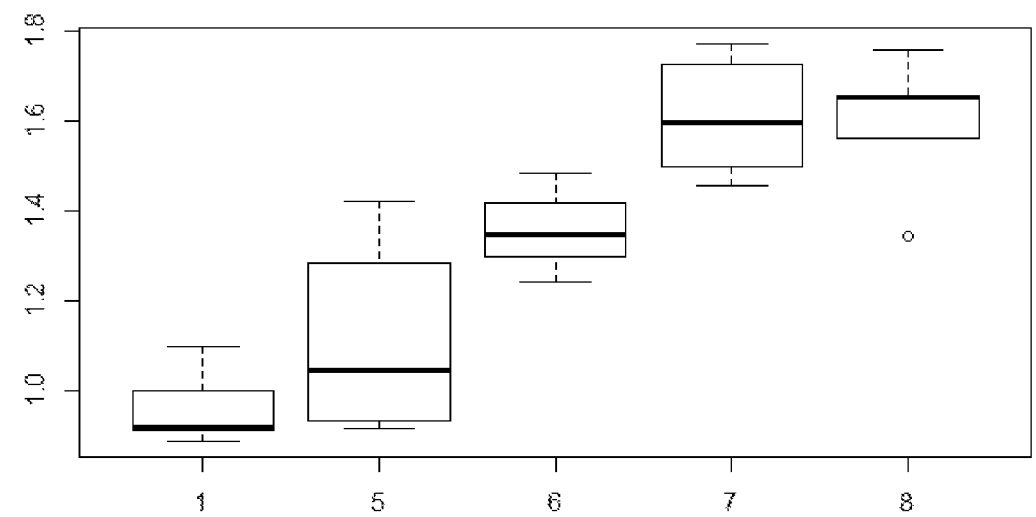
FIG. 8B is a graph comparing the total dry weights of plants grown in soil with zinc formulations according to the disclosure to that of two control formulations (Example 5)
Figure 8C:
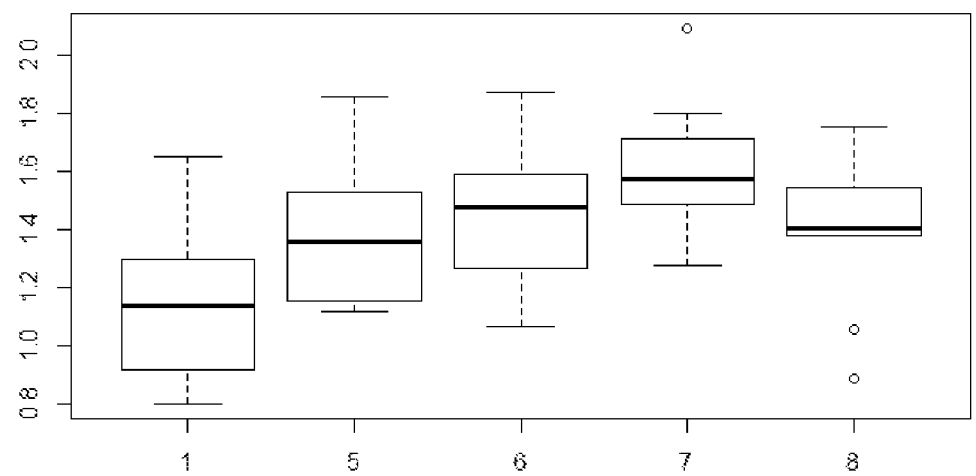
FIG. 8C is a graph comparing the total dry weights of plants grown in a soil/sand mixture with zinc formulations according to the disclosure to that of two control formulations (Example 5)
Figure 8D:
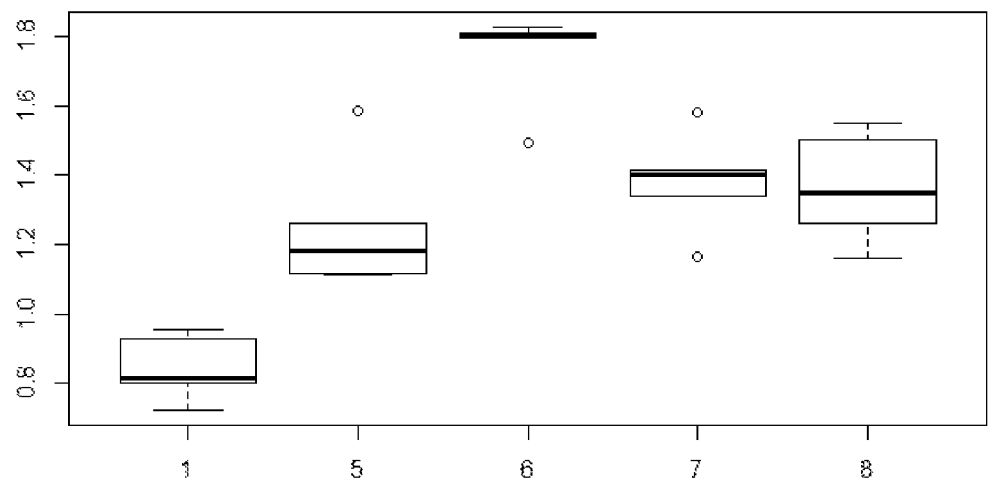
FIG. 8D is a graph comparing the total dry weights of plants grown in a soil/sand mixture with zinc formulations according to the disclosure to that of two control formulations (Example 5)

FIGS. 8A-8D show the total dry weights in grams (y-axis) for each formulation, with FIGS. 8A (Experiment 1) and 8B (Experiment 2) representing plants grown in soil, and FIGS. 8C (Experiment 1) and 8D (Experiment 2) representing plants grown in the sand/soil mixture. The numbers on the x-axis refer to treatment numbers, and Table 10 shows how those treatment numbers correspond to the formulations from Table 9 for all of the Figures reported in this Example 5. Additionally, in these and subsequent figures, the rectangular box represents the distribution of the second and third quartile groups (i.e., the middle 50% of the results), and the bold line within that box represents the median. Any lines above and below the rectangular box represent the upper and lower quartile groups (i.e., the lowest 25% and the highest 25%), while any circles represent outliers.

The data shows that, in the two experiments conducted in soil, all plants treated with the inventive formulas had higher mean weights than the negative control mean weight. Additionally, treatments 6 and 7 had higher mean weights than the positive control: 2.93% and 0.87% higher, respectively, in Experiment 1; and 21.13% and 43.6% higher, respectively, in Experiment 2.

In the two experiments conducted in the sand/soil mixture, all plants treated with the inventive compositions also had higher mean weights than the negative control mean weight. Additionally, treatments 6, 7, and 8 had higher mean weights than the positive control: 5.41%, 17.15%, and 1.03% higher, respectively, in Experiment 1; and 39.31%, 10.21% and 9.01% higher, respectively, in Experiment 2.

2. Zinc Uptake

Figure 9A:
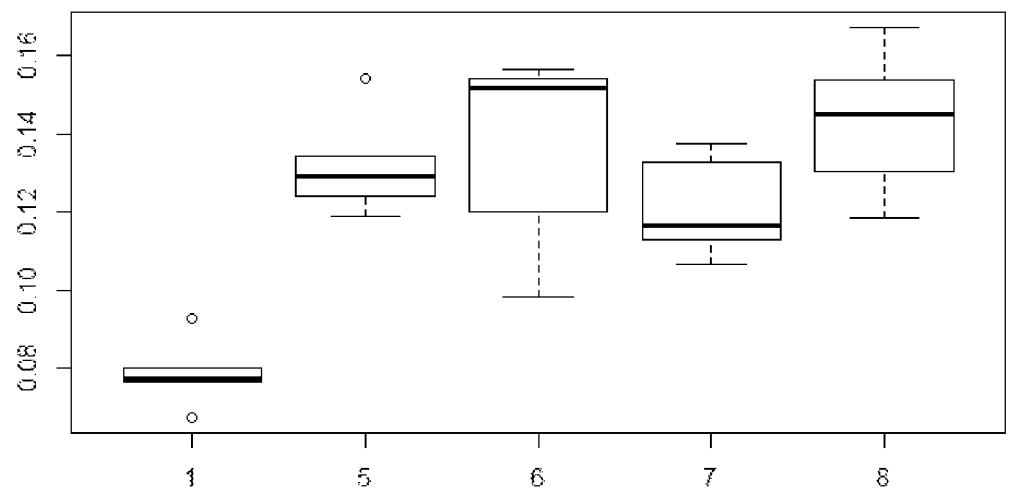
FIG. 9A is a graph comparing the zinc uptake of plants grown in soil with zinc formulations according to the disclosure to that of two control formulations (Example 5)
Figure 9B:
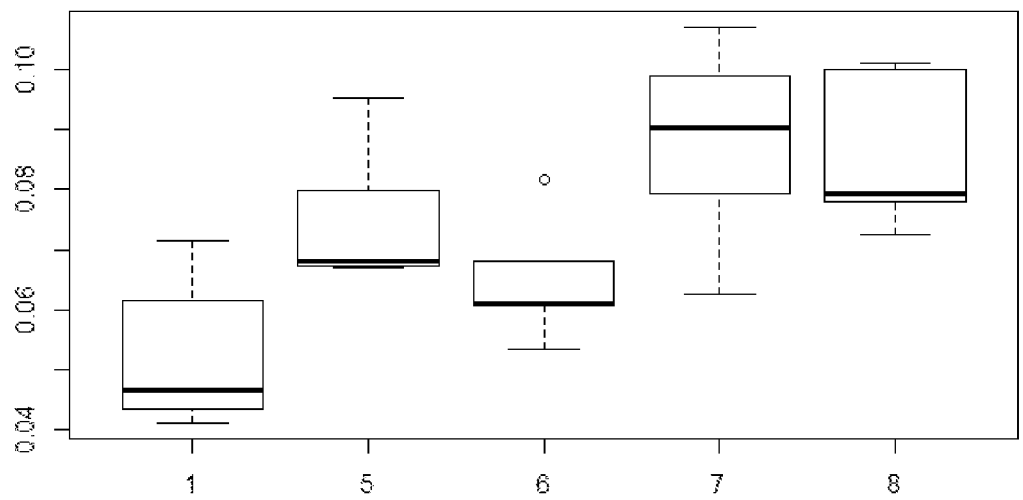
FIG. 9B is a graph comparing the zinc uptake of plants grown in soil with zinc formulations according to the disclosure to that of two control formulations (Example 5)
Figure 9C:
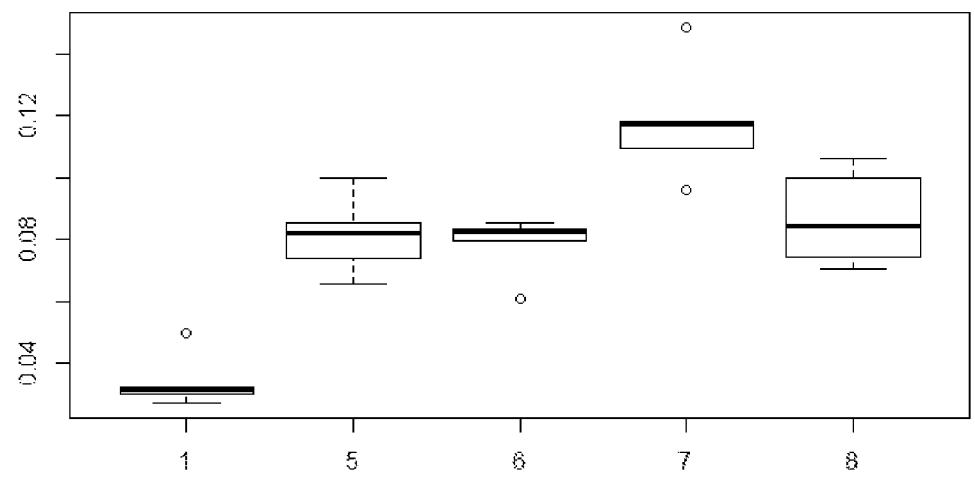
FIG. 9C is a graph comparing the zinc uptake of plants grown in a soil/sand mixture with zinc formulations according to the disclosure to that of two control formulations (Example 5)
Figure 9D:
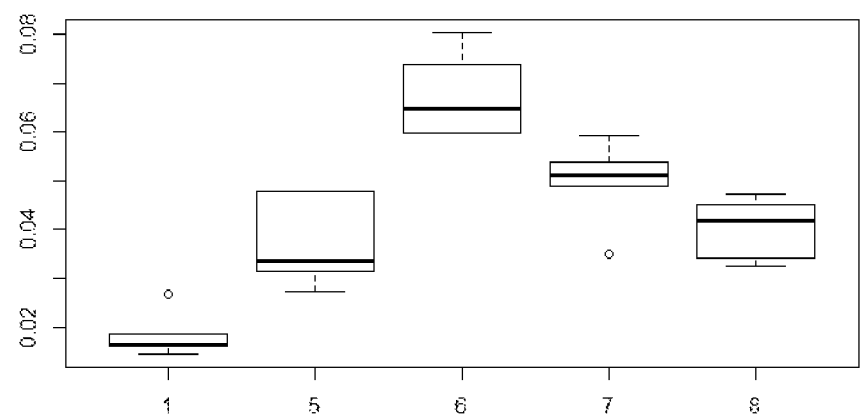
FIG. 9D is a graph comparing the zinc uptake of plants grown in a soil/sand mixture with zinc formulations according to the disclosure to that of two control formulations (Example 5)

FIGS. 9A-9D show the zinc uptake in milligrams (y-axis) for each formulation, with FIGS. 9A (Experiment 1) and 9B (Experiment 2) representing plants grown in soil, and FIGS. 9C (Experiment 1) and 9D (Experiment 2) representing plants grown in the sand/soil mixture.

In the two experiments conducted in soil, all inventive formulas provided more zinc to the plant (zinc uptake) than the negative control. Additionally, treatments 6 and 8 had higher mean zinc uptake than the positive control by 3.08% and 8.21%, respectively, in Experiment 1. Treatments 7 and 8 had higher mean zinc uptake than the positive control by 16.14% and 14.24%, respectively, in Experiment 2.

In the two experiments conducted in the sand soil mixture, all inventive formulas provided more zinc to the plant (zinc uptake) than the negative control. Additionally, treatments 7 and 8 had higher mean zinc uptake than the positive control by 45.04% and 6.99%, respectively, in Experiment 1. Treatments 6, 7, and 8 had higher mean zinc uptake than the positive control by 80.44%, 56.49%, and 25.21%, respectively, in Experiment 2.

3. Nitrogen Uptake

Figure 10A:
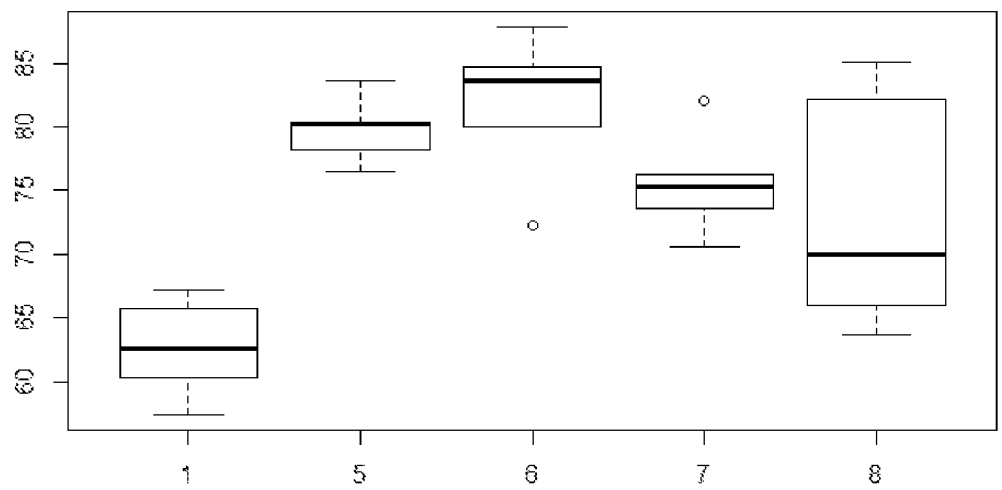
FIG. 10A is a graph comparing the nitrogen uptake of plants grown in soil with zinc formulations according to the disclosure to that of two control formulations (Example 5)
Figure 10B:
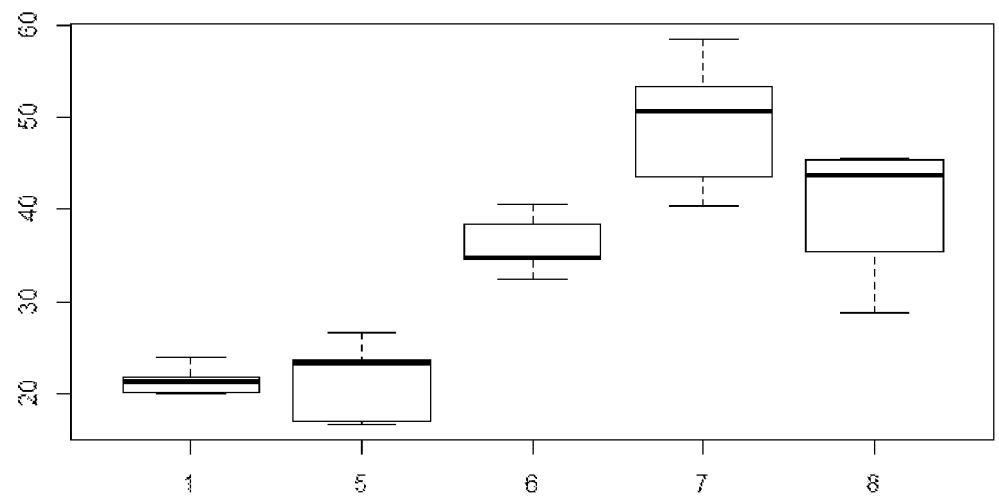
FIG. 10B is a graph comparing the nitrogen uptake of plants grown in soil with zinc formulations according to the disclosure to that of two control formulations (Example 5)
Figure 10C:
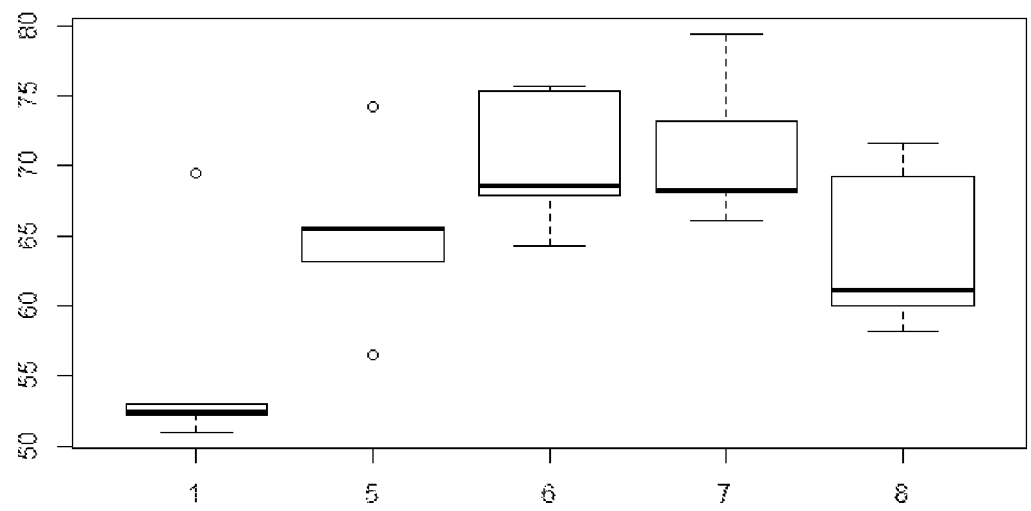
FIG. 10C is a graph comparing the nitrogen uptake of plants grown in a soil/sand mixture with zinc formulations according to the disclosure to that of two control formulations (Example 5)
Figure 10D:
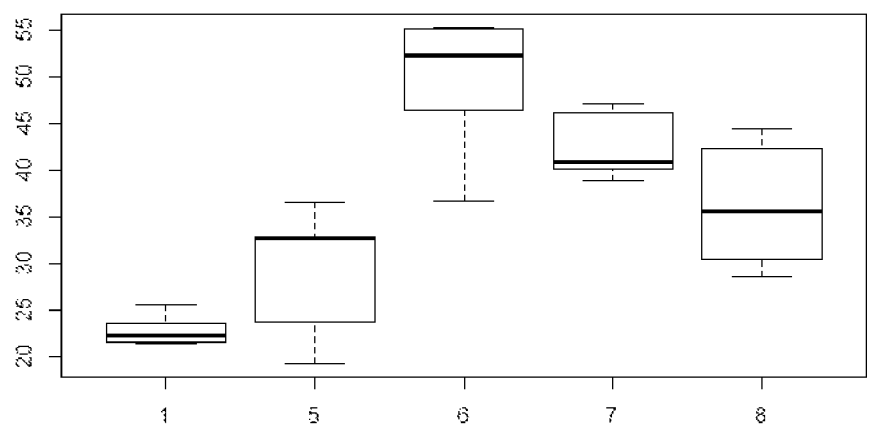
FIG. 10D is a graph comparing the nitrogen uptake of plants grown in a soil/sand mixture with zinc formulations according to the disclosure to that of two control formulations (Example 5)

FIGS. 10A-10D show the nitrogen uptake in milligrams (y-axis) for each formulation, with FIGS. 10A (Experiment 1) and 10B (Experiment 2) representing plants grown in soil, and FIGS. 10C (Experiment 1) and 10D (Experiment 2) representing plants grown in the sand/soil mixture.

In the two experiments conducted in soil, all inventive formulas provided more nitrogen to the plant (nitrogen uptake) than the negative control by at least 17% in Experiment 1 and by at least 68% in Experiment 2. In the sand/soil mixture, the inventive formulas provided more nitrogen to the plant (nitrogen uptake) than the negative control by at least 15% in Experiment 1 and by at least 83% in Experiment 2.

4. Potassium Uptake

Figure 1D:
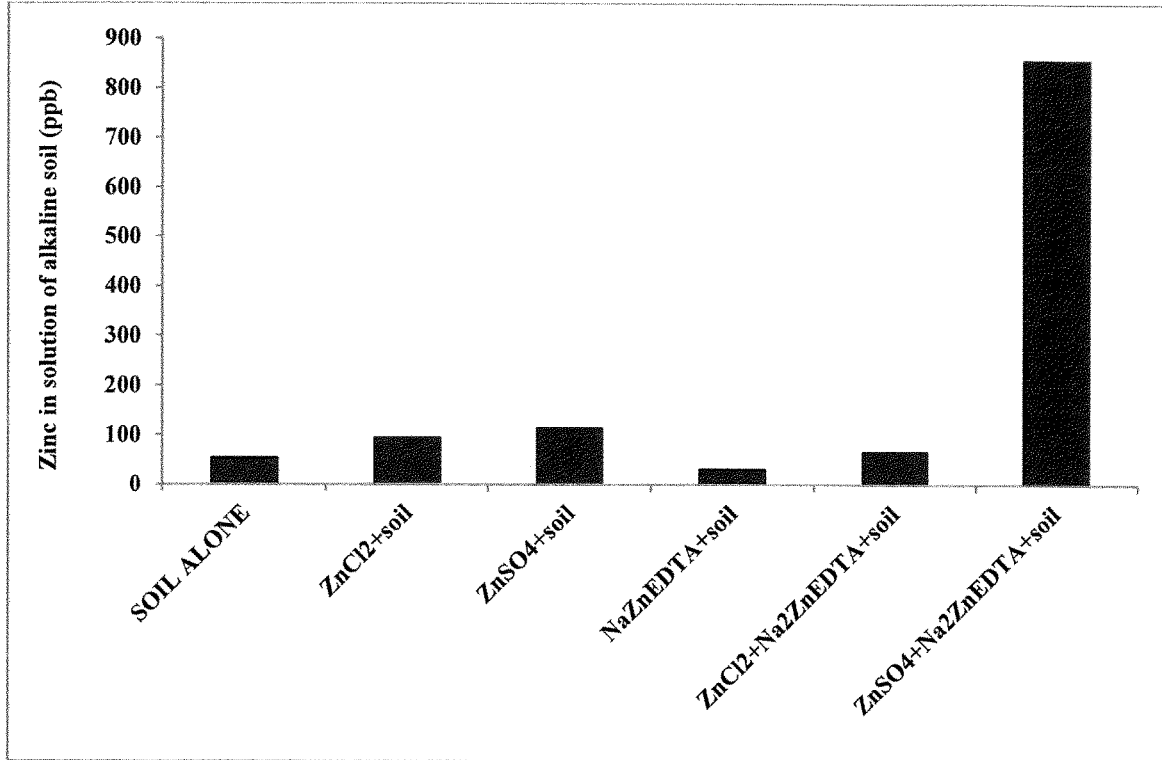
FIG. 1D is a graph comparing the performance of an inventive Zn formulation in alkaline soil to that of several other formulations as described in Example 1.
Figure 2A:
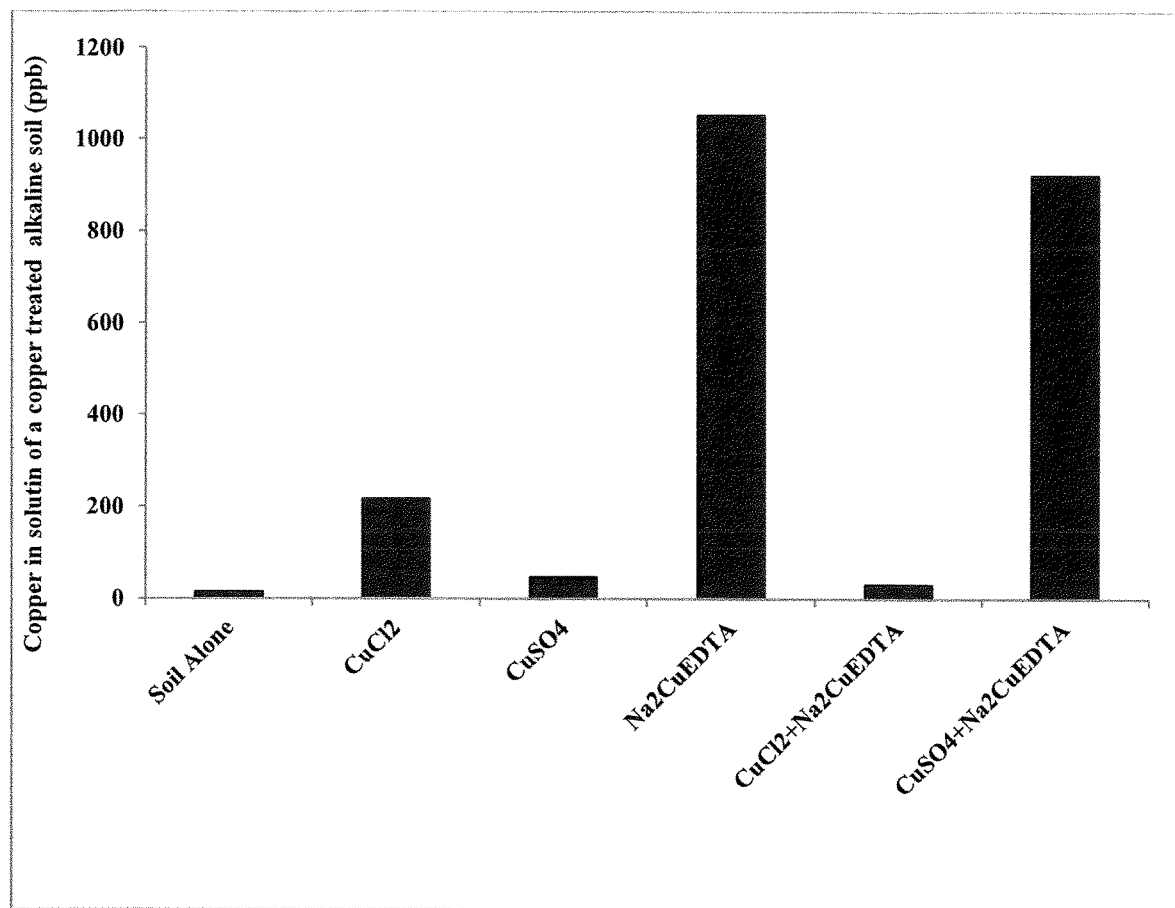
FIG. 2A is a graph comparing the performance of an inventive Cu formulation in alkaline soil to that of several other formulations as described in Example 1.
Figure 2B:
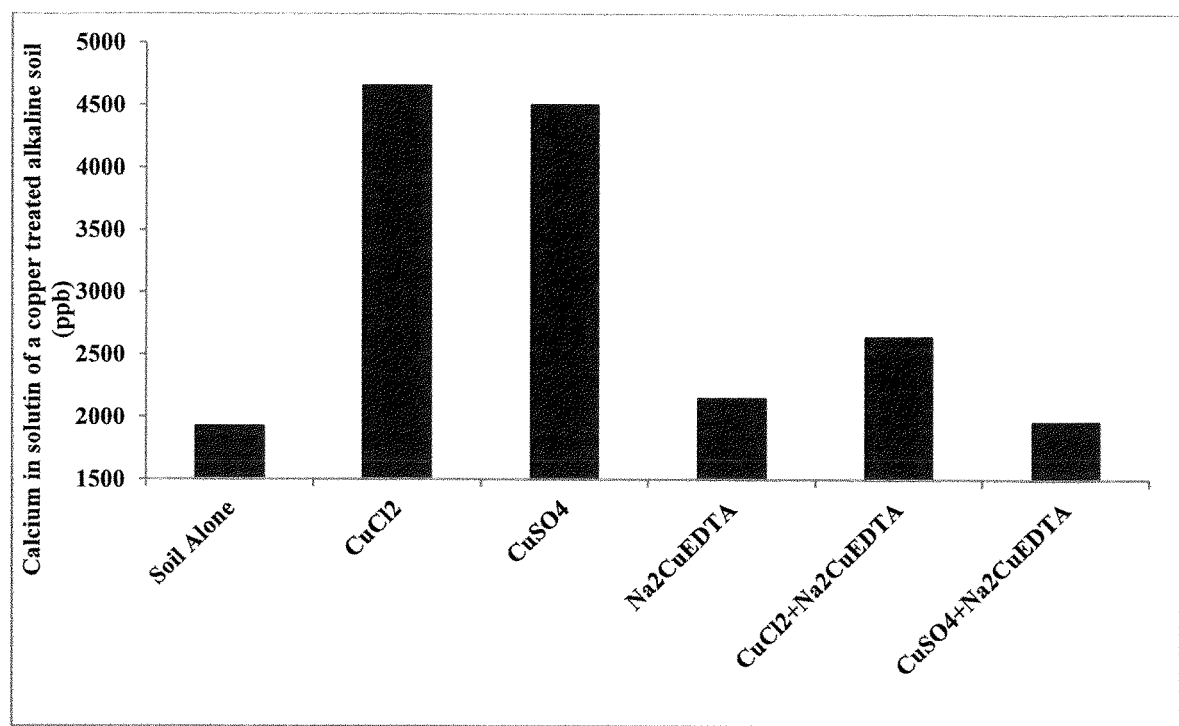
FIG. 2B is a graph comparing the performance of an inventive Cu formulation in alkaline soil to that of several other formulations as described in Example 1.
Figure 2C:
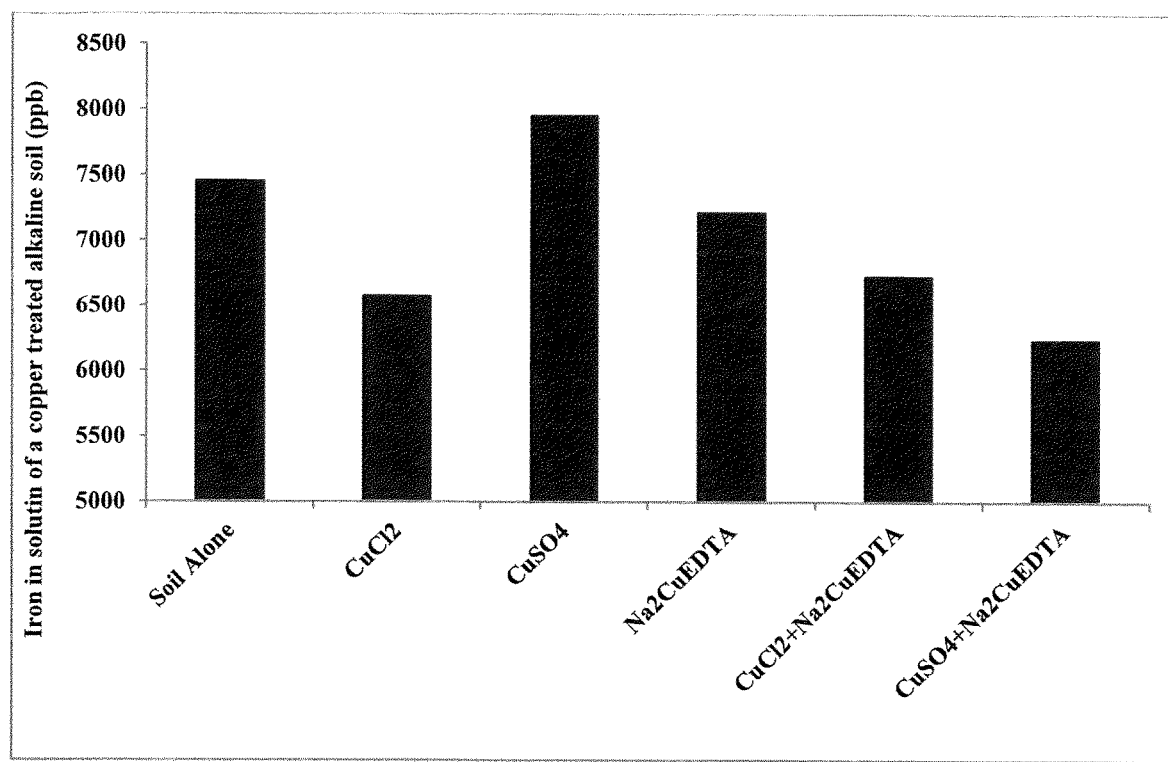
FIG. 2C is a graph comparing the performance of an inventive Cu formulation in alkaline soil to that of several other formulations as described in Example 1.
Figure 2D:
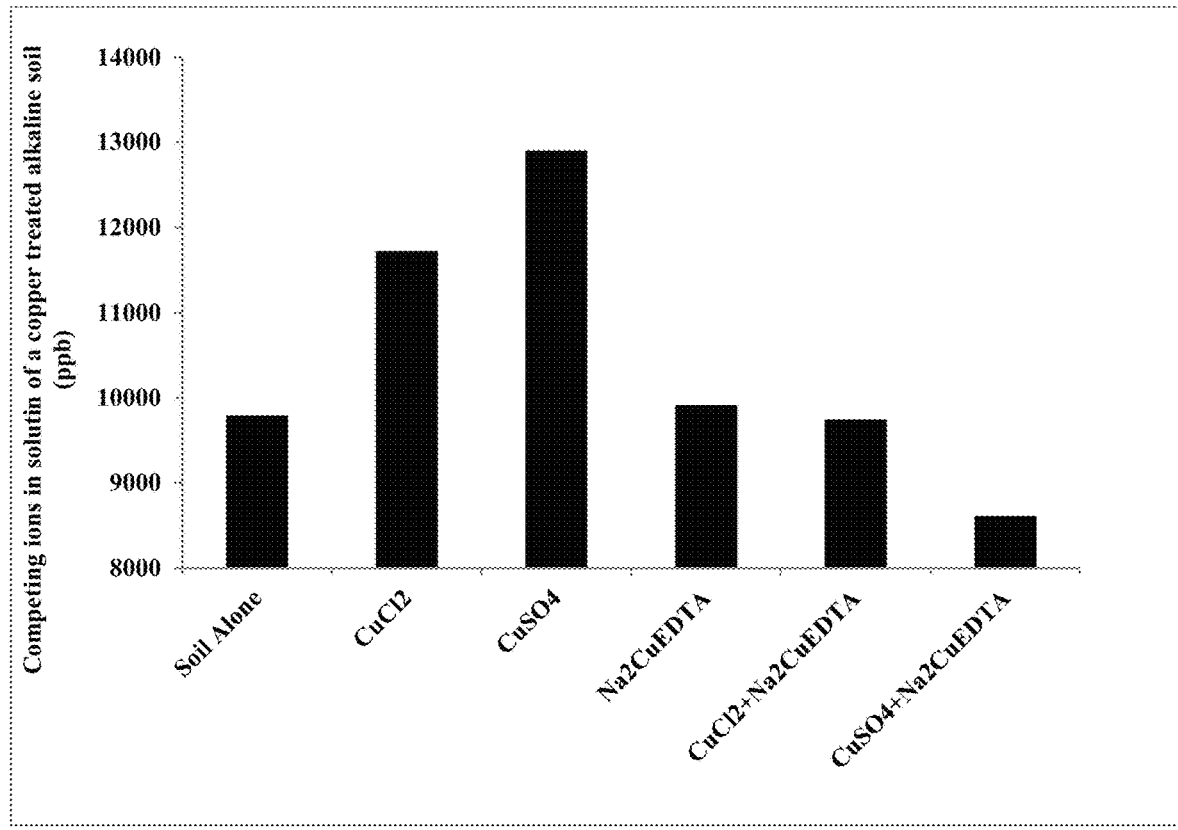
FIG. 2D is a graph comparing the performance of an inventive Cu formulation in alkaline soil to that of several other formulations as described in Example 1.
Figure 3A:
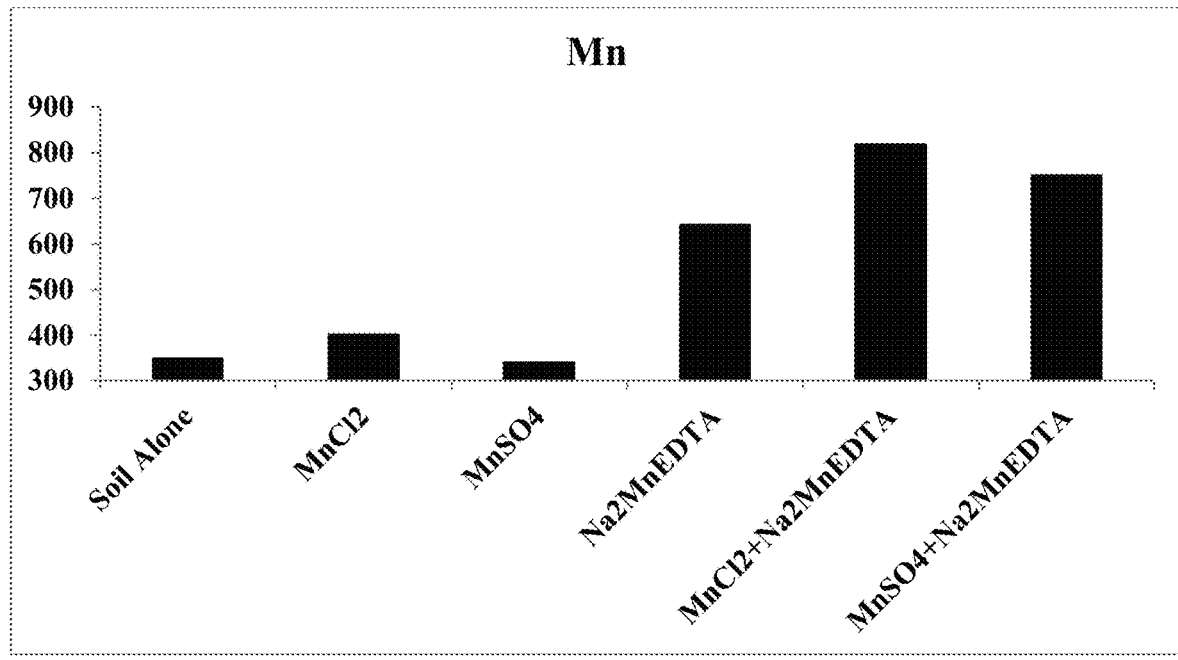
FIG. 3A is a graph comparing the performance of an inventive Mn formulation in alkaline soil to that of several other formulations as described in Example 1.
Figure 3B:
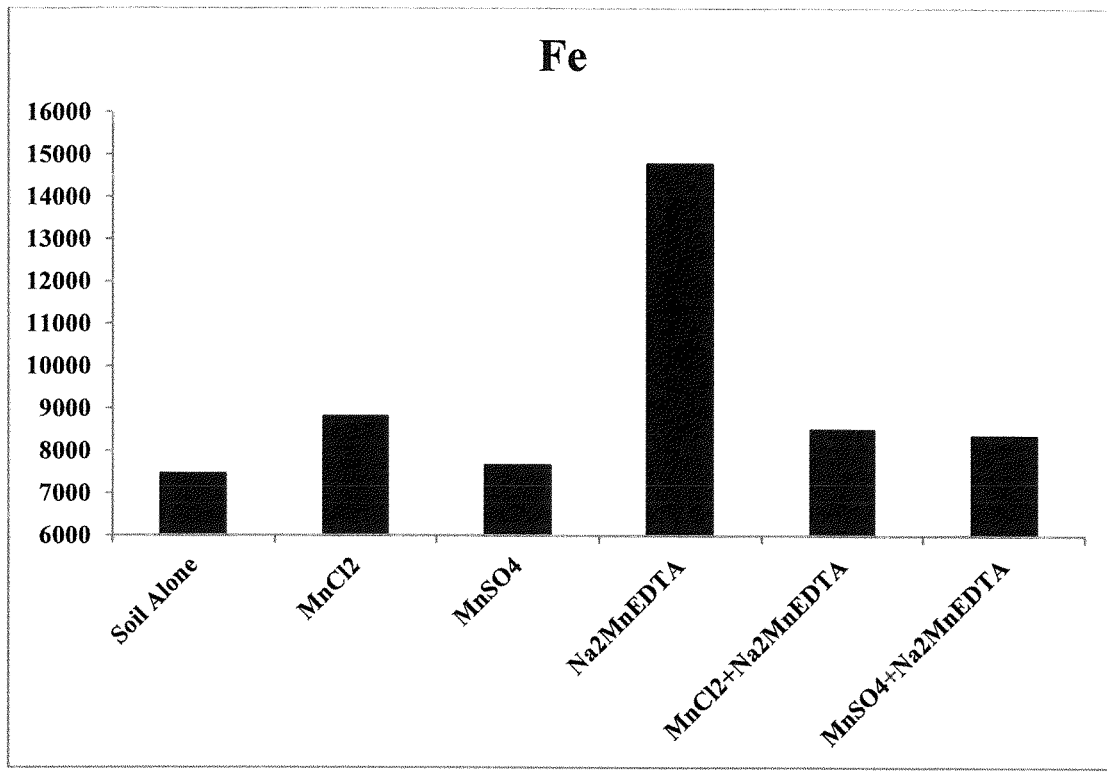
FIG. 3B is a graph comparing the performance of an inventive Mn formulation in alkaline soil to that of several other formulations as described in Example 1.
Figure 3C:
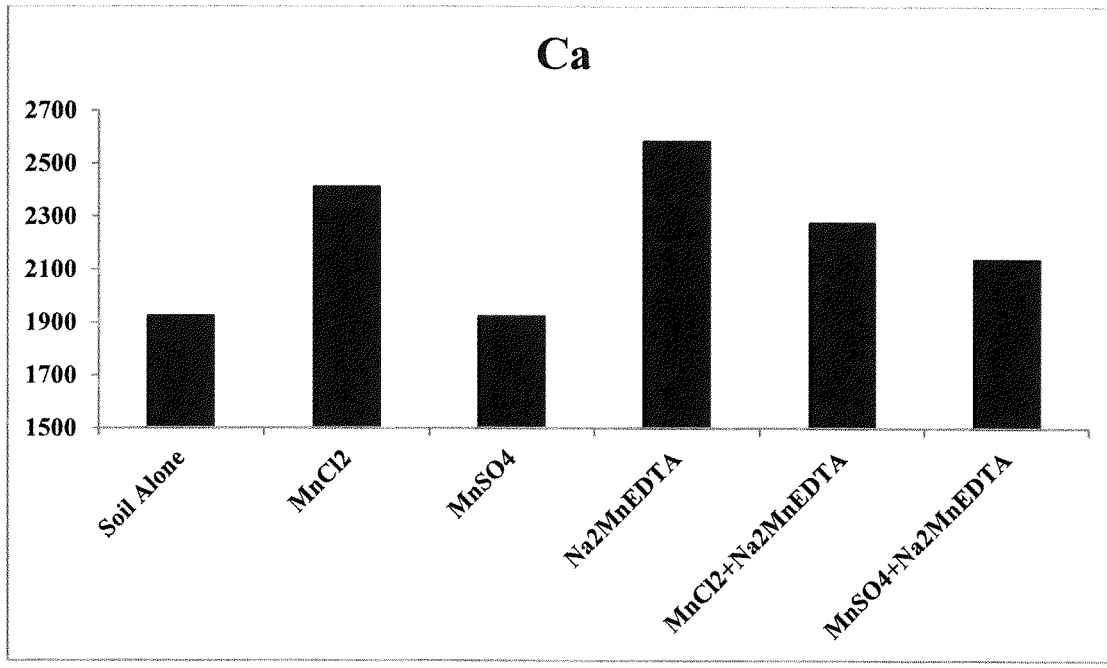
FIG. 3C is a graph comparing the performance of an inventive Mn formulation in alkaline soil to that of several other formulations as described in Example 1.
Figure 3D:
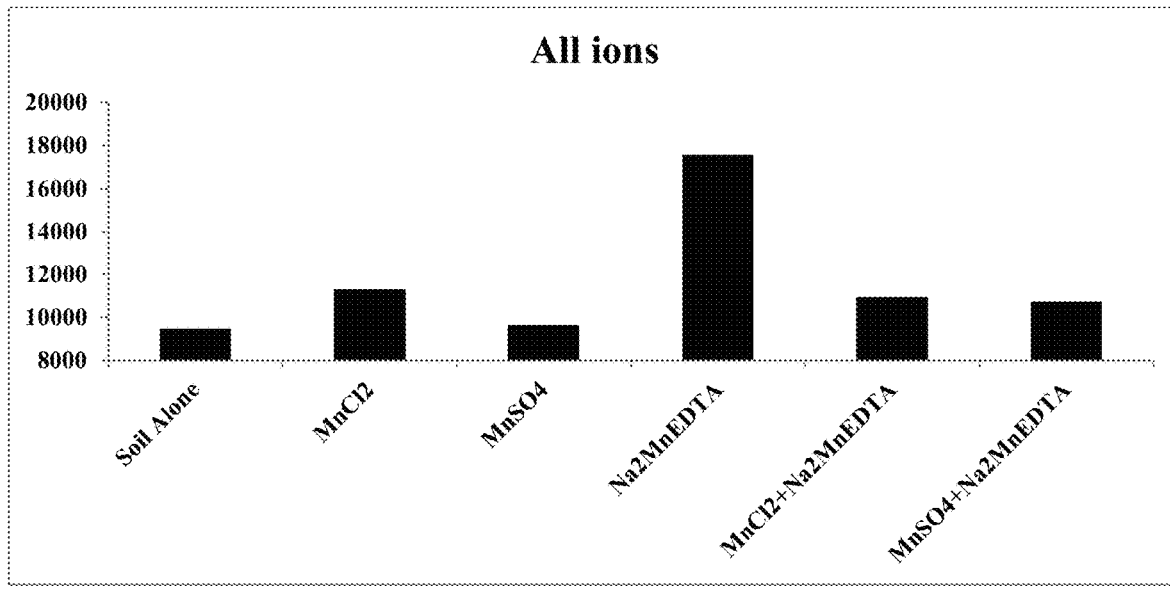
FIG. 3D is a graph comparing the performance of an inventive Mn formulation in alkaline soil to that of several other formulations as described in Example 1.
Figure 4A:
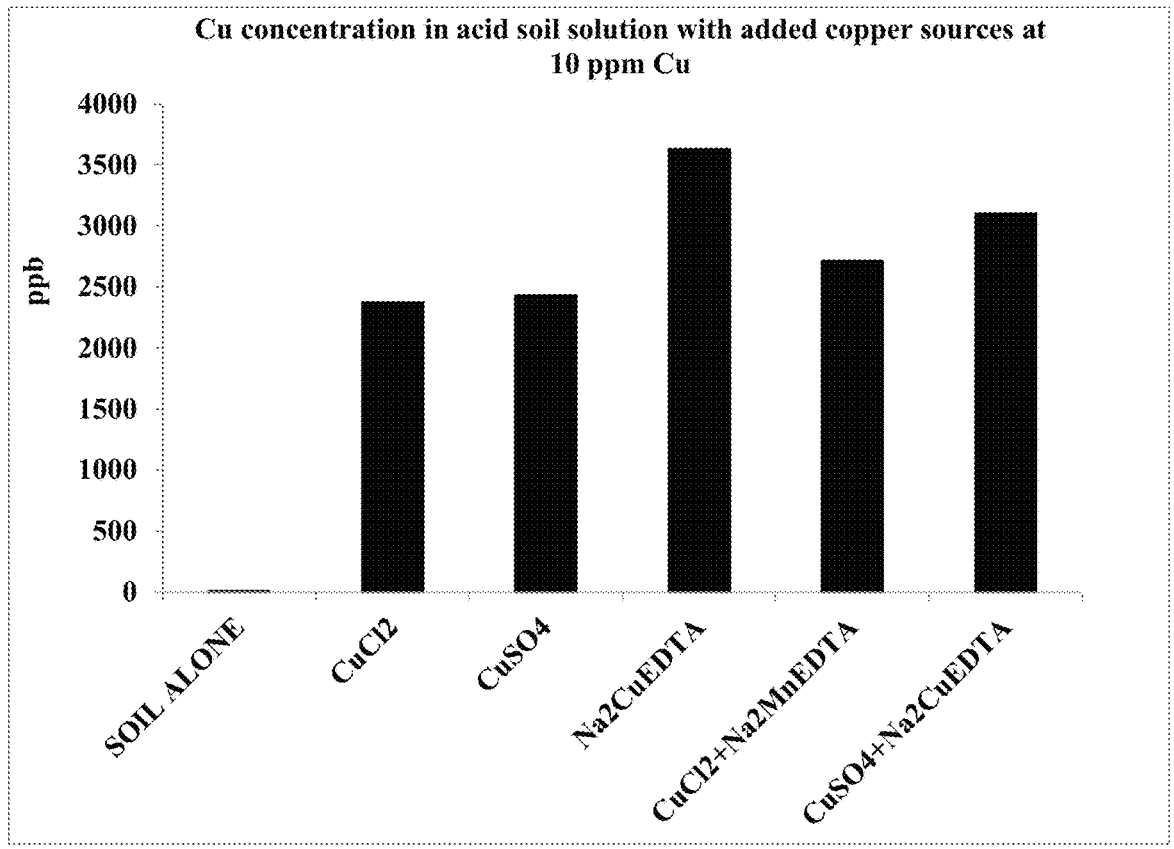
FIG. 4A is a graph comparing the performance of an inventive Cu formulation in acidic soil to that of several other formulations as described in Example 2.
Figure 4B:
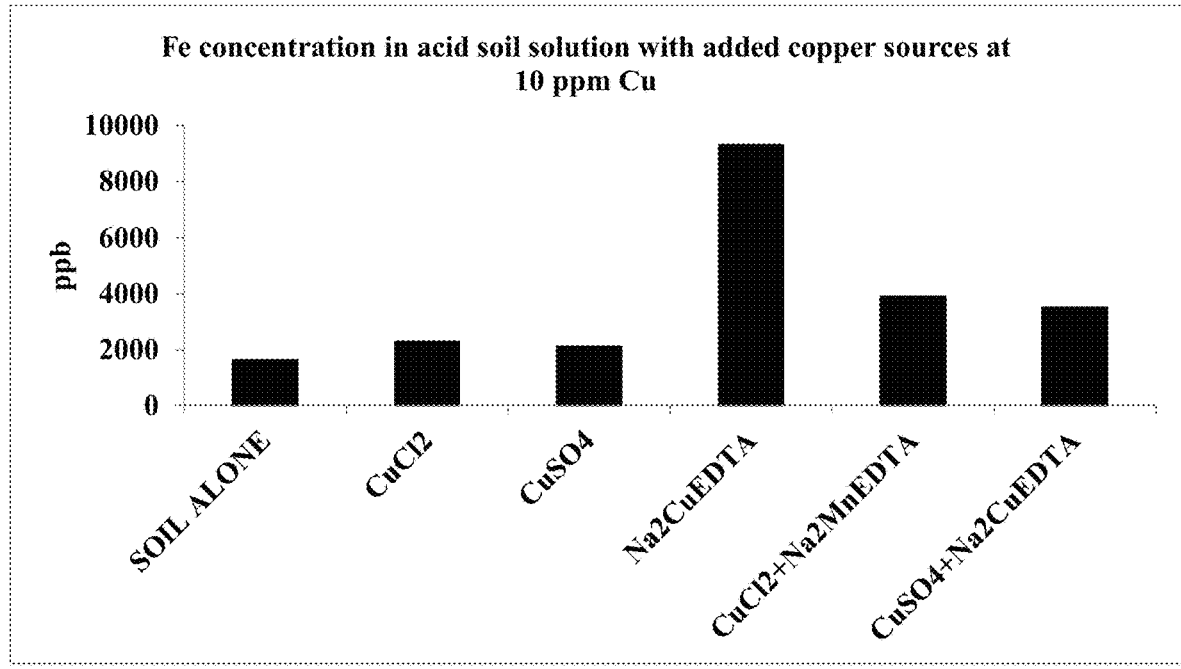
FIG. 4B is a graph comparing the performance of an inventive Cu formulation in acidic soil to that of several other formulations as described in Example 2.
Figure 4C:
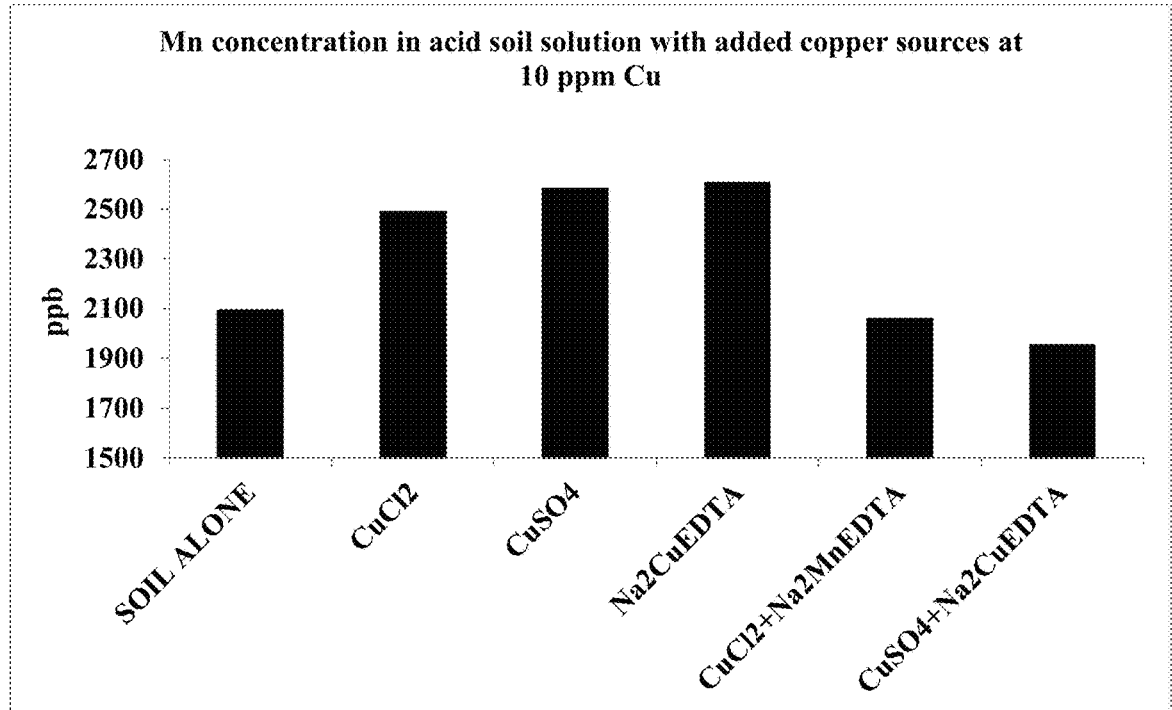
FIG. 4C is a graph comparing the performance of an inventive Cu formulation in acidic soil to that of several other formulations as described in Example 2.
Figure 11A:
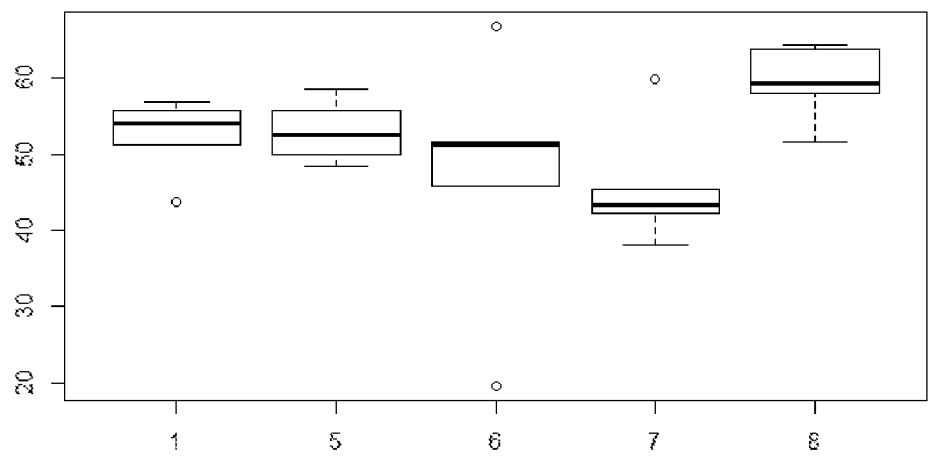
FIG. 11A is a graph comparing the potassium uptake of plants grown in soil with zinc formulations according to the disclosure to that of two control formulations (Example 5)
Figure 11B:
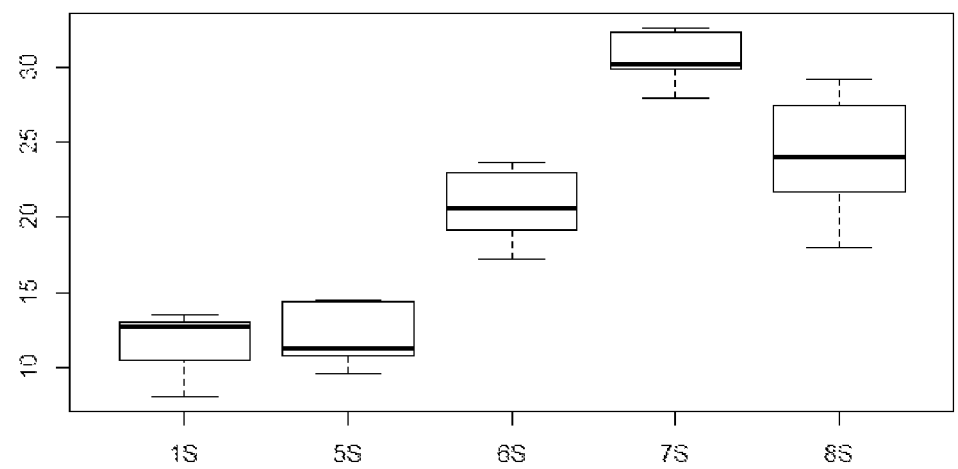
FIG. 11B is a graph comparing the potassium uptake of plants grown in soil with zinc formulations according to the disclosure to that of two control formulations (Example 5)
Figure 11C:
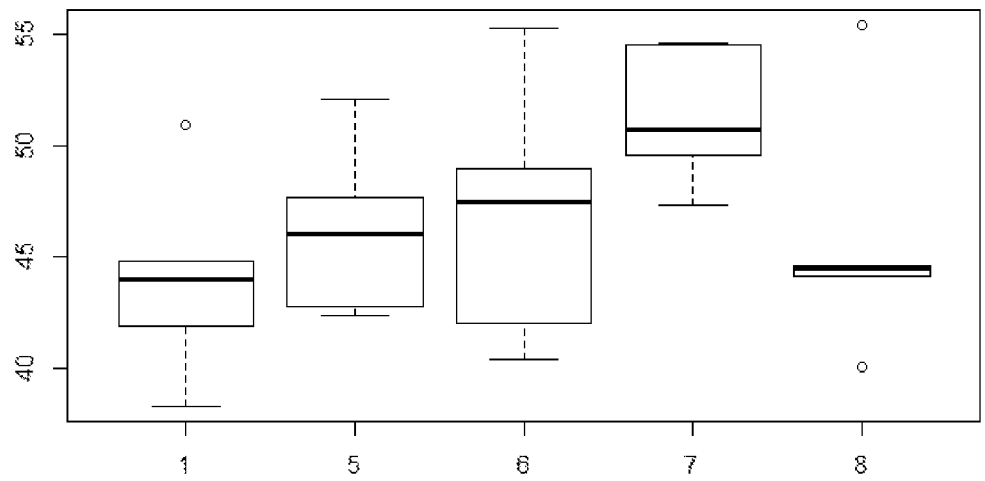
FIG. 11C is a graph comparing the potassium uptake of plants grown in a soil/sand mixture with zinc formulations according to the disclosure to that of two control formulations (Example 5)
Figure 11D:
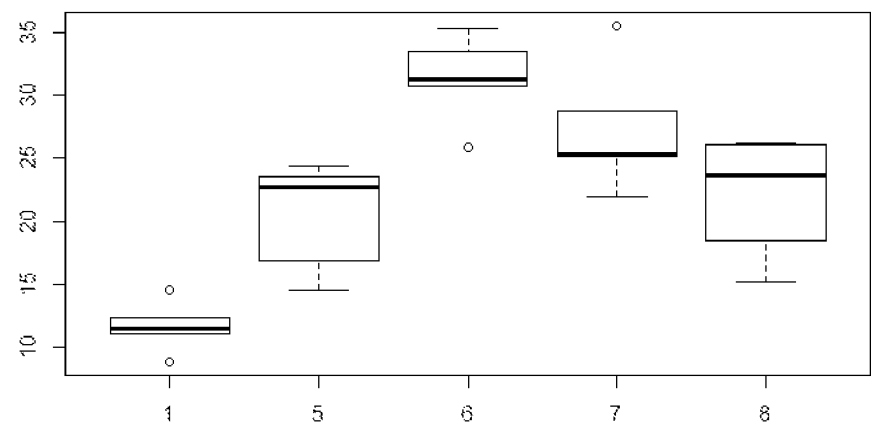
FIG. 11D is a graph comparing the potassium uptake of plants grown in a soil/sand mixture with zinc formulations according to the disclosure to that of two control formulations (Example 5)

FIGS. 11A-1D show the potassium uptake in milligrams (y-axis) for each formulation, with FIGS. 11A (Experiment 1) and 11B (Experiment 2) representing plants grown in soil, and FIGS. 11C (Experiment 1) and 11D (Experiment 2) representing plants grown in the sand/soil mixture.

In the two experiments conducted in soil, treatments 6 and 7 provided less potassium to the plant (potassium uptake) than the negative control by about 12% in Experiment 1. However, in Experiment 2, all new formulas provided more potassium to the plant than the negative control by at least 78%.

In the two experiments conducted in the sand/soil mixture, all new formulas provided more potassium to the plant (potassium uptake) than the negative control by at least 3.99% in Experiment 1, and by at least 114% in Experiment 2.

TABLE 10-continued

| Treatment # | Control Type or Table 9 Formula # |
|---|---|
| 7 | Formula 7 |
| 8 | Formula 9 |

Example 6

Mn Formulation Testing, Results, and Discussion

Nine formulations according to the disclosure as well as a positive control were prepared by mixing together the ingredients of Table 11. Formulas 1, 7, and 9 and the positive control were separately coated on NPK. Corn seed was planted, grown, harvested, and tested, all as described in Example 4. In all experiments, 2 ppm of manganese was administered.

1. Plant Weight

Figure 12A:
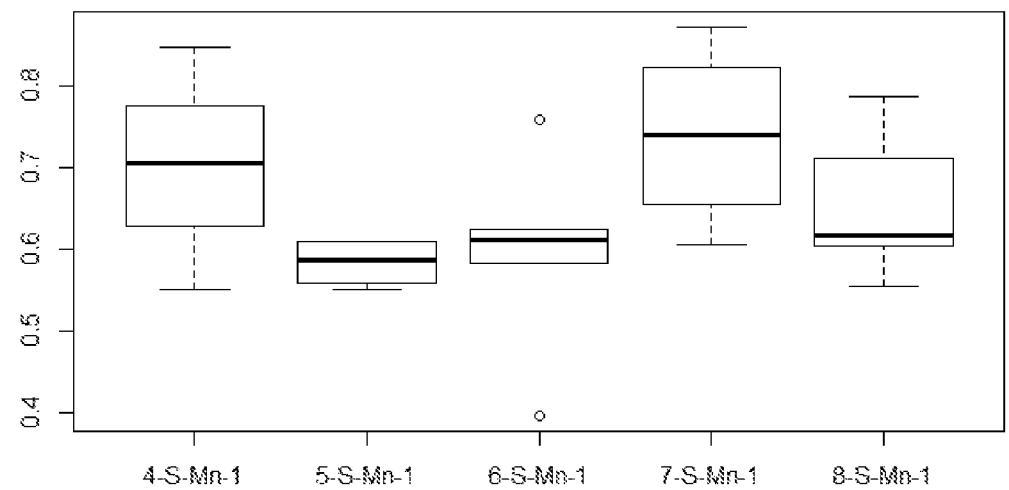
FIG. 12A is a graph comparing the total dry weights of plants grown in soil with manganese formulations according to the disclosure to that of two control formulations (Example 6)
Figure 12B:
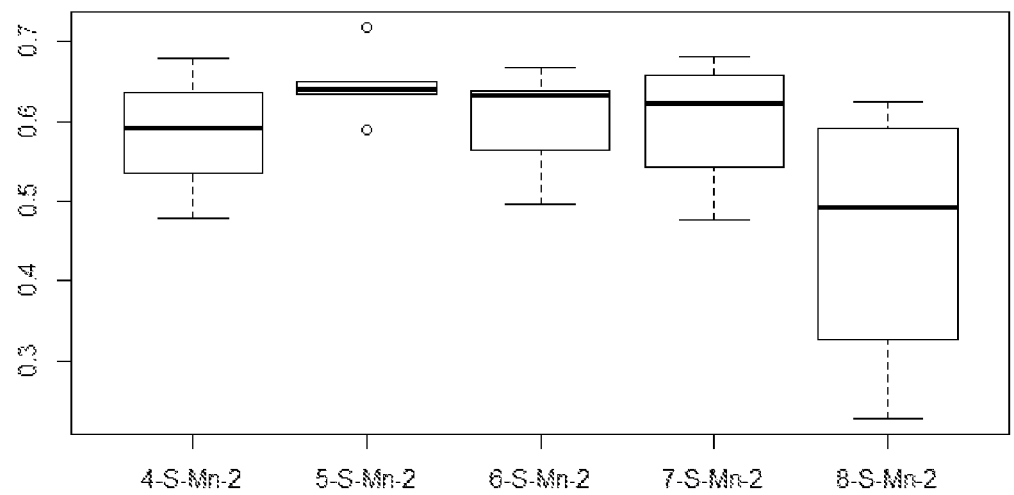
FIG. 12B is a graph comparing the total dry weights of plants grown in soil with manganese formulations according to the disclosure to that of two control formulations (Example 6)
Figure 12C:
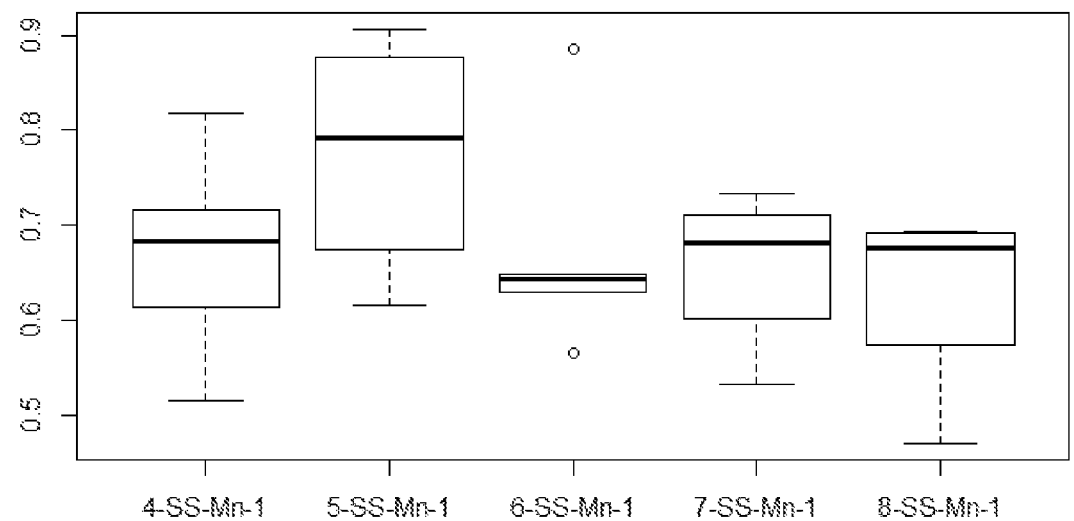
FIG. 12C is a graph comparing the total dry weights of plants grown in a soil/sand mixture with manganese formulations according to the disclosure to that of two control formulations (Example 6)
Figure 12D:
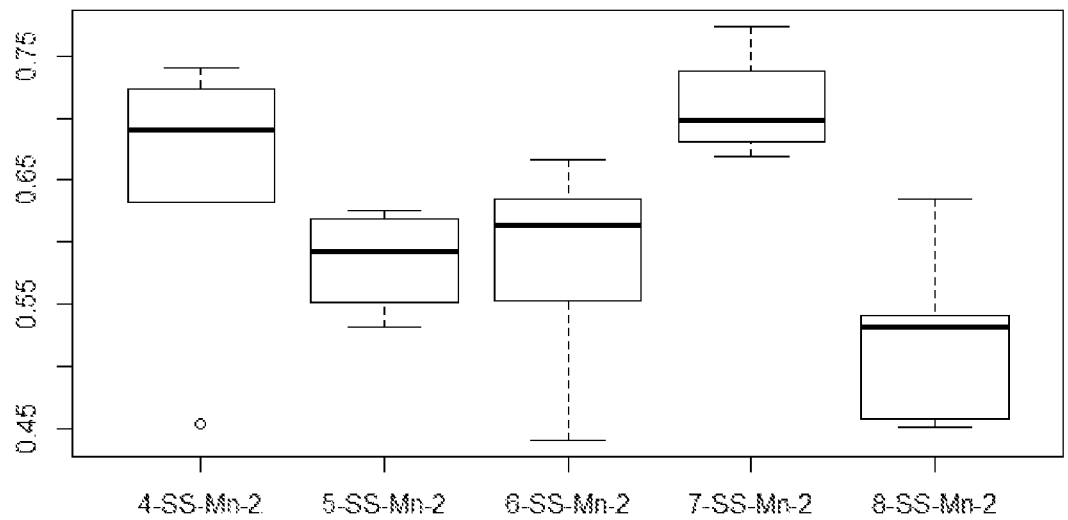
FIG. 12D is a graph comparing the total dry weights of plants grown in a soil/sand mixture with manganese formulations according to the disclosure to that of two control formulations (Example 6)

FIGS. 12A-12D show the total dry weights in grams (y-axis) for each formulation, with FIGS. 12A and 12B representing plants grown in soil, and FIGS. 12C and 12D representing plants grown in the sand/soil mixture. Table 12 shows how the treatment numbers on the x-axis correspond to the formulations from Table 11 for all of the Figures reported in this Example 6.

The data shows that in the two experiments conducted in soil, treatment 7 had a higher mean weight than the negative control mean weight by 12.89% in Experiment 1 and by 30.64% in Experiment 2. Additionally, treatment 7 had a higher mean weight than the positive control by 5.42% and 2.91%. In the sand/soil mixture, all plants treated with inventive formulas had higher mean weights than the negative control mean weight by at least 5.72% in Experiment 1 and 11.24% in Experiment 2.

TABLE 9

| Raw Materials | Positive Control | Formula 1 | Formula 2 | Formula 3 | Formula 4 | Formula 5 | Formula 6 | Formula 7 | Formula 8 | Formula 9 |
|---|---|---|---|---|---|---|---|---|---|---|
| Zinc Oxide | 68.00% | 62.00% | 56.00% | 50.00% | 54.00% | 48.00% | 42.00% | 61.00% | 57.00% | 58.00% |
| Zinc Sulfate Monohydrate | 26.40% | 24.00% | 24.00% | 24.00% | 18.00% | 18.00% | 18.00% | 24.00% | 24.00% | 24.00% |
| Zn Kellus[A] | 0.00% | 2.00% | 2.00% | 2.00% | 16.00% | 16.00% | 16.00% | 3.00% | 3.00% | 6.00% |
| Zn Hydroxide Carbonate | 0.00% | 2.00% | 2.00% | 2.00% | 2.00% | 2.00% | 2.00% | 2.00% | 2.00% | 2.00% |
| Morwet D-425[B] | 3.00% | 2.00% | 2.00% | 2.00% | 2.00% | 2.00% | 2.00% | 2.00% | 2.00% | 2.00% |
| Humic Acid | 0.00% | 2.00% | 8.00% | 14.00% | 2.00% | 8.00% | 14.00% | 2.00% | 2.00% | 2.00% |
| Sipernat ® 22S[C] | 0.00% | 2.00% | 2.00% | 2.00% | 3.50% | 3.50% | 3.50% | 2.00% | 0.00% | 0.00% |
| Potassium Silicate | 0.00% | 4.00% | 4.00% | 4.00% | 2.50% | 2.50% | 2.50% | 0.00% | 10.00% | 6.00% |
| Calcium Silicate | 0.00% | 0.00% | 0.00% | 0.00% | 0.00% | 0.00% | 0.00% | 4.00% | 0.00% | 0.00% |
| Sugar | 2.40% | 0.00% | 0.00% | 0.00% | 0.00% | 0.00% | 0.00% | 0.00% | 0.00% | 0.00% |
| Synthetic Iron Oxide | 0.20% | 0.00% | 0.00% | 0.00% | 0.00% | 0.00% | 0.00% | 0.00% | 0.00% | 0.00% |
| WS % Zn | 9.37% | 8.82% | 8.82% | 8.82% | 8.79% | 8.79% | 8.79% | 8.97% | 8.97% | 9.42% |
| IS % Zn | 53.72% | 50.16% | 45.42% | 40.68% | 43.84% | 39.10% | 34.36% | 49.37% | 46.21% | 47.00% |
| Total % Zn | 63.09% | 58.98% | 54.24% | 49.50% | 52.63% | 47.89% | 43.15% | 58.34% | 55.18% | 56.42% |
| % Si | 0.00% | 1.66% | 1.66% | 1.66% | 2.09% | 2.09% | 2.09% | 1.90% | 1.82% | 1.09% |
| % Total | 100.00% | 100.00% | 100.00% | 100.00% | 100.00% | 100.00% | 100.00% | 100.00% | 100.00% | 100.00% |

[A] Zn chelated with EDTA, available from Compass Minerals.
[B] Dispersant available from Akzo Nobel.
[C] Flow aid and anti-caking agent available from Evonik.

TABLE 10

| Treatment # | Control Type or Table 9 Formula # |
|---|---|
| 1 | Negative Control (NPK only; no Zn) |
| 5 | Positive Control |
| 6 | Formula 1 |

2. Manganese Uptake

Figure 13A:
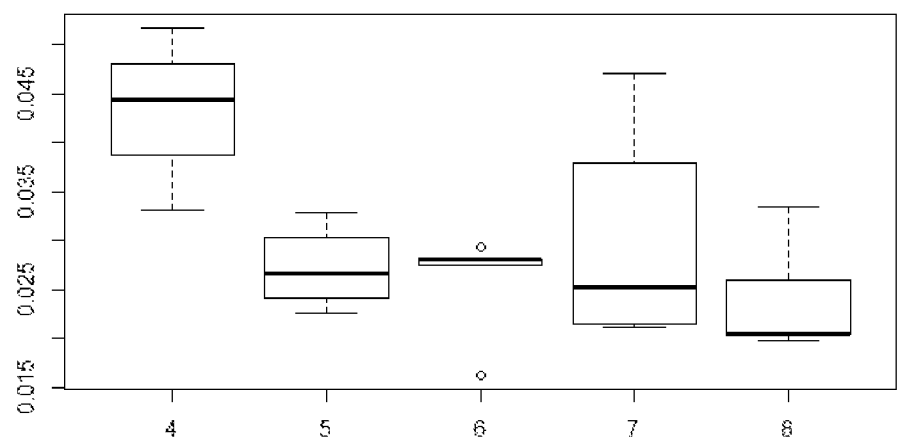
FIG. 13A is a graph comparing the manganese uptake of plants grown in soil with manganese formulations according to the disclosure to that of two control formulations (Example 6)
Figure 13B:
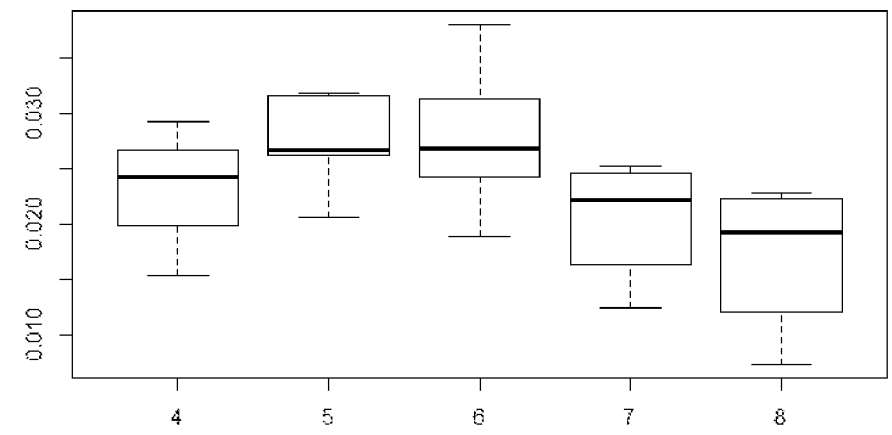
FIG. 13B is a graph comparing the manganese uptake of plants grown in soil with manganese formulations according to the disclosure to that of two control formulations (Example 6)
Figure 13C:
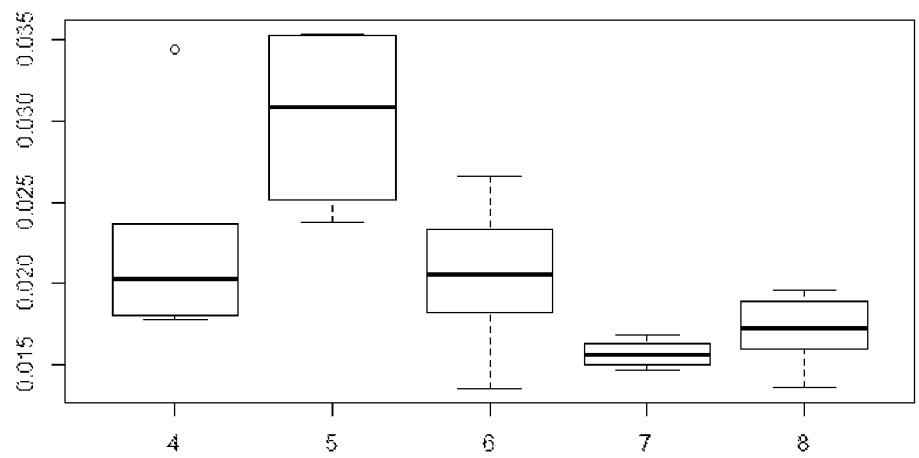
FIG. 13C is a graph comparing the manganese uptake of plants grown in a soil/sand mixture with manganese formulations according to the disclosure to that of two control formulations (Example 6)
Figure 13D:
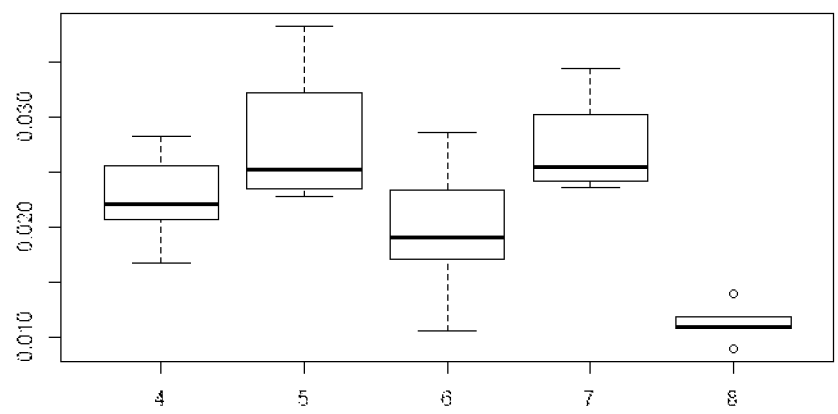
FIG. 13D is a graph comparing the manganese uptake of plants grown in a soil/sand mixture with manganese formulations according to the disclosure to that of two control formulations (Example 6)

FIGS. 13A-13D show the manganese uptake in milligrams (y-axis) for each formulation, with FIGS. 13A and 13B representing plants grown in soil, and FIGS. 13C and 13D representing plants grown in the sand/soil mixture.

In the two experiments conducted in soil, the inventive formulas provided more manganese to the plant than the negative control by at least 7.59% in Experiment 1 and 19.08% in Experiment 2. In the sand/soil mixture, treatments 5 and 6 provided more manganese to the plant than the negative control by 76.63% and 19.73% in Experiment 1 and by 145% and 74% in Experiment 2.

3. Nitrogen Uptake

Figure 14A:
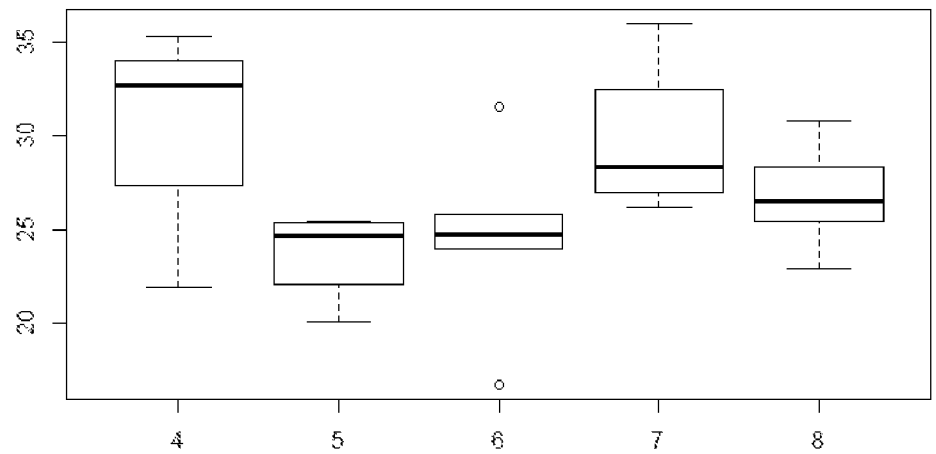
FIG. 14A is a graph comparing the nitrogen uptake of plants grown in soil with manganese formulations according to the disclosure to that of two control formulations (Example 6)
Figure 14B:
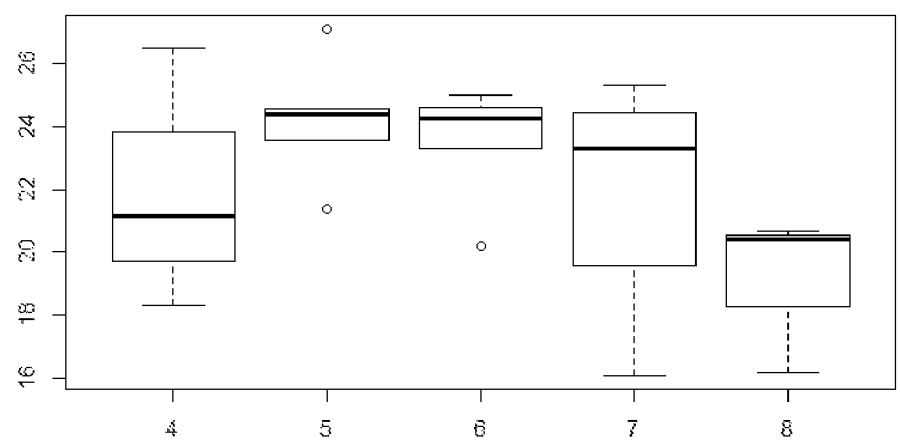
FIG. 14B is a graph comparing the nitrogen uptake of plants grown in soil with manganese formulations according to the disclosure to that of two control formulations (Example 6)
Figure 14C:
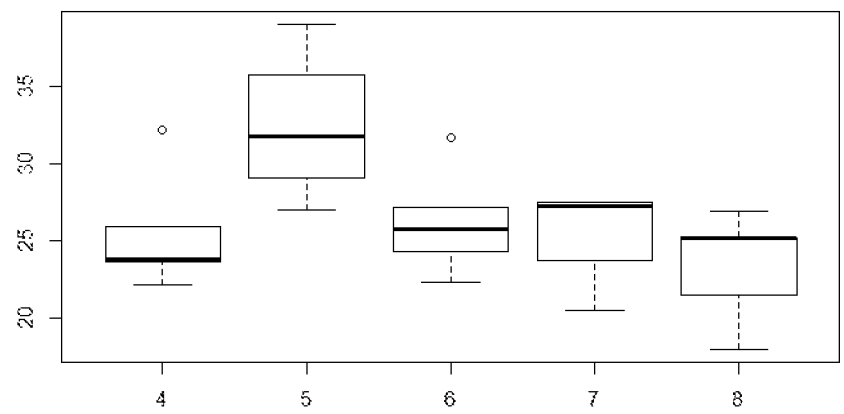
FIG. 14C is a graph comparing the nitrogen uptake of plants grown in a soil/sand mixture with manganese formulations according to the disclosure to that of two control formulations (Example 6)
Figure 14D:
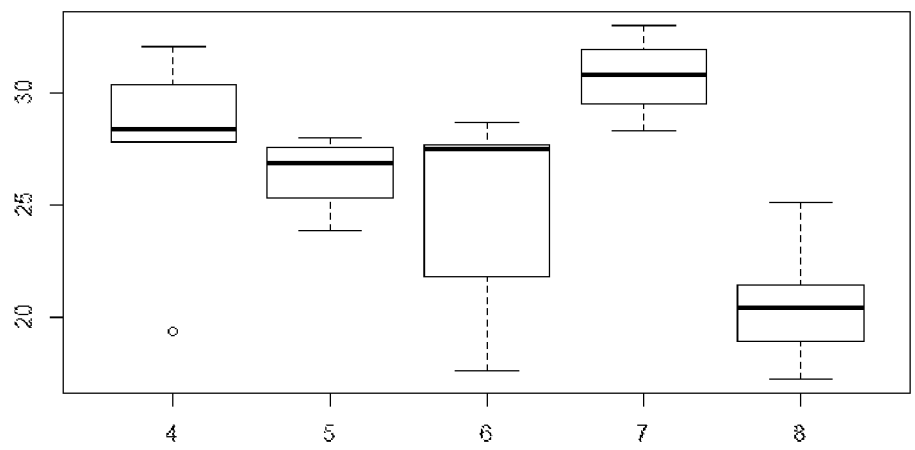
FIG. 14D is a graph comparing the nitrogen uptake of plants grown in a soil/sand mixture with manganese formulations according to the disclosure to that of two control formulations (Example 6)

FIGS. 14A-14D show the nitrogen uptake in milligrams (y-axis) for each formulation, with FIGS. 14A and 14B representing plants grown in soil, and FIGS. 14C and 14D representing plants grown in the sand/soil mixture.

In Experiment 1 in soil, treatment 7 provided more nitrogen than negative control by 10.97%. In Experiment 2 in soil, all inventive formulas provided more nitrogen than the negative control by at least 15.27%. In the sand/soil mixture experiments, all inventive formulas provided more nitrogen to the plant than the negative control by at least 9.84% in Experiment 1, and by at least 19.49% in Experiment 2.

1. Plant Weight

Figure 15A:
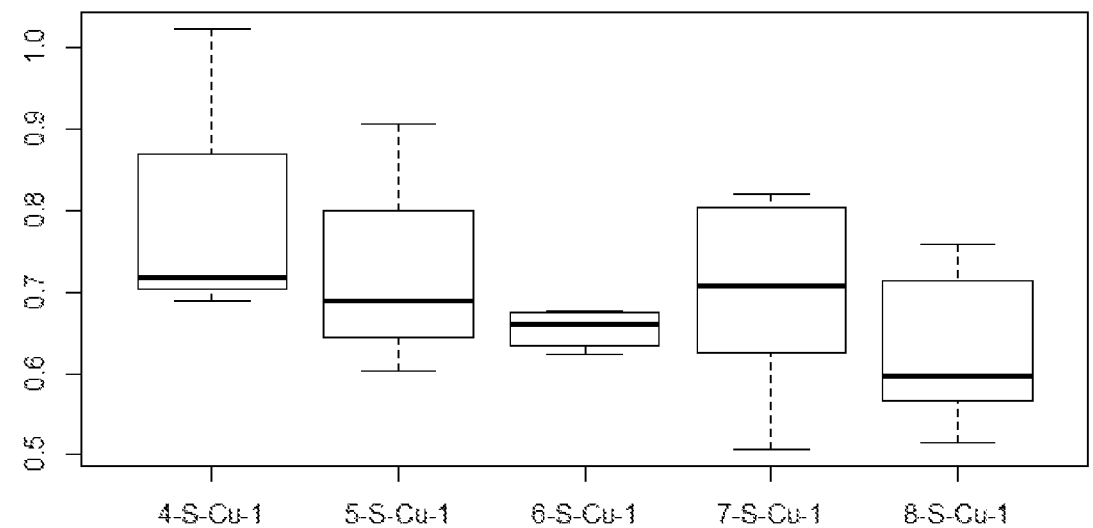
FIG. 15A is a graph comparing the total dry weights of plants grown in soil with copper formulations according to the disclosure to that of two control formulations (Example 7)
Figure 15B:
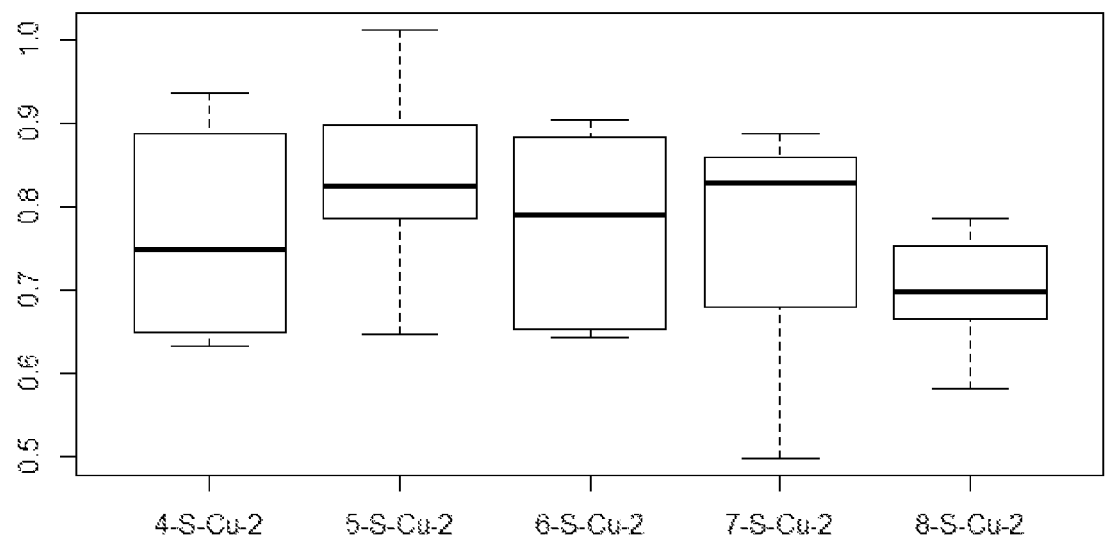
FIG. 15B is a graph comparing the total dry weights of plants grown in soil with copper formulations according to the disclosure to that of two control formulations (Example 7)
Figure 15C:
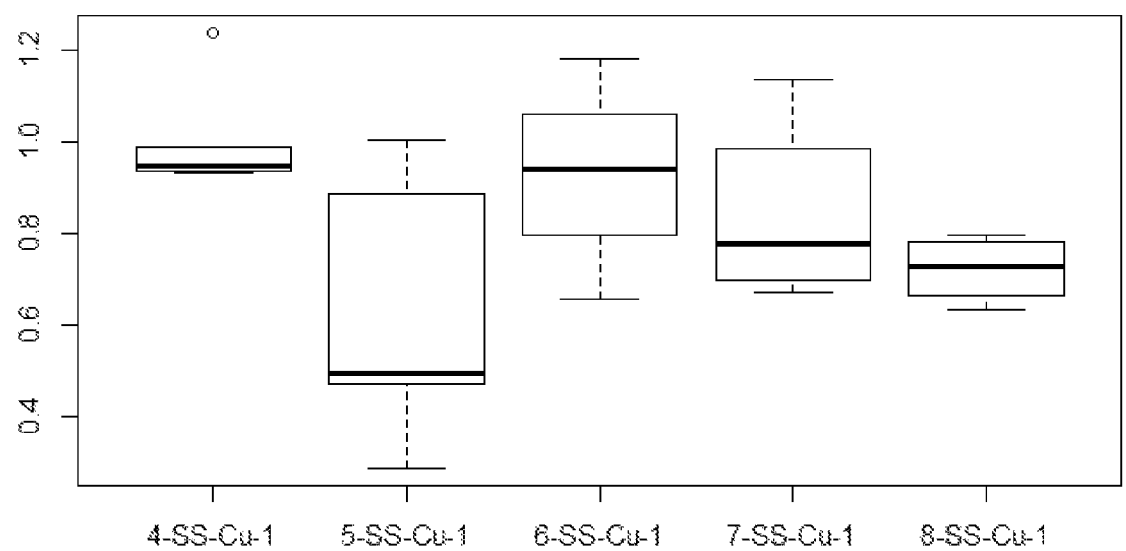
FIG. 15C is a graph comparing the total dry weights of plants grown in a soil/sand mixture with copper formulations according to the disclosure to that of two control formulations (Example 7)
Figure 15D:
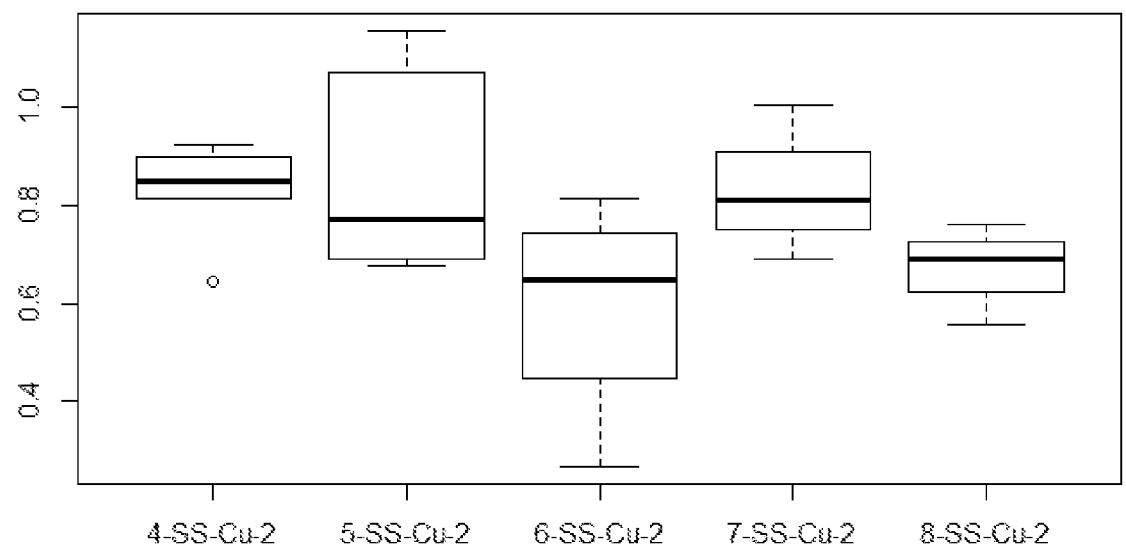
FIG. 15D is a graph comparing the total dry weights of plants grown in a soil/sand mixture with copper formulations according to the disclosure to that of two control formulations (Example 7)

FIGS. 15A-15D show the total dry weights in grams (y-axis) for each formulation, with FIGS. 15A and 15B representing plants grown in soil, and FIGS. 15C and 15D representing plants grown in the sand/soil mixture. Table 14 shows how the treatment numbers on the x-axis correspond to the formulations from Table 13 for all of the Figures reported in this Example 7.

The data shows that in the two experiments conducted in soil, all plants treated with the inventive formulas had higher mean weights than the negative control mean weight by at least 3.92% in Experiment 1 and by at least 7.87% in Experiment 2. In the two experiments conducted in the sand/soil mixture, treatment 7 had a higher mean weight than the negative control mean weight by 16.52% in Experiment 1 and 24.51% in Experiment 2.

2. Copper Uptake

Figure 16A:
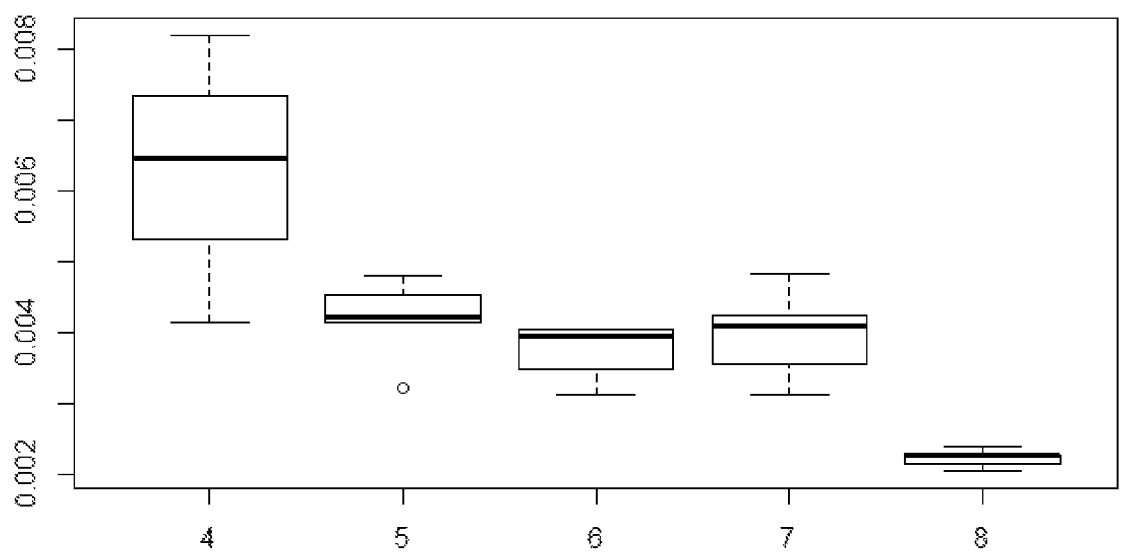
FIG. 16A is a graph comparing the copper uptake of plants grown in soil with copper formulations according to the disclosure to that of two control formulations (Example 7)
Figure 16B:
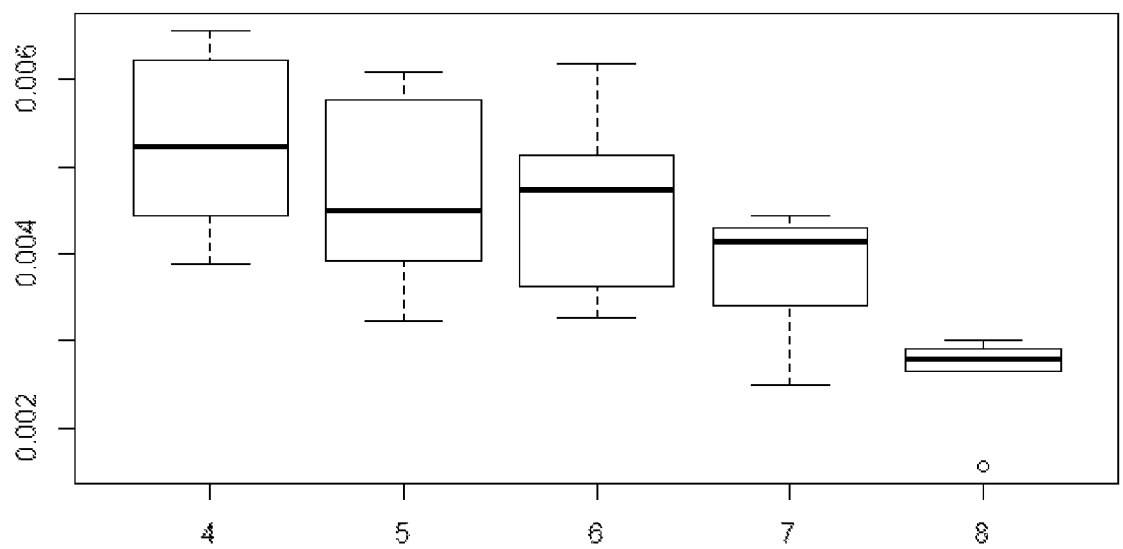
FIG. 16B is a graph comparing the copper uptake of plants grown in soil with copper formulations according to the disclosure to that of two control formulations (Example 7)
Figure 16C:
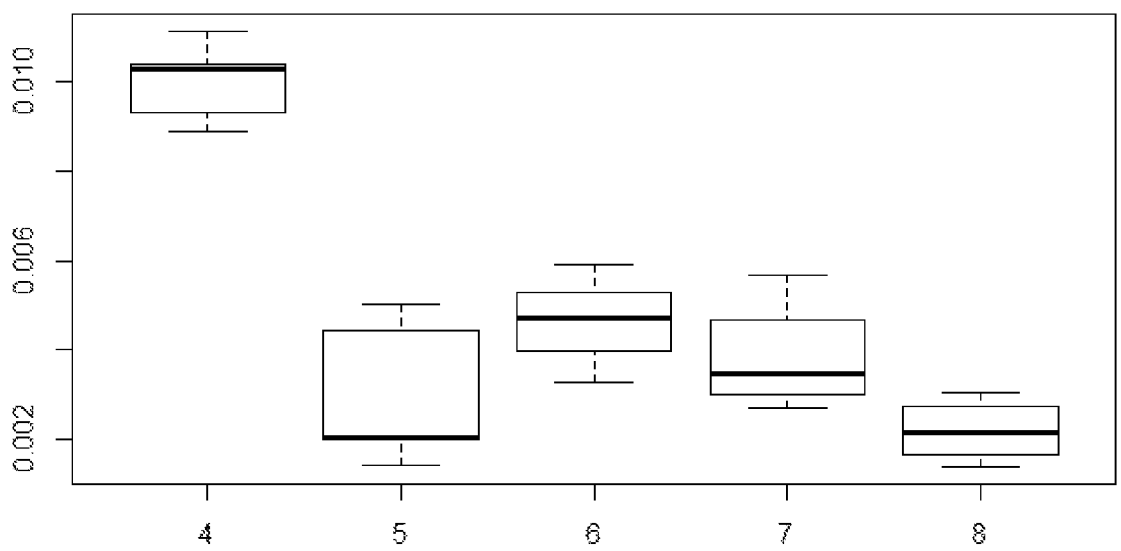
FIG. 16C is a graph comparing the copper uptake of plants grown in a soil/sand mixture with copper formulations according to the disclosure to that of two control formulations (Example 7)
Figure 16D:
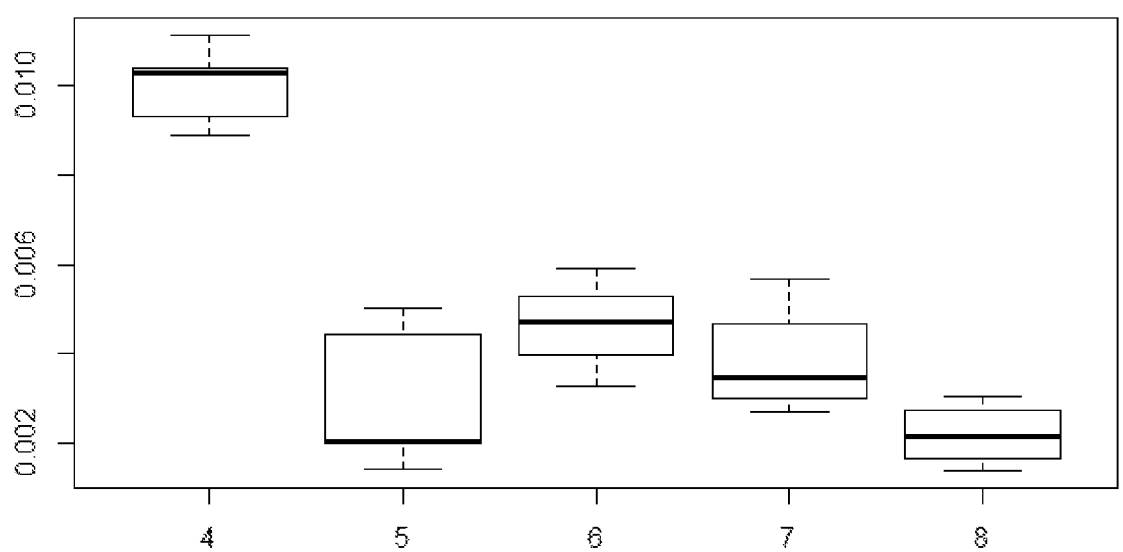
FIG. 16D is a graph comparing the copper uptake of plants grown in a soil/sand mixture with copper formulations according to the disclosure to that of two control formulations (Example 7)

FIGS. 16A-16D show the copper uptake in milligrams (y-axis) for each formulation, with FIGS. 16A and 16B representing plants grown in soil, and FIGS. 16C and 16D representing plants grown in the sand/soil mixture.

In the two experiments conducted in soil, the inventive formulas provided more copper to the plant than the negative control by at least 69% in Experiment 1 and by at least 45% in Experiment 2. In the sand/soil mixture experiments, the inventive formulas provided more copper to the plant than the negative control by at least 36% in Experiment 1 and by at least 88% in Experiment 2.

3. Nitrogen Uptake

Figure 17A:
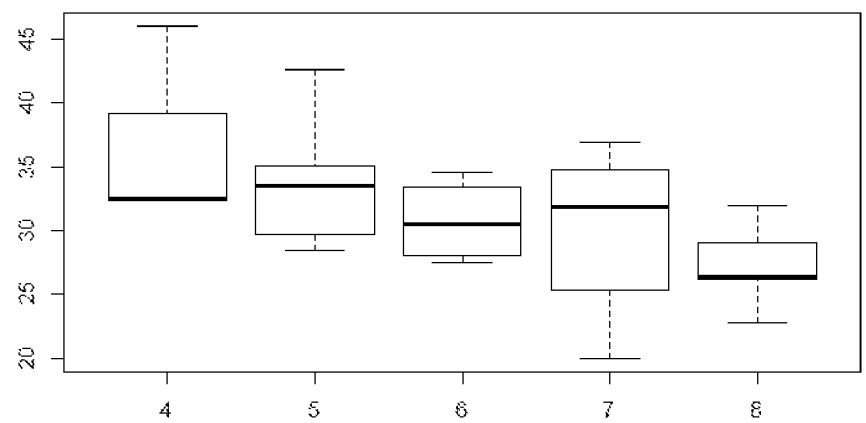
FIG. 17A is a graph comparing the nitrogen uptake of plants grown in soil with copper formulations according to the disclosure to that of two control formulations (Example 7)
Figure 17B:
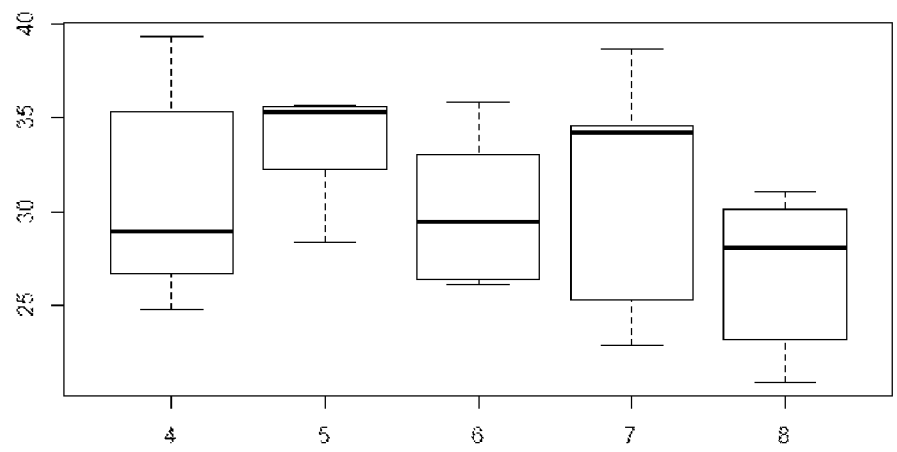
FIG. 17B is a graph comparing the nitrogen uptake of plants grown in soil with copper formulations according to the disclosure to that of two control formulations (Example 7)
Figure 17C:
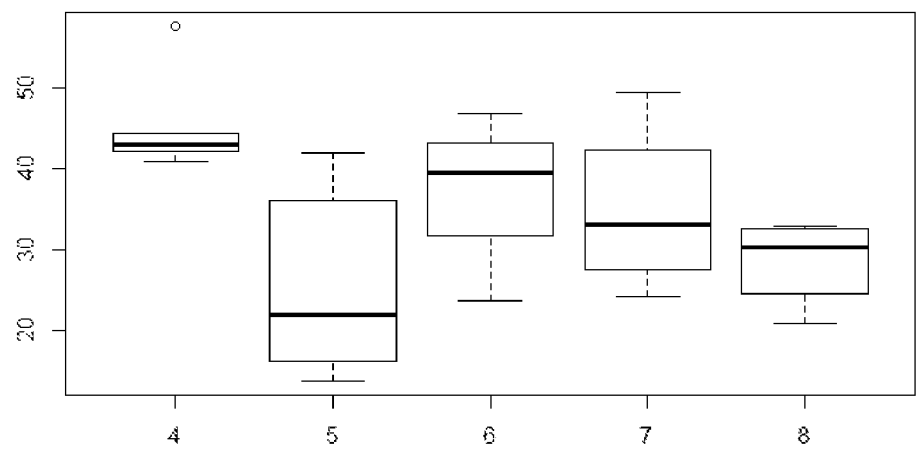
FIG. 17C is a graph comparing the nitrogen uptake of plants grown in a soil/sand mixture with copper formulations according to the disclosure to that of two control formulations (Example 7)
Figure 17D:
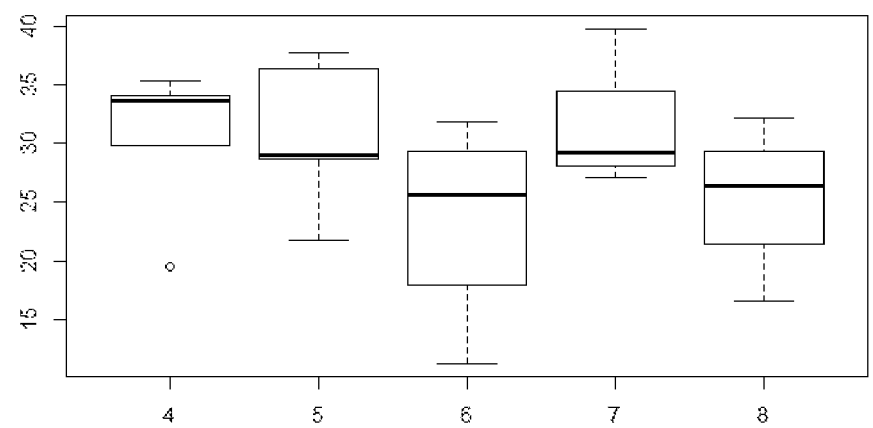
FIG. 17D is a graph comparing the nitrogen uptake of plants grown in a soil/sand mixture with copper formulations according to the disclosure to that of two control formulations (Example 7)

FIGS. 17A-17D show the nitrogen uptake in milligrams (y-axis) for each formulation, with FIGS. 17A and 17B representing plants grown in soil, and FIGS. 17C and 17D representing plants grown in the sand/soil mixture.

In the two experiments conducted in soil, all inventive formulas provided more nitrogen to the plant than the negative control by at least 9.28% in Experiment 1 and by at least 13.07% in Experiment 2. In the sand/soil experiments, treatment 7 provided more nitrogen to the plant than the negative control by 22.31% in Experiment 1 and 27.67% in Experiment 2.

TABLE 11

| Raw Materials | Positive Control | Formula 1 | Formula 2 | Formula 3 | Formula 4 | Formula 5 | Formula 6 | Formula 7 | Formula 8 | Formula 9 |
| --- | --- | --- | --- | --- | --- | --- | --- | --- | --- | --- |
| SOP | 2.30% | 0.00% | 0.00% | 0.00% | 0.00% | 0.00% | 0.00% | 0.00% | 0.00% | 0.00% |
| Manganese Sulfate Monohydrate | 58.34% | 24.00% | 24.00% | 24.00% | 18.00% | 18.00% | 18.00% | 24.00% | 24.00% | 24.00% |
| MnEDTA | 0.00% | 2.00% | 2.00% | 2.00% | 16.00% | 16.00% | 16.00% | 3.00% | 3.00% | 6.00% |
| Mn Carbonate | 0.00% | 2.00% | 2.00% | 2.00% | 2.00% | 2.00% | 2.00% | 2.00% | 2.00% | 2.00% |
| Mn Oxide | 31.26% | 62.00% | 56.00% | 50.00% | 54.00% | 48.00% | 42.00% | 61.00% | 57.00% | 58.00% |
| Morwet D-425 | 2.30% | 2.00% | 2.00% | 2.00% | 2.00% | 2.00% | 2.00% | 2.00% | 2.00% | 2.00% |
| Morwet EFW | 2.80% | 0.00% | 0.00% | 0.00% | 0.00% | 0.00% | 0.00% | 0.00% | 0.00% | 0.00% |
| Humic Acid | 0.00% | 2.00% | 8.00% | 14.00% | 2.00% | 8.00% | 14.00% | 2.00% | 2.00% | 2.00% |
| Sipernat ® 22S | 3.00% | 2.00% | 2.00% | 2.00% | 3.50% | 3.50% | 3.50% | 2.00% | 0.00% | 0.00% |
| Potassium Silicate | 0.00% | 4.00% | 4.00% | 4.00% | 2.50% | 2.50% | 2.50% | 0.00% | 10.00% | 6.00% |
| Calcium Silicate | 0.00% | 0.00% | 0.00% | 0.00% | 0.00% | 0.00% | 0.00% | 4.00% | 0.00% | 0.00% |
| WS % Mn | 18.67% | 7.94% | 7.94% | 7.94% | 7.84% | 7.84% | 7.84% | 8.07% | 8.07% | 8.46% |
| IS % Mn | 16.19% | 33.07% | 29.96% | 26.86% | 28.93% | 25.82% | 22.71% | 32.55% | 30.48% | 31.00% |
| Total % Mn | 34.86% | 41.01% | 37.90% | 34.80% | 36.77% | 33.66% | 30.55% | 40.62% | 38.55% | 39.46% |
| % Si | 1.40% | 1.66% | 1.66% | 1.66% | 2.09% | 2.09% | 2.09% | 1.90% | 1.82% | 1.09% |
| % Total | 100.00% | 100.00% | 100.00% | 100.00% | 100.00% | 100.00% | 100.00% | 100.00% | 100.00% | 100.00% |

TABLE 12

| Treatment # | Control Type or Table 11 Formula # |
| --- | --- |
| 4 | Positive Control |
| 5 | Formula 1 |
| 6 | Formula 7 |
| 7 | Formula 9 |
| 8 | Negative Control (NPK only; no Mn) |

Example 7

Cu Formulation Testing, Results, and Discussion

Nine formulations according to the disclosure as well as a positive control were prepared by mixing together the ingredients of Table 13. Formulas 1, 7, and 9 and the positive control were separately coated on NPK. Corn seed was planted, grown, harvested, and tested, all as described in Example 4. In all experiments, 2 ppm of copper was administered.

TABLE 13

| Raw Materials | Positive Control | Formula 1 | Formula 2 | Formula 3 | Formula 4 | Formula 5 | Formula 6 | Formula 7 | Formula 8 | Formula 9 |
|---|---|---|---|---|---|---|---|---|---|---|
| Copper Oxide | 70.00% | 62.00% | 56.00% | 50.00% | 54.00% | 48.00% | 42.00% | 61.00% | 57.00% | 58.00% |
| Copper Sulfate Pentahydrate | 20.00% | 24.00% | 24.00% | 24.00% | 18.00% | 18.00% | 18.00% | 24.00% | 24.00% | 24.00% |
| Cu Kellus[4] | 0.00% | 2.00% | 2.00% | 2.00% | 16.00% | 16.00% | 16.00% | 3.00% | 3.00% | 6.00% |
| Cu Hydroxide Carbonate | 0.00% | 2.00% | 2.00% | 2.00% | 2.00% | 2.00% | 2.00% | 2.00% | 2.00% | 2.00% |
| Morwet D-425 | 5.00% | 2.00% | 2.00% | 2.00% | 2.00% | 2.00% | 2.00% | 2.00% | 2.00% | 2.00% |
| Humic Acid | 0.00% | 2.00% | 8.00% | 14.00% | 2.00% | 8.00% | 14.00% | 2.00% | 2.00% | 2.00% |
| Sipernat ® 22S | 0.00% | 2.00% | 2.00% | 2.00% | 3.50% | 3.50% | 3.50% | 2.00% | 0.00% | 0.00% |
| Potassium Silicate | 0.00% | 4.00% | 4.00% | 4.00% | 2.50% | 2.50% | 2.50% | 0.00% | 10.00% | 6.00% |
| Calcium Silicate | 0.00% | 0.00% | 0.00% | 0.00% | 0.00% | 0.00% | 0.00% | 4.00% | 0.00% | 0.00% |
| Sugar | 5.00% | 0.00% | 0.00% | 0.00% | 0.00% | 0.00% | 0.00% | 0.00% | 0.00% | 0.00% |
| WS % Cu | 5.00% | 6.29% | 6.29% | 6.29% | 6.82% | 6.82% | 6.82% | 6.44% | 6.44% | 6.87% |
| IS % Cu | 52.50% | 47.65% | 43.15% | 38.65% | 41.65% | 37.15% | 32.65% | 46.90% | 43.90% | 44.65% |
| Total % Cu | 57.50% | 53.94% | 49.44% | 44.94% | 48.47% | 43.97% | 39.47% | 53.33% | 50.33% | 51.52% |
| % Si | 0.00% | 1.66% | 1.66% | 1.66% | 2.09% | 2.09% | 2.09% | 1.90% | 1.82% | 1.09% |
| % Total | 100.00% | 100.00% | 100.00% | 100.00% | 100.00% | 100.00% | 100.00% | 100.00% | 100.00% | 100.00% |

[4]Cu chelated with EDTA, available from Compass Minerals.

TABLE 14

| Treatment # | Control Type or Table 13 Formula # |
|---|---|
| 4 | Positive Control |
| 5 | Formula 1 |
| 6 | Formula 7 |
| 7 | Formula 9 |
| 8 | Negative Control (NPK only; no Cu) |

Example 8

B Formulation Testing, Results, and Discussion

Nine formulations according to the disclosure as well as a positive control were prepared by mixing together the ingredients of Table 15. Formulas 1, 7, and 9 and the positive control were separately coated on NPK. Corn seed was planted, grown, harvested, and tested, all as described in Example 4. In all experiments, 2 ppm of boron was administered.

1. Boron Uptake

Figure 18A:
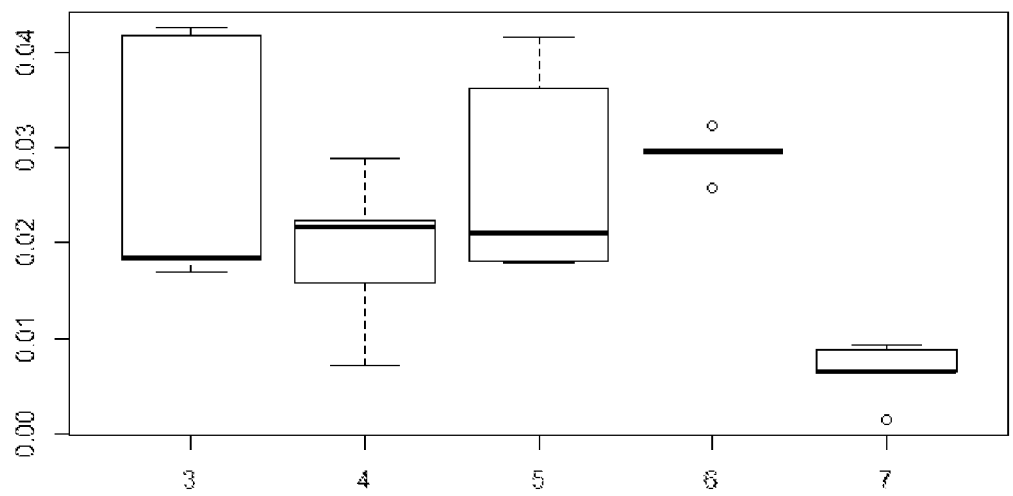
FIG. 18A is a graph comparing the boron uptake of plants grown in soil with boron formulations according to the disclosure to that of two control formulations (Example 8)
Figure 18B:
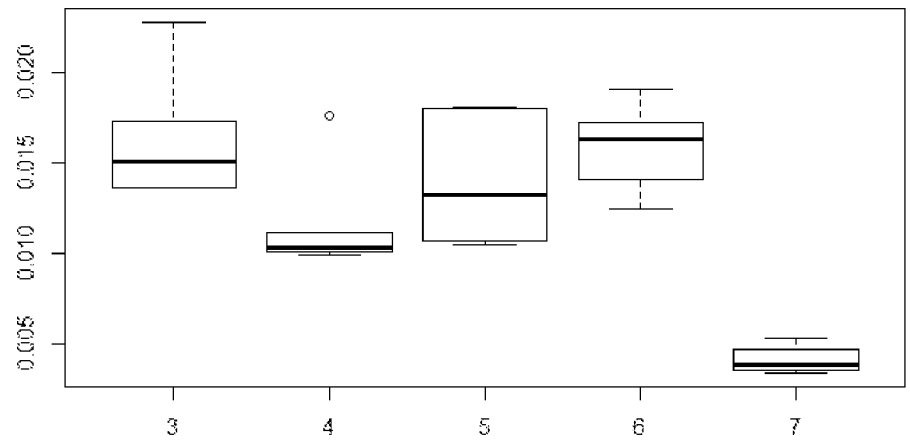
FIG. 18B is a graph comparing the boron uptake of plants grown in soil with boron formulations according to the disclosure to that of two control formulations (Example 8)
Figure 18C:
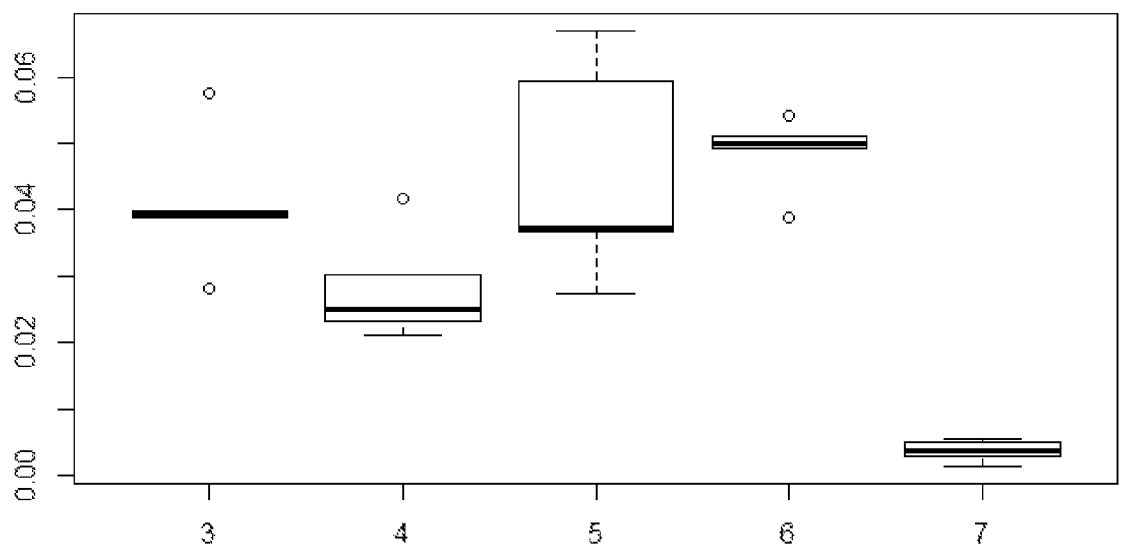
FIG. 18C is a graph comparing the boron uptake of plants grown in a soil/sand mixture with boron formulations according to the disclosure to that of two control formulations (Example 8)
Figure 18D:
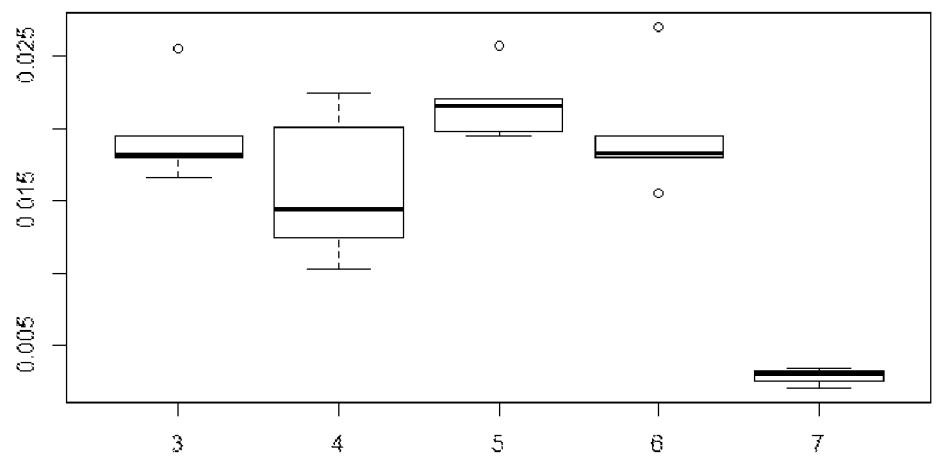
FIG. 18D is a graph comparing the boron uptake of plants grown in a soil/sand mixture with boron formulations according to the disclosure to that of two control formulations (Example 8)

FIGS. 18A-18D show the boron uptake in milligrams (y-axis) for each formulation, with FIGS. 18A (Experiment 1) and 18B (Experiment 2) representing plants grown in soil, and FIGS. 18C (Experiment 1) and 18D (Experiment 2) representing plants grown in the sand/soil mixture. Table 16 shows how the treatment numbers on the x-axis correspond to the formulations from Table 15 for all of the Figures reported in this Example 8.

In the first experiment conducted in soil, all inventive formulas provided more boron to the plant (boron uptake) than the negative control by at least 194.60%. In the second experiment conducted in soil, the inventive formulas provided more boron to the plant (boron uptake) than the negative control by at least 186%. Additionally, treatment 6 had higher mean boron uptake than the positive control by 6.66% in Experiment 1, and treatment 6 had 4.04% less boron uptake than the positive control in Experiment 2.

In the first experiment conducted in the sand/soil mixture, the inventive formulas provided more boron to the plant (boron uptake) than the negative control by at least 661.65%. In the second experiment conducted in sand, all new formulas provided more boron to the plant than the negative control by at least 444%. Additionally, treatments 5 and 6 had higher mean boron uptake than the positive control by 11.72% and 19.28% in Experiment 1. In Experiment 2, treatments 5 and 6 had higher mean boron uptake than the positive control by 11.04% and 0.4%.

2. Nitrogen Uptake

Figure 19A:
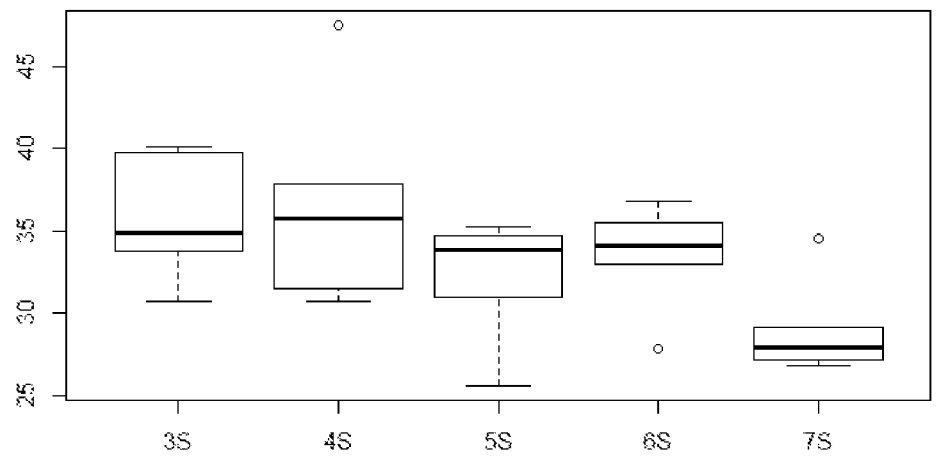
FIG. 19A is a graph comparing the nitrogen uptake of plants grown in soil with boron formulations according to the disclosure to that of two control formulations (Example 8)
Figure 19B:
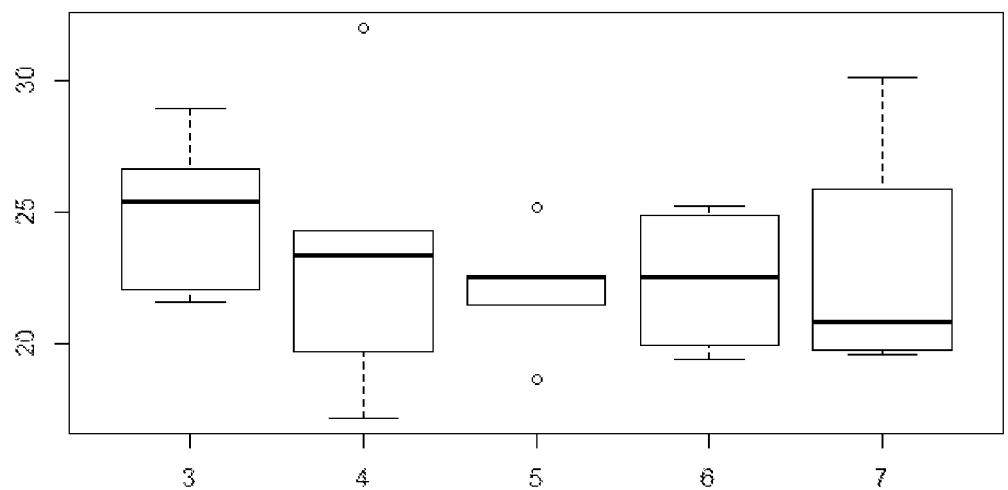
FIG. 19B is a graph comparing the nitrogen uptake of plants grown in soil with boron formulations according to the disclosure to that of two control formulations (Example 8)
Figure 19C:
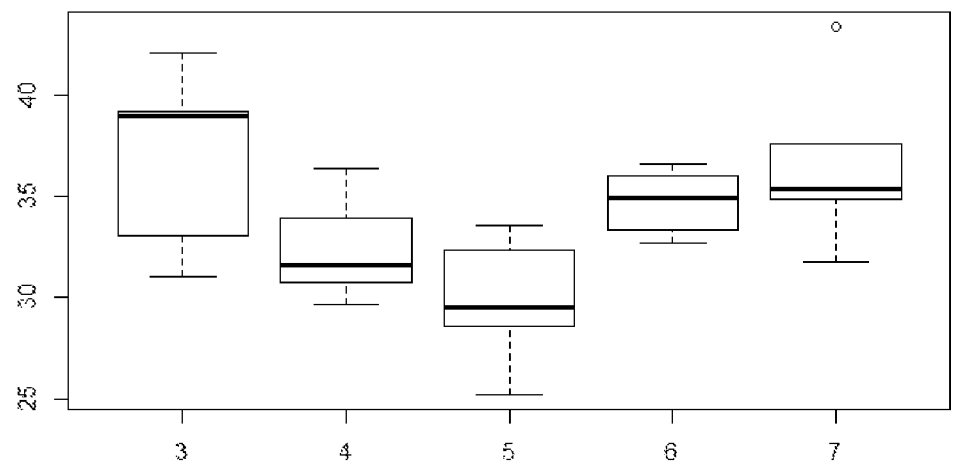
FIG. 19C is a graph comparing the nitrogen uptake of plants grown in a soil/sand mixture with boron formulations according to the disclosure to that of two control formulations (Example 8)
Figure 19D:
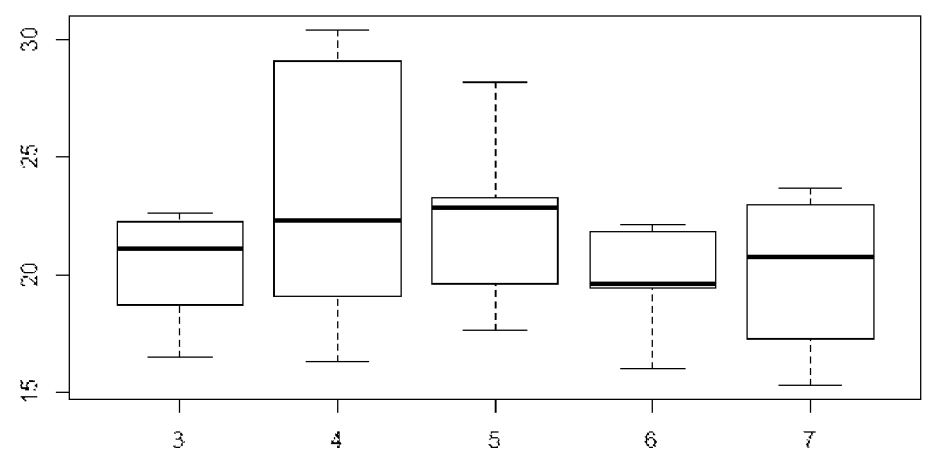
FIG. 19D is a graph comparing the nitrogen uptake of plants grown in a soil/sand mixture with boron formulations according to the disclosure to that of two control formulations (Example 8)

FIGS. 19A-19D show the nitrogen uptake in milligrams (y-axis) for each formulation, with FIGS. 19A (Experiment 1) and 19B (Experiment 2) representing plants grown in soil, and FIGS. 19C (Experiment 1) and 19D (Experiment 2) representing plants grown in the sand/soil mixture.

In the first experiment conducted in soil, all inventive formulas provided more nitrogen to the plant (nitrogen uptake) than the negative control by at least 10.03%. In the second experiment, treatment 4 provided more nitrogen than the negative control by 2.10%, while treatments 5 and 6 provided 3.27% and 1.74% less nitrogen than the negative control.

In the first experiment conducted in the sand/soil mixture, all new formulas provided less nitrogen to the plant (nitrogen uptake) than the negative control by a maximum of 18.4%. In the second experiment, treatments 4 and 5 provided more nitrogen than the negative control by 16.32% and 10.81%.

3. Zinc Uptake

Figure 20A:
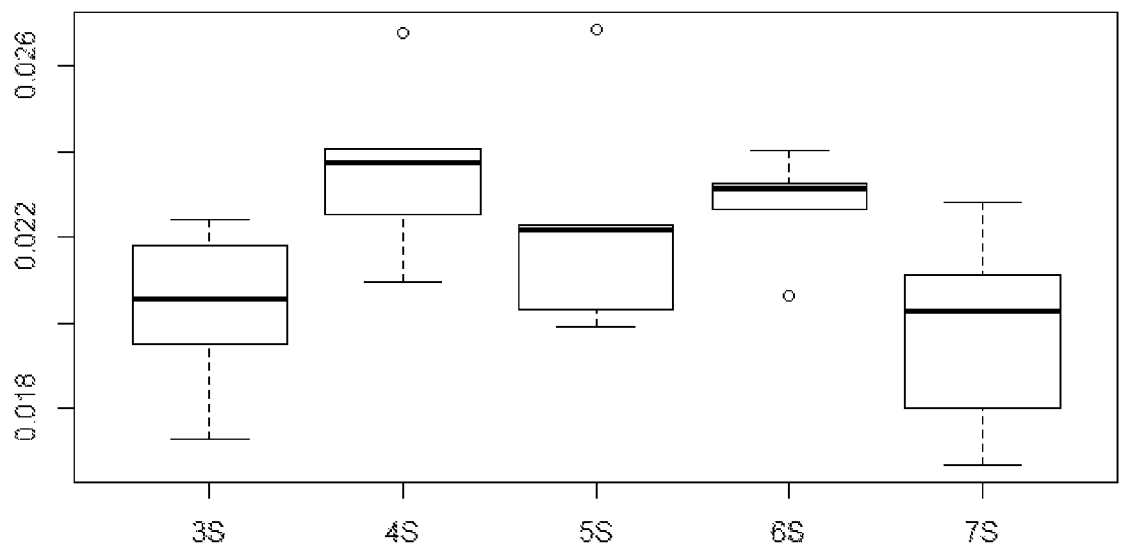
FIG. 20A is a graph comparing the zinc uptake of plants grown in soil with boron formulations according to the disclosure to that of two control formulations (Example 8)
Figure 20B:
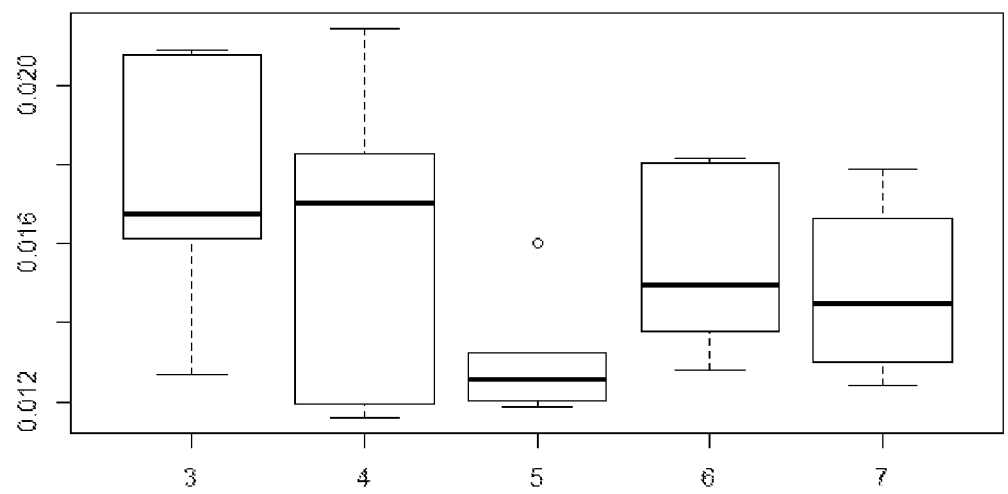
FIG. 20B is a graph comparing the zinc uptake of plants grown in soil with boron formulations according to the disclosure to that of two control formulations (Example 8)
Figure 20C:
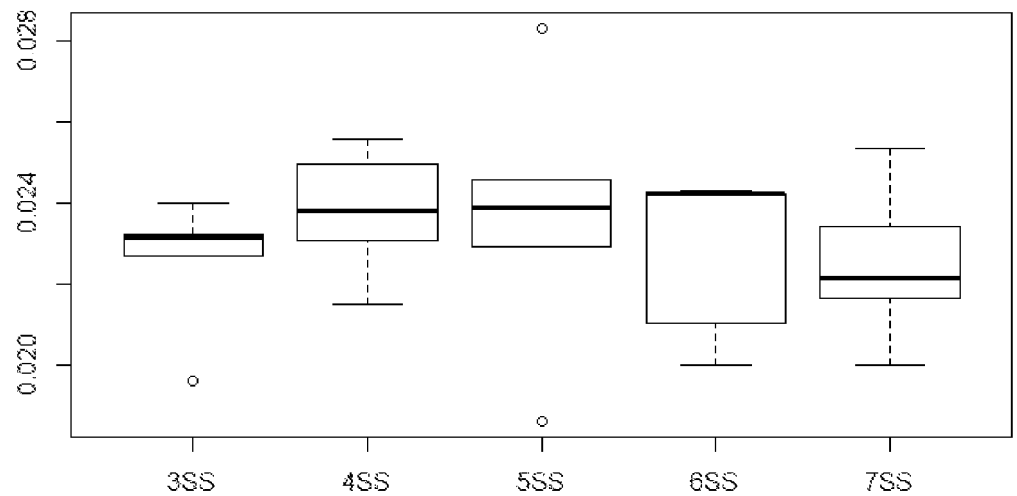
FIG. 20C is a graph comparing the zinc uptake of plants grown in a soil/sand mixture with boron formulations according to the disclosure to that of two control formulations (Example 8)
Figure 20D:
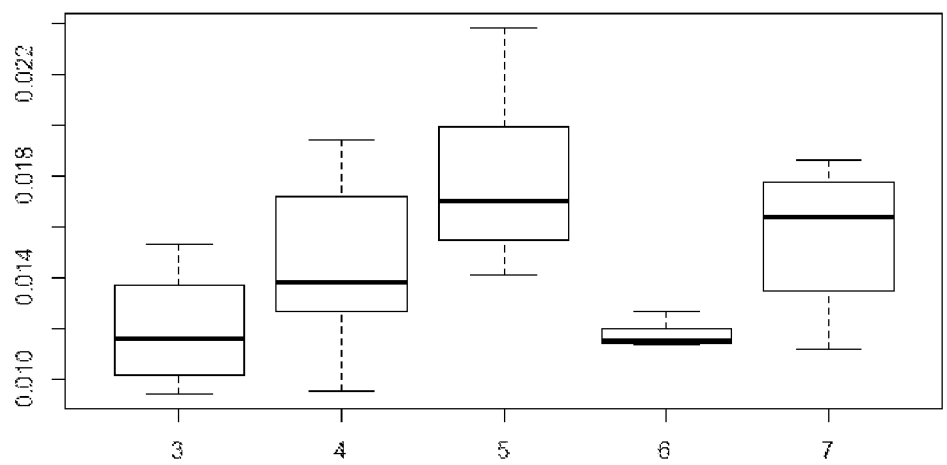
FIG. 20D is a graph comparing the zinc uptake of plants grown in a soil/sand mixture with boron formulations according to the disclosure to that of two control formulations (Example 8).

FIGS. 20A-20D show the zinc uptake in milligrams (y-axis) for each formulation, with FIGS. 20A (Experiment 1) and 20B (Experiment 2) representing plants grown in soil, and FIGS. 20C (Experiment 1) and 20D (Experiment 2) representing plants grown in the sand/soil mixture.

In the first experiment conducted in soil, all inventive formulas provided more zinc to the plant (zinc uptake) than the negative control by at least 12.73%. Additionally, all inventive formulas had higher mean zinc uptake than the positive control by at least 9.74%. In the second experiment in soil, treatments 4 and 6 provided more zinc than the negative control by 8.4% and 5%.

In the first experiment conducted in the sand/soil mixture, all inventive formulas provided more zinc to the plant (zinc uptake) than the negative control by at least 1.07%. All inventive formulas had higher mean zinc uptake than the positive control by at least 0.97%. In the second experiment conducted in sand, treatment 5 provided more zinc than the negative control by 15.48% and more than the positive control by 50%.

TABLE 15

| Raw Materials | Positive Control | Formula 1 | Formula 2 | Formula 3 | Formula 4 | Formula 5 | Formula 6 | Formula 7 | Formula 8 | Formula 9 |
|---|---|---|---|---|---|---|---|---|---|---|
| Disodium Octaborate Tetrahydrate | 65.00% | 0.00% | 0.00% | 0.00% | 0.00% | 0.00% | 0.00% | 0.00% | 0.00% | 0.00% |
| Potassium Tetraborate Tetrahydrate | 15.00% | 0.00% | 0.00% | 0.00% | 0.00% | 0.00% | 0.00% | 0.00% | 0.00% | 0.00% |
| Boric Acid | 19.50% | 0.00% | 0.00% | 0.00% | 0.00% | 0.00% | 0.00% | 0.00% | 0.00% | 0.00% |
| Iron Oxide | 0.45% | 0.00% | 0.00% | 0.00% | 0.00% | 0.00% | 0.00% | 0.00% | 0.00% | 0.00% |
| Iron Amino Acid Complex (Iron Solukey) | 0.03% | — | — | — | — | — | — | — | — | — |
| Morwet D-425 | 0.02% | 2.00% | 2.00% | 2.00% | 2.00% | 2.00% | 2.00% | 2.00% | 2.00% | 2.00% |
| Sipernat ® 22S | 0.01% | 2.00% | 2.00% | 2.00% | 2.00% | 2.00% | 2.00% | 2.00% | 2.00% | 0.00% |
| Humic Acid | 0.00% | 6.50% | 6.50% | 6.50% | 6.50% | 6.50% | 6.50% | 6.05% | 6.50% | 5.60% |
| Colemanite | 0.00% | 65.00% | 65.00% | 65.00% | 65.00% | 65.00% | 65.00% | 59.95% | 65.00% | 54.90% |
| Potassium Silicate | 0.00% | 4.00% | 4.00% | 4.00% | 4.00% | 4.00% | 4.00% | 0.00% | 4.00% | 6.00% |
| Calcium Silicate | 0.00% | 0.00% | 0.00% | 0.00% | 0.00% | 0.00% | 4.00% | 0.00% | 0.00% | 0.00% |
| Boric Anhydride | 0.00% | 20.50% | 20.50% | 20.50% | 20.50% | 20.50% | 20.50% | 26.00% | 20.50% | 31.50% |
| WS % B | 18.84% | 6.37% | 6.37% | 6.37% | 6.37% | 6.37% | 6.37% | 8.07% | 6.37% | 9.78% |
| IS % B | 0.00% | 10.26% | 10.26% | 10.26% | 10.26% | 10.26% | 10.26% | 9.46% | 10.26% | 8.66% |
| Total % B | 18.84% | 16.62% | 16.62% | 16.62% | 16.62% | 16.62% | 16.62% | 17.53% | 16.62% | 18.44% |
| % Si | 0.00% | 1.66% | 1.66% | 1.66% | 1.66% | 1.66% | 1.66% | 1.90% | 1.66% | 1.09% |
| % Total | 100.0% | 100.00% | 100.00% | 100.00% | 100.00% | 100.00% | 100.00% | 100.00% | 100.00% | 100.00% |

TABLE 16

| Treatment # | Control Type or Table 15 Formula # |
|---|---|
| 3 | Positive Control |
| 4 | Formula 1 |
| 5 | Formula 7 |
| 6 | Formula 9 |
| 7 | Negative Control (NPK only; no B) |

Example 9

Fe Formulations

Table 17 sets forth some exemplary inventive formulations where iron is the target micronutrient.

TABLE 17

| Raw Materials | Formula 1 | Formula 2 | Formula 3 | Formula 4 | Formula 5 | Formula 6 | Formula 7 | Formula 8 | Formula 9 |
|---|---|---|---|---|---|---|---|---|---|
| Iron Oxide | 69.00% | 56.00% | 50.00% | 54.00% | 48.00% | 42.00% | 69.00% | 57.00% | 68.00% |
| Iron Sulfate Monohydrate | 17.00% | 24.00% | 24.00% | 18.00% | 18.00% | 18.00% | 16.00% | 24.00% | 14.00% |
| Iron Amino Acid Complex (Solukey) | 0.00% | 0.00% | 0.00% | 0.00% | 0.00% | 0.00% | 0.00% | 0.00% | 0.00% |
| Fe EDTA | 2.00% | 2.00% | 2.00% | 16.00% | 16.00% | 16.00% | 3.00% | 3.00% | 6.00% |
| Fe Hydroxide Carbonate | 2.00% | 2.00% | 2.00% | 2.00% | 2.00% | 2.00% | 2.00% | 2.00% | 2.00% |
| Morwet D-425 | 2.00% | 2.00% | 2.00% | 2.00% | 2.00% | 2.00% | 2.00% | 2.00% | 2.00% |
| Humic Acid | 2.00% | 8.00% | 14.00% | 2.00% | 8.00% | 14.00% | 2.00% | 2.00% | 2.00% |
| Sipernat ® 22S | 2.00% | 2.00% | 2.00% | 3.50% | 3.50% | 3.50% | 2.00% | 0.00% | 0.00% |
| Potassium Silicate | 4.00% | 4.00% | 4.00% | 2.50% | 2.50% | 2.50% | 0.00% | 10.00% | 6.00% |
| Calcium Silicate | 0.00% | 0.00% | 0.00% | 0.00% | 0.00% | 0.00% | 4.00% | 0.00% | 0.00% |
| Sugar | 0.00% | 0.00% | 0.00% | 0.00% | 0.00% | 0.00% | 0.00% | 0.00% | 0.00% |
| WS % Fe | 5.85% | 8.15% | 8.15% | 7.99% | 7.99% | 7.99% | 5.65% | 8.28% | 5.38% |
| IS % Fe | 38.10% | 31.08% | 27.84% | 30.00% | 26.76% | 23.52% | 38.10% | 31.62% | 37.56% |
| Total % Fe | 43.95% | 39.23% | 35.99% | 38.00% | 34.76% | 31.52% | 43.75% | 39.90% | 42.94% |
| % Si | 1.66% | 1.66% | 1.66% | 2.09% | 2.09% | 2.09% | 1.90% | 1.82% | 1.09% |
| % Total | 100.00% | 100.00% | 100.00% | 100.00% | 100.00% | 100.00% | 100.00% | 100.00% | 100.00% |

We claim:

1. A method of using a fertilizer composition comprising applying the composition to soil, said composition comprising a mixture of:
   about 4% by weight to about 20% by weight of a first source of a target micronutrient comprising said target micronutrient chelated with a chelating agent; and
   about 20% by weight to about 40% by weight of a second source of the target micronutrient that is different from said first source, wherein each % by weight is based upon the total weight of said composition taken as 100% by weight;
   wherein the fertilizer composition is in the form of a powder and wherein the average particle size is less than about 170 μm for at least about 50% of the particles in the fertilizer composition.

2. The method of claim 1, wherein said second source of said target nutrient is provided in a non-chelated form.

3. The method of claim 1, wherein said second source is selected from the group consisting of sulfates, oxides, chlorides, carbonates, phosphates, and nitrates of the target micronutrient.

4. The method of claim 1, wherein said chelating agent is selected from the group consisting of ethylenediaminetetraacetic acid, ethylenediaminetetraacetate, EDTA salts, and mixtures thereof.

5. The method of claim 1, wherein said target micronutrient is selected from the group consisting of nickel, copper, zinc, manganese, iron, molybdenum, and mixtures thereof.

6. The method of claim 1, further comprising an ingredient selected from the group consisting of dispersing agents, anti-caking agents, dyes, flow agents, macronutrients, beneficial nutrients, organic plant growth promoters, acids, sugars, and mixtures of the foregoing.

7. The method of claim 1, wherein said composition further comprises a third source of said target nutrient, wherein said third source is different from both said first and second sources.

8. The method of claim 7, wherein said third source of said target nutrient is provided in a non-chelated form.

9. The method of claim 7, wherein said composition further comprises a fourth source of said target nutrient, wherein said fourth source is different from said first, second, and third sources.

10. The method of claim 9, wherein said fourth source of said target nutrient is provided in a non-chelated form.

11. The method of claim 1, wherein said second source is the sulfate form of said target micronutrient.

12. The method of claim 1, further comprising planting a seed in said soil, wherein said planting happens before said applying, during said applying, after said applying, or in a combination of two or three of the foregoing.

13. The method of claim 12, wherein said seed is selected from the group consisting of corn seeds, soybean seeds, cotton seeds, fruit seeds, wheat seeds, and vegetable seeds.

14. The method of claim 12, wherein said composition is provided in the form of a coating on an agronomic carrier, and said applying comprises contacting said coated agronomic carrier with the soil.

15. The method of claim 14, wherein said agronomic carrier is selected from the group consisting of nitrogen, phosphate, potassium, sulfur, calcium, magnesium, urea, or mixtures of the foregoing.

16. The method of claim 15, wherein:
said agronomic carrier comprises nitrogen; said target micronutrient is zinc;
said seed grows into a plant; and
at about 30 days after said planting, said plant has a nitrogen content that is at least about 17% higher than a plant grown under the same conditions but without the use of the fertilizer composition.

17. The method of claim 12, wherein:
said target micronutrient is manganese;
said seed grows into a plant; and
at about 30 days after said planting, said plant has a boron content that is at least about 100% higher than a plant grown under the same conditions but without the use of the fertilizer composition.

18. The method of claim 12, wherein:
said seed grows into a plant; and
at about 30 days after said planting, said plant has a weight that is at least about 10% greater than a plant grown under the same conditions but without the use of the fertilizer composition.

19. The method of claim 1, wherein the ratio of first source to second source is from about 1:4 to about 1:12.

20. A fertilizer composition comprising a mixture of:
about 4% by weight to about 20% by weight of a first source of a target micronutrient comprising said target micronutrient chelated with a chelating agent; and
about 20% by weight to about 40% by weight of a second source of the target micronutrient that is different from said first source, wherein each % by weight is based upon the total weight of said composition taken as 100% by weight;
wherein the fertilizer composition is in the form of a powder and wherein the average particle size is less than about 170 μm for at least about 50% of the particles in the fertilizer composition.

21. The composition of claim 20, wherein said second source of said target nutrient is provided in a non-chelated form.

22. The composition of claim 20, wherein said second source is selected from the group consisting of sulfates, oxides, chlorides, carbonates, phosphates, and nitrates of the target micronutrient.

23. The composition of claim 20, wherein said chelating agent is selected from the group consisting of ethylenediaminetetraacetic acid, ethylenediaminetetraacetate, EDTA salts, and mixtures thereof.

24. The composition of claim 20, wherein said target micronutrient is selected from the group consisting of nickel, copper, zinc, manganese, iron, molybdenum, and mixtures thereof.

25. The composition of claim 20, further comprising an ingredient selected from the group consisting of dispersing agents, anti-caking agents, dyes, flow agents, macronutrients, beneficial nutrients, organic plant growth promoters, acids, sugars, and mixtures of the foregoing.

26. The composition of claim 20, wherein said composition further comprises a third source of said target nutrient, wherein said third source is different from both said first and second sources.

27. The composition of claim 26, wherein said composition further comprises a fourth source of said target nutrient, wherein said fourth source is different from said first, second, and third sources.

28. The composition of claim 20, wherein said second source is the sulfate form of said target micronutrient.

29. The composition of claim 28, wherein said chelating agent is selected from the group consisting of ethylenediaminetetraacetic acid, ethylenediaminetetraacetate, EDTA salts, and mixtures thereof.

30. The composition of claim 20, said fertilizer composition further comprising an ingredient that is insoluble in an acidic environment, that is soluble in a basic environment, and that releases a weak acid as it solubilizes.

31. The composition of claim 30, wherein said ingredient is humic acid.

32. A method of using a fertilizer composition comprising applying the composition to soil, said fertilizer composition comprising a mixture of:
about 10% by weight to about 40% by weight of a first source of boron that is water-soluble;

about 35% by weight to about 85% by weight of a second source of boron selected from the group consisting of colemanite, ulexite, hydroboracite, zinc borate, and mixtures thereof, wherein each % by weight is based upon the total weight of said composition taken as 100% by weight;

and an ingredient that is insoluble in an acidic environment, that is soluble in a basic environment, and that releases a weak acid as it solubilizes, wherein said composition is in the form of a powder and wherein the average particle size is less than about 170 µm for at least about 50% of the particles in the fertilizer composition.

33. The method of claim 32, wherein said first source is selected from the group consisting of disodium octaborate tetrahydrate, boric acid, potassium tetraborate tetrahydrate, potassium pentaborate tetrahydrate, boric anhydride, and mixtures thereof.

34. The method of claim 32, wherein said second source is selected from the group consisting of ulexite, hydroboracite, colemanite, and mixtures thereof.

35. The method of claim 32, wherein said ingredient that is insoluble in an acidic environment, that is soluble in a basic environment, and that releases a weak acid as it solubilizes is humic acid.

36. The method of claim 32, further comprising planting a seed in said soil, wherein said planting happens before said applying, during said applying, after said applying, or in a combination of two or three of the foregoing.

37. The method of claim 36, wherein said composition is provided in the form of a coating on an agronomic carrier, and said applying comprises contacting said coated agronomic carrier with the soil.

38. The method of claim 37, wherein said agronomic carrier is selected from the group consisting of nitrogen, phosphate, potassium, sulfur, calcium, magnesium, urea, or mixtures of the foregoing.

39. A fertilizer composition comprising a mixture of:
about 10% by weight to about 40% by weight of a first source of boron that is water-soluble;
about 35% by weight to about 85% by weight of a second source of boron selected from the group consisting of colemanite, ulexite, hydroboracite, zinc borate, and mixtures thereof, wherein each % by weight is based upon the total weight of said composition taken as 100% by weight;
and an ingredient that is insoluble in an acidic environment, that is soluble in a basic environment, and that releases a weak acid as it solubilizes, wherein said composition is in the form of a powder and wherein the average particle size is less than about 170 µm for at least about 50% of the particles in the fertilizer composition.

40. The composition of claim 39, wherein said first source is selected from the group consisting of disodium octaborate tetrahydrate, boric acid, potassium tetraborate tetrahydrate, potassium pentaborate tetrahydrate, boric anhydride, and mixtures thereof.

41. The composition of claim 39, wherein the ingredient that is insoluble in an acidic environment, that is soluble in a basic environment, and that releases a weak acid as it solubilizes is humic acid.

42. The composition of claim 39, further comprising an ingredient selected from the group consisting of dispersing agents, anti-caking agents, dyes, flow agents, macronutrients, beneficial nutrients, organic plant growth promoters, acids, sugars, and mixtures of the foregoing.

43. A fertilizer composition comprising a mixture of:
a first source of a target micronutrient comprising said target micronutrient chelated with a chelating agent;
a second source of the target micronutrient that is different from said first source; and humic acid,
wherein said composition is in the form of a powder and wherein the average particle size is less than about 170 µm for at least about 50% of the particles in the fertilizer composition.

* * * * *